United States Patent
Henry et al.

(10) Patent No.: US 10,430,706 B2
(45) Date of Patent: Oct. 1, 2019

(54) PROCESSOR WITH MEMORY ARRAY OPERABLE AS EITHER LAST LEVEL CACHE SLICE OR NEURAL NETWORK UNIT MEMORY

(71) Applicant: VIA ALLIANCE SEMICONDUCTOR CO., LTD., Shanghai (CN)

(72) Inventors: G. Glenn Henry, Austin, TX (US); Douglas R. Reed, Austin, TX (US)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 508 days.

(21) Appl. No.: 15/366,053

(22) Filed: Dec. 1, 2016

(65) Prior Publication Data

US 2018/0157967 A1     Jun. 7, 2018

(51) Int. Cl.
*G06F 12/08*     (2016.01)
*G06N 3/063*     (2006.01)
(Continued)

(52) U.S. Cl.
CPC .......... *G06N 3/063* (2013.01); *G06F 12/084* (2013.01); *G06F 12/0811* (2013.01);
(Continued)

(58) Field of Classification Search
None
See application file for complete search history.

(56) References Cited

U.S. PATENT DOCUMENTS

| 5,204,938 A | 4/1993 | Skapura et al. |
| 5,465,375 A | 11/1995 | Thepaut et al. |

(Continued)

FOREIGN PATENT DOCUMENTS

| CN | 1577257 A | 2/2005 |
| CN | 1658153 B | 8/2005 |

(Continued)

OTHER PUBLICATIONS

NPL_Memory-Centric Accelerator Design for Convolutional Neural Networks, Peemen; Oct. 2013 (Year: 2013).*

(Continued)

*Primary Examiner* — Tracy C. Chan
(74) *Attorney, Agent, or Firm* — McClure, Qualey & Rodack, LLP

(57) ABSTRACT

A processor comprising a plurality of processing cores, a last level cache memory (LLC) shared by the plurality of processing cores, and a neural network unit (NNU) comprising an array of neural processing units (NPU) and a memory array. The LLC comprises a plurality of slices. To transition from a first mode in which the memory array operates to store neural network weights read by the plurality of NPUs to a second mode in which the memory array operates as a slice of the LLC in addition to the plurality of slices, the processor write-back-invalidates the LLC and updates a hashing algorithm to include the memory array as a slice of the LLC in addition to the plurality of slices. To transition from the second mode to the first mode, the processor write-back-invalidates the LLC and updates the hashing algorithm to exclude the memory array from the LLC.

18 Claims, 31 Drawing Sheets

(51) Int. Cl.
*G06F 12/0811* (2016.01)
*G06F 12/0864* (2016.01)
*G06N 3/04* (2006.01)
*G06F 12/084* (2016.01)

(52) U.S. Cl.
CPC ....... *G06F 12/0864* (2013.01); *G06N 3/0445* (2013.01); *G06N 3/0454* (2013.01); *G06F 2212/1041* (2013.01)

(56) References Cited

U.S. PATENT DOCUMENTS

| | | | |
|---|---|---|---|
| 5,623,628 | A | 4/1997 | Brayton et al. |
| 5,956,703 | A | 9/1999 | Turner et al. |
| 2003/0056075 | A1* | 3/2003 | Schmisseur ......... G06F 12/0802 711/173 |
| 2007/0033152 | A1 | 2/2007 | Hahn et al. |
| 2009/0144524 | A1 | 6/2009 | Shen et al. |
| 2012/0041914 | A1 | 2/2012 | Tirunagari |
| 2012/0069029 | A1 | 3/2012 | Bourd et al. |
| 2012/0311266 | A1* | 12/2012 | Takata ................ G06F 12/0813 711/119 |
| 2015/0120998 | A1* | 4/2015 | Wang ................... G06F 12/084 711/106 |
| 2015/0186275 | A1* | 7/2015 | Moga ................. G06F 12/0811 711/122 |
| 2016/0188474 | A1 | 6/2016 | Wang et al. |
| 2016/0210044 | A1 | 7/2016 | Mitkar et al. |
| 2016/0239344 | A1* | 8/2016 | Wang ................... G06F 9/5016 |
| 2017/0102920 | A1 | 4/2017 | Henry et al. |
| 2017/0102921 | A1 | 4/2017 | Henry et al. |
| 2017/0102940 | A1 | 4/2017 | Henry et al. |
| 2017/0102941 | A1 | 4/2017 | Henry et al. |
| 2017/0102945 | A1 | 4/2017 | Henry et al. |
| 2017/0103040 | A1 | 4/2017 | Henry et al. |
| 2017/0103041 | A1 | 4/2017 | Henry et al. |
| 2017/0103300 | A1 | 4/2017 | Henry et al. |
| 2017/0103301 | A1 | 4/2017 | Henry et al. |
| 2017/0103302 | A1 | 4/2017 | Henry et al. |
| 2017/0103303 | A1 | 4/2017 | Henry et al. |
| 2017/0103304 | A1 | 4/2017 | Henry et al. |
| 2017/0103305 | A1 | 4/2017 | Henry et al. |
| 2017/0103306 | A1 | 4/2017 | Henry et al. |
| 2017/0103307 | A1 | 4/2017 | Henry et al. |
| 2017/0103310 | A1 | 4/2017 | Henry et al. |
| 2017/0103311 | A1 | 4/2017 | Henry et al. |
| 2017/0103312 | A1 | 4/2017 | Henry et al. |
| 2017/0103319 | A1 | 4/2017 | Henry et al. |
| 2017/0103320 | A1 | 4/2017 | Henry et al. |
| 2017/0103321 | A1 | 4/2017 | Henry et al. |

FOREIGN PATENT DOCUMENTS

| | | |
|---|---|---|
| EP | 0846287 A1 | 6/1998 |
| WO | WO2016182674 | 11/2016 |

OTHER PUBLICATIONS

NPL_Performance and Caching Issues in an Integration of Neural Net and Conventional PC, Gosasang, May 2002 (Year: 2002).*
Selivanov, S.G. et al. "The use of Artificial Intelligence Methods of Technological Preparation of Engine-Building Production." American Journal of Industrial Engineering, 2014, vol. 2 No. 1, 10-14.
Artificial Neural Network in Wikipedia. Retrieved Jun. 1, 2015 from http://en.wikipedia.org/wiki/artificial_neural_network pp. 1-19.
Chen, T. et al. "DianNao: A Small-Footprint High—Throughput Accelerator for Ubiquitous Machine-Learning." ASPLOS '14. pp. 269-284.
Ovtcharov, K. et al. "Accelerating Deep Convolutional Neural Networks Using Specialized Hardware." CNN Whitepaper. Feb. 22, 2015. pp. 1-4.
Computational RAM in Wikipedia. Retrieved May 31, 2015 from http//en.wikipedia.org.wiki/Computational_RAM pp. 1-3.
"Elman Networks". Retrieved Dec. 29, 2015 from http://mnemstudio.org/neural-networks-elman.htm. pp. 1-6.
Gers, F. et al. "Learning to Forget: Continual Prediction with LSTM." Neural Computation, 2000. pp. 1-20 Retrieved from ftp://ftp.idsia.ch/pub/juergen/FgGates-NC.pdf.
Klaus, G. et al. "LSTM: A Search Space Odyssey." Cornell University Library. Mar. 13, 2015. pp. 1-18.
Ovtcharov, K. et al. "Toward Accelerating Deep Learning at Scale Using Specialized Hardware in the Datacenter." Microsoft Research. Aug. 17, 2015. pp. 1-38.
Hochreiter, S. et al. "Long Short-Term Memory." Neural Computation 9(8). 1997. pp. 1735-1780.
Krizhevsky, A. "ImageNet Classification with Deep Convolutional Neural Networks." Advances in Neural Information Processing Systems Conference. NIPS 2012. pp. 1-9.
Vanhoucke, V. et al. "Improving the Speed of Neural Networks on CPUs." Deep Learning and Unsupervised Feature Learning Workshop, NIPS 2011. pp. 1-8.
Clarke, Peter. "Intel Follows Qualcomm Down Neural Network Path." IHS Electronics 360. Jun. 23, 2014. pp. 1-3.
Kumar, Samir. "Introducing Qualcomm Zeroth Processors: Brain-Inspired Computing." Qualcomm OnQ Blog. Oct. 10, 2013. pp. 1-11.
Jordan, Michael I. "Serial Order: A Parallel Distributed Processing Approach." ICS Report 8604. May 1986. pp. 1-46.
Blelloch, Guy. Lecture "Parallel Algorithms." Jan. 15, 2009. pp. 1-5.
"LSTM Networks for Sentiment Analysis." DeepLearning 0.1 Documentation. Presented at the Hot Chips Symposium in Cupertino, CA, Aug. 23-25, 2015 pp. 1-5.
"Microsoft Neural Network Algorithm Technical Reference." Microsoft Developer Network. Retrieved May 26, 2015 from https://msdn.Microsoft.com/en-us/cc645901 pp. 1-5.
Qadeer, W. et al. "Convolution Engine: Balancing Efficiency and Flexibility in Specialized Computing." Cummunications of the ACM vol. 58 No. 4. Apr. 2015. pp. 85-93.
Parallel Random-Access Machine in Wikipedia. Retrieved Jun. 1, 2015 from http://en.wikipedia.org/wiki/Parallel_random-access_machine pp. 1-4.
Bengio, Yoshua. Neural Networks: Tricks of the Trade. "Practical Recommendations for Gradient-Based Training of Deep Architectures." Version 2, Sep. 16, 2012. Retrieved on May 29, 2015 from http://arxiv.org/pdf/1206.5533v2.pdf pp. 1-33.
Recurrent Neural Network in Wikipedia. Retrieved on Oct. 19, 2015 from https://wikipedia.org/wiki/Recurrent_neural_network pp. 1-9.
Recurrent Neural Networks Tutorial, Part 1—Introduction to RNNs. Retrieved on Oct. 19, 2015 from http://www.wildml.com/2015/09/recurrent-neural-networks-tutorial-part-1-introduction-to-rnns/ pp. 1-11.
Szegedy, Christian. "Building a Deeper Understanding of Images." Google Research Blog. Retrieved on Jun. 2, 2015 from http://googleresearch.blogspot.com/2014/09/building-deeper-understanding-of-images.html pp. 1-7.
Mesnil, G. et al. "Investigation of Recurrent-Neural-Network Architectures and Learning Methods for Spoken Language Understanding." Interspeech. Aug. 2013. pp. 1-5.
Karpathy, Andrejj. "The Unreasonable Effectiveness of Recurrent Neural Networks." Andrej Karpathy blog. Posted on May 21, 2015 on http://karpathy.github.io/2015/5/21/rnn-effectiveness pp. 1-41.
Convolutional neural network—Wikipedia.pdf; Retrieved on Oct. 17, 2016 from https://en.wikipedia.org/wiki/Convolutional_neural_network. pp. 1-19.
CS231n Convolutional Neural Networks for Visual Recognition.pdf; Retrieved on Oct. 17, 2016 from http://cs231n.github.io/convolutional-networks. pp. 1-26.
Convolutional Neural Networks (LeNet)—DeepLearning 0.1 documentation.pdf; Retrieved on Oct. 10, 2017 from http://deeplearning.net/tutorial/lenet.html.
Chellapilla, K. et al. "High performance convolutional neural networks for document processing." 2006. In Tenth International Workshop on Frontiers in Handwriting Recognition. Suvisoft. pp. 1-7.
Mathieu, M. et al. "Fast training of convolutional networks through FFTs." arXiv:1312.5851 [cs.CV]. Mar. 6, 2014. pp. 1-9.

(56) References Cited

OTHER PUBLICATIONS

Liu, S. "Cambricon: An Instruction Set Architecture for Neural Networks" 2016 ACM/IEEE 43rd International Symposium on Computer Architecture. IEEE Press. pp. 393-405.
Sharma, Hardik et al. "From High-Level Deep Neural Models to FPGAs." 2016 49th Annual IEEE/ACM International Symposium on Microarchitecture (MICRO), IEEE. Oct. 15, 2016. pp. 1-12.
Chen, Yu-Hsin et al. "Eyeriss: A Spatial Architecture for Energy-Efficient Dataflow for Convolutional Neural Networks." 2016 ACM/IEEE 43rd Annual International Symposium on Computer Architecture (ISCA). Jun. 1, 2016. pp. 367-379. XP055381052.
Means, Robert W. et al. "Extensible Linear Floating Point SIMD Neurocoputer Array Processor." *International Joint Conference on Neural Networks*. New York, IEEE. vol. I, Jul. 8, 1991. pp. 587-592.
Kim, Dongsun et al. "A SIMD Neural Network Processor for Image Processing." *Network and Parallel Computing*. Jan. 1, 2005. vol. 3497, pp. 665-672.
Anonymous. "Victim Cache." Nov. 22, 2016 pp. 1-3. Retrieved from the internet: https://en.wikipedia.org/w/index.php?title=Victim_cache&oldid=750969097. Retrieved on Jun. 22, 2017.
Oh, Kyoung-Su et al. "GPU Implementation of Neural Networks." *Pattern Recognition The Journal of the Pattern Recognition Society*. vol. 37, No. 6, Jun. 2, 2004. pp. 1311-1314 XP004505331.
Peemen, Maurice et al. "Memory-Centric Accelerator Design for Convolutional Neural Networks." 2013 IEEE 31st International Conference on Computer Design (ICCD). Oct. 1, 2013. pp. 13-19. XP055195589.
Extended European Search Report (EESR) dated Nov. 16, 2017 for EP application No. 17165216.7 filed on Apr. 6, 2017. pp. 1-13.
Gupta, Suyog et al. "Deep Learning with Limited Numerical Precision." ARXIV.ORG, Cornell University Library, 201 Olin Library Cornell University Ithaca, NY 14853. Feb. 9, 2015. XP080677454. pp. 1-10.

* cited by examiner

FIG. 4

| ADDRESS | INSTRUCTION | CLOCKS |
|---|---|---|
| 0 | INITIALIZE NPU | 1 |
| 1 | MULT-ACCUM  DR ROW 17, WR ROW 0 | 1 |
| 2 | MULT-ACCUM  ROTATE, WR ROW +1, COUNT = 511 | 511 |
| 3 | ACTIVATION FUNCTION | 1 |
| 4 | WRITE AFU OUTPUT TO DR ROW 16 | 1 |

FIG. 5

| CLK | NPU 0 | NPU 1 | • • • | NPU 511 |
|---|---|---|---|---|
| 0 | ACC = 0 | ACC = 0 | | ACC = 0 |
| 1 | ACC += DR:17,0 * WR:0,0 | ACC += DR:17,1 * WR:0,1 | | ACC += DR:17,511 * WR:0,511 |
| 2 | ACC += MREG:511 * WR:1,0 | ACC += MREG:0 * WR:1,1 | | ACC += MREG:510 * WR:1,511 |
| 3 | ACC += MREG:511 * WR:2,0 | ACC += MREG:0 * WR:2,1 | | ACC += MREG:510 * WR:2,511 |
| | | • • • | | |
| 512 | ACC += MREG:511 * WR:511,0 | ACC += MREG:0 * WR:511,1 | | ACC += MREG:510 * WR:511,511 |
| 513 | AFU (ACC) | AFU (ACC) | | AFU (ACC) |
| 514 | WRITE AFU OUTP TO DR:16,0 | WRITE AFU OUTP TO DR:16,1 | | WRITE AFU OUTP TO DR:16,511 |

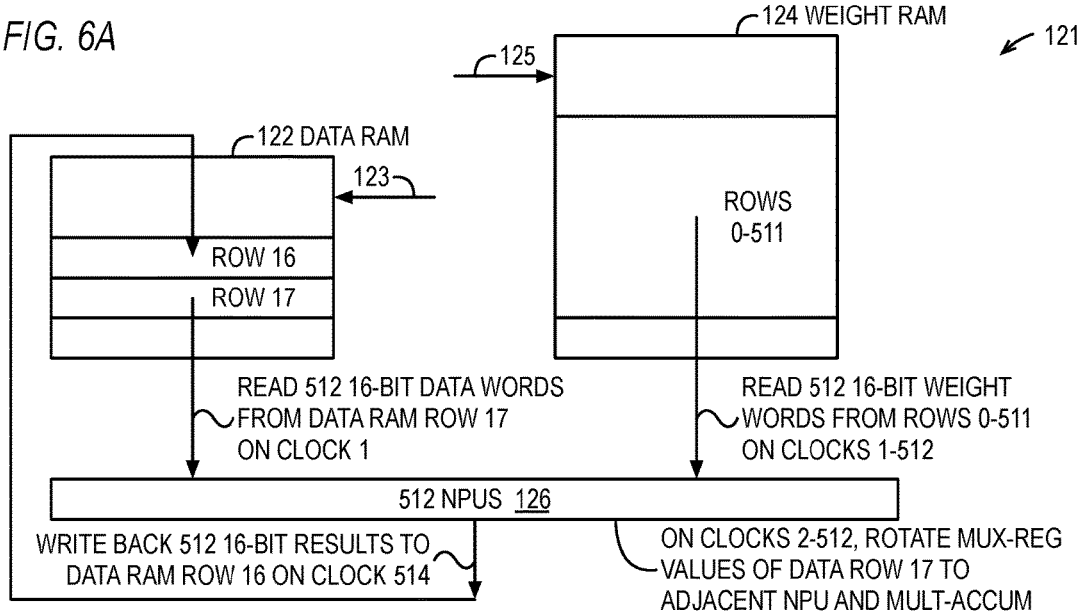

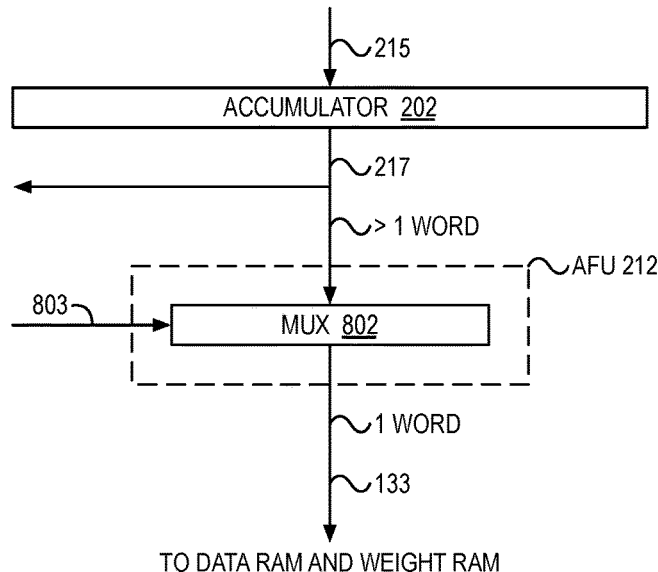

FIG. 9

| ADDRESS | INSTRUCTION | CLOCKS |
|---|---|---|
| 0 | INITIALIZE NPU | 1 |
| 1 | MULT-ACCUM DR ROW 17, WR ROW 0 | 1 |
| 2 | MULT-ACCUM ROTATE, WR ROW +1, COUNT = 511 | 511 |
| 3 | WRITE ACC TO DR ROW 16 | 1 |
| 4 | WRITE ACC TO DR ROW 17 | 1 |
| 5 | WRITE ACC TO DR ROW 18 | 1 |

FIG. 10

| CLK | NPU 0 | NPU 1 | ... | NPU 511 |
|---|---|---|---|---|
| 0 | ACC = 0 | ACC = 0 | | ACC = 0 |
| 1 | ACC += DR:17,0 * WR:0,0 | ACC += DR:17,1 * WR:0,1 | | ACC += DR:17,511 * WR:0,511 |
| 2 | ACC += MREG:511 * WR:1,0 | ACC += MREG:0 * WR:1,1 | | ACC += MREG:510 * WR:1,511 |
| 3 | ACC += MREG:511 * WR:2,0 | ACC += MREG:0 * WR:2,1 | | ACC += MREG:510 * WR:2,511 |
| | ... | | | |
| 512 | ACC += MREG:511 * WR:511,0 | ACC += MREG:0 * WR:511,1 | | ACC += MREG:510 * WR:511,511 |
| 513 | WRITE ACC[15:00] TO DATA RAM ROW 16 | | | |
| 514 | WRITE ACC[31:16] TO DATA RAM ROW 17 | | | |
| 515 | WRITE ACC[47:32] TO DATA RAM ROW 18 | | | |

FIG. 20

| ADDRESS | INSTRUCTION | CLOCKS |
|---|---|---|
| 0 | INITIALIZE NPU NARROW | 1 |
| 1 | MULT-ACCUM  DR ROW 17, WR ROW 0 | 1 |
| 2 | MULT-ACCUM  ROTATE, WR ROW +1, COUNT = 1023 | 1023 |
| 3 | ACTIVATION FUNCTION | 1 |
| 4 | WRITE AFU OUTPUT TO DR ROW 16 | 1 |

FIG. 21

| CLK | NPU 0-A | NPU 0-B | ••• | NPU 511-B |
|---|---|---|---|---|
| 0 | ACC = 0 | ACC = 0 | | ACC = 0 |
| 1 | ACC += DR:17,0 * WR:0,0 | ACC += DR:17,1 * WR:0,1 | | ACC += DR:17,1023 * WR:0,1023 |
| 2 | ACC += MREGB:511 * WR:1,0 | ACC += MREGA:0 * WR:1,1 | | ACC += MREGA:511 * WR:1,1023 |
| 3 | ACC += MREGB:511 * WR:2,0 | ACC += MREGA:0 * WR:2,1 | | ACC += MREGA:511 * WR:2,1023 |
| | | ••• | | |
| 1024 | ACC += MREGB:511 * WR:1023,0 | ACC += MREGA:0 * WR:1023,1 | | ACC += MREGA:511*WR:1023,1023 |
| 1025 | AFU (ACC) | AFU (ACC) | | AFU (ACC) |
| 1026 | WRITE AFU OUTP TO DR:16,0 | WRITE AFU OUTP TO DR:16,1 | | WRITE AFU OUTP TO DR:16,1023 |

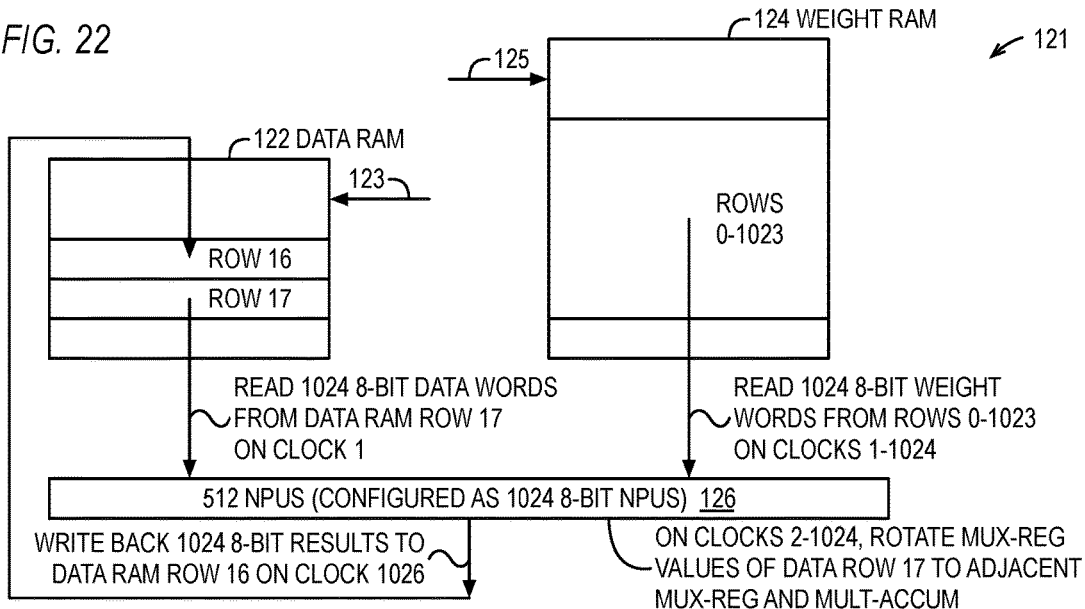

| ADDRESS | INSTRUCTION | CLOCKS |
|---|---|---|
| 0 | INITIALIZE NPU, WR ROW = 0, OUTROW = WR 900, LOOPCNT = 400 | 1 |
| 1 | MULT-ACCUM  DR ROW 0 | 1 |
| 2 | MULT-ACCUM  DR ROW +1, W ROTATE, COUNT = 2 | 2 |
| 3 | MULT-ACCUM  DR ROW +1, WR ROW +1 | 1 |
| 4 | MULT-ACCUM  DR ROW +1, W ROTATE, COUNT = 2 | 2 |
| 5 | MULT-ACCUM  DR ROW +1, WR ROW +1 | 1 |
| 6 | MULT-ACCUM  DR ROW +1, W ROTATE, COUNT = 2 | 2 |
| 7 | ACTIVATION FUNCTION, PASS THROUGH | 1 |
| 8 | WRITE AFU OUTPUT TO OUTROW +1 | 1 |
| 9 | DECREMENT WR ROW | 1 |
| 10 | LOOP TO 1 | 1 |

| |
|---|
| ADDRESS OF MOST RECENTLY WRITTEN WEIGHT RAM ROW 2602 |
| ADDRESS OF MOST RECENTLY READ WEIGHT RAM ROW 2604 |
| ADDRESS OF MOST RECENTLY WRITTEN DATA RAM ROW 2606 |
| ADDRESS OF MOST RECENTLY READ DATA RAM ROW 2608 |

FIG. 27

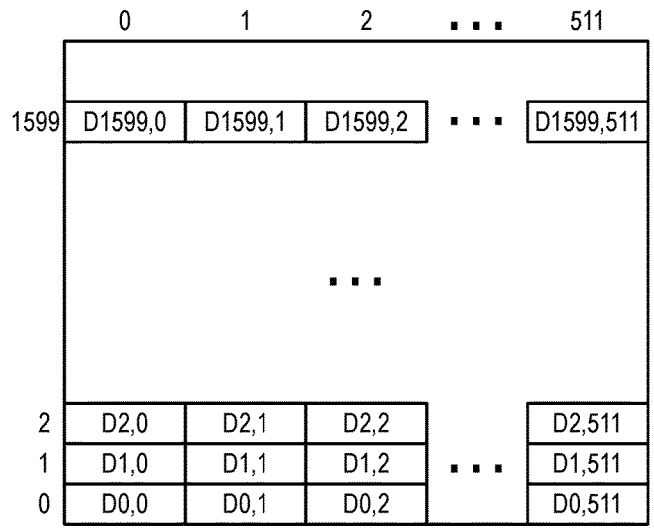

FIG. 28

| ADDRESS | INSTRUCTION | CLOCKS |
| --- | --- | --- |
| 0 | INITIALIZE NPU, WR ROW = 0, OUTROW = WR 0, LOOPCNT = 400 | 1 |
| 1 | MAXWACC | 1 |
| 2 | MAXWACC W ROTATE, COUNT = 3 | 2 |
| 3 | MAXWACC WR ROW +1 | 1 |
| 4 | MAXWACC W ROTATE, COUNT = 3 | 2 |
| 5 | MAXWACC WR ROW +1 | 1 |
| 6 | MAXWACC W ROTATE, COUNT = 3 | 2 |
| 7 | MAXWACC WR ROW +1 | 1 |
| 8 | MAXWACC W ROTATE, COUNT = 3 | 2 |
| 9 | ACTIVATION FUNCTION, PASS THROUGH | 1 |
| 10 | WRITE AFU OUTPUT TO OUTROW +1 | 1 |
| 11 | LOOP TO 1 | 1 |

* ONLY EVERY FOURTH NPU (I.E., 0, 4, 8, ETC.) PRODUCES A VALID RESULT, AND THE NUMBER OF OUTPUT ROWS IS ONE-FOURTH THE NUMBER OF INPUT ROWS, AND THE DATA RAM IS NOT USED

*FIG. 29A*  ⟵ 127

| CONFIGURATION (NARROW, WIDE, FUNNEL) 2902 |
|---|
| SIGNED DATA 2912 |
| SIGNED WEIGHT 2914 |
| DATA BINARY POINT 2922 |
| WEIGHT BINARY POINT 2924 |
| ALU FUNCTION 2926 |
| ROUND CONTROL 2932 |
| ACTIVATION FUNCTION 2934 |
| RECIPROCAL 2942 |
| SHIFT AMOUNT 2944 |
| OUTPUT RAM 2952 |
| OUTPUT BINARY POINT 2954 |
| OUTPUT COMMAND 2956 |

*FIG. 29B*  ⟵ 127

| ACCUMULATOR BINARY POINT 2923 |
|---|

*FIG. 29C*  ⟵ 2942

| NUMBER OF SUPPRESSED LEADING ZEROES 2962 |
|---|
| LEADING ZERO-SUPPRESSED RECIPROCAL 2964 |

FIG. 31

CONFIGURATION = NARROW (8-BIT), SIGNED DATA = TRUE, SIGNED WEIGHT = TRUE
DATA BINARY POINT = 7 (FIRST DATA WORD)     0.1001110
WEIGHT BINARY POINT = 3 (FIRST WEIGHT WORD)     00001.010
IMPLIED MULTIPLY FORMAT (VALUE AFTER FIRST MULTIPLY)     000000.1100001100
ACCUMULATOR AFTER ALL MULTIPLY-ACCUMULATES     00000000000000001.1101010100
OUTPUT BINARY POINT = 7, ROUNDED AND COMPRESSED TO CANONICAL FORM
    000000001.1101011

ROUND CONTROL = STOCHASTIC, AND RANDOM BIT WAS TRUE, SO ROUND UP

ACTIVATION FUNCTION = SIGMOID, SO COMPRESS TO 3.4 FORM     001.1101
SIGMOID OUTPUT IN CANONICAL FORM     000000000000.1101110
OUTPUT COMMAND = NARROW WORD SIZE     01101110

FIG. 32

CONFIGURATION = NARROW (8-BIT)
ACCUMULATOR AFTER ALL ALU OPERATIONS (ACCUMULATOR BINARY POINT = 10)
    000001100000011011.1101111010
OUTPUT BINARY POINT = 4, SATURATED AND COMPRESSED TO CANONICAL FORM
    111111111111.1111
ACTIVATION FUNCTION = PASS-THROUGH CANONICAL
    OUTPUT COMMAND = CANONICAL FORM SIZE, LOWER WORD     11111111
    OUTPUT COMMAND = CANONICAL FORM SIZE, UPPER WORD     11111111

FIG. 33

CONFIGURATION = WIDE (16-BIT)
ACCUMULATOR AFTER ALL ALU OPERATIONS (ACCUMULATOR BINARY POINT = 8)
    00100000000000000001100000011011.11011110
ACTIVATION FUNCTION = PASS-THROUGH FULL RAW ACCUMULATOR
    OUTPUT COMMAND = LOWER WORD     0001101111011110
    OUTPUT COMMAND = MIDDLE WORD     0000000000011000
    OUTPUT COMMAND = UPPER WORD     0000000001000000

NORMAL MODE

RELAXED MODE

PROCESSOR WITH MEMORY ARRAY OPERABLE AS EITHER LAST LEVEL CACHE SLICE OR NEURAL NETWORK UNIT MEMORY

CROSS REFERENCE TO RELATED APPLICATION(S)

This application is related to the following U.S. Non-Provisional Applications, each of which is hereby incorporated by reference in its entirety.

| Serial No. | Filing Date | Title |
| --- | --- | --- |
| 15/090,665 | Apr. 5, 2016 | NEURAL NETWORK UNIT WITH NEURAL MEMORY AND ARRAY OF NEURAL PROCESSING UNITS THAT COLLECTIVELY SHIFT ROW OF DATA RECEIVED FROM NEURAL MEMORY |
| 15/090,666 | Apr. 5, 2016 | TRI-CONFIGURATION NEURAL NETWORK UNIT |
| 15/090,669 | Apr. 5, 2016 | PROCESSOR WITH ARCHITECTURAL NEURAL NETWORK EXECUTION UNIT |
| 15/090,672 | Apr. 5, 2016 | NEURAL NETWORK UNIT WITH NEURAL PROCESSING UNITS DYNAMICALLY CONFIGURABLE TO PROCESS MULTIPLE DATA SIZES |
| 15/090,678 | Apr. 5, 2016 | NEURAL PROCESSING UNIT THAT SELECTIVELY WRITES BACK TO NEURAL MEMORY EITHER ACTIVATION FUNCTION OUTPUT OR ACCUMULATOR VALUE |
| 15/090,691 | Apr. 5, 2016 | NEURAL NETWORK UNIT WITH SHARED ACTIVATION FUNCTION UNITS |
| 15/090,696 | Apr. 5, 2016 | NEURAL NETWORK UNIT EMPLOYING USER-SUPPLIED RECIPROCAL FOR NORMALIZING AN ACCUMULATED VALUE |
| 15/090,701 | Apr. 5, 2016 | PROCESSOR WITH VARIABLE RATE EXECUTION UNIT |
| 15/090,705 | Apr. 5, 2016 | MECHANISM FOR COMMUNICATION BETWEEN ARCHITECTURAL PROGRAM RUNNING ON PROCESSOR AND NON-ARCHITECTURAL PROGRAM RUNNING ON EXECUTION UNIT OF THE PROCESSOR REGARDING SHARED RESOURCE |
| 15/090,708 | Apr. 5, 2016 | DIRECT EXECUTION BY AN EXECUTION UNIT OF A MICRO-OPERATION LOADED INTO AN ARCHITECTURAL REGISTER FILE BY AN ARCHITECTURAL INSTRUCTION OF A PROCESSOR |
| 15/090,712 | Apr. 5, 2016 | MULTI-OPERATION NEURAL NETWORK UNIT |
| 15/090,722 | Apr. 5, 2016 | NEURAL NETWORK UNIT THAT PERFORMS CONVOLUTIONS USING COLLECTIVE SHIFT REGISTER AMONG ARRAY OF NEURAL PROCESSING UNITS |
| 15/090,727 | Apr. 5, 2016 | NEURAL NETWORK UNIT WITH PLURALITY OF SELECTABLE OUTPUT FUNCTIONS |
| 15/090,794 | Apr. 5, 2016 | NEURAL NETWORK UNIT THAT PERFORMS STOCHASTIC ROUNDING |
| 15/090,796 | Apr. 5, 2016 | APPARATUS EMPLOYING USER-SPECIFIED BINARY POINT FIXED POINT ARITHMETIC |
| 15/090,798 | Apr. 5, 2016 | PROCESSOR WITH HYBRID COPROCESSOR/EXECUTION UNIT NEURAL NETWORK UNIT |
| 15/090,801 | Apr. 5, 2016 | NEURAL NETWORK UNIT WITH OUTPUT BUFFER FEEDBACK AND MASKING CAPABILITY |
| 15/090,807 | Apr. 5, 2016 | NEURAL NETWORK UNIT THAT PERFORMS CONCURRENT LSTM CELL CALCULATIONS |
| 15/090,814 | Apr. 5, 2016 | NEURAL NETWORK UNIT WITH OUTPUT BUFFER FEEDBACK FOR PERFORMING RECURRENT NEURAL NETWORK COMPUTATIONS |
| 15/090,823 | Apr. 5, 2016 | NEURAL NETWORK UNIT WITH NEURAL MEMORY AND ARRAY OF NEURAL PROCESSING UNITS AND SEQUENCER THAT COLLECTIVELY SHIFT ROW OF DATA RECEIVED FROM NEURAL MEMORY |
| 15/090,829 | Apr. 5, 2016 | NEURAL NETWORK UNIT WITH OUTPUT BUFFER FEEDBACK AND MASKING CAPABILITY WITH PROCESSING UNIT GROUPS THAT OPERATE AS RECURRENT NEURAL NETWORK LSTM CELLS |

Each of the above Non-Provisional applications claims priority based on the following U.S. Provisional Applications, each of which is hereby incorporated by reference in its entirety.

| Serial No. | Filing Date | Title |
|---|---|---|
| 62/239,254 | Oct. 8, 2015 | PROCESSOR WITH NEURAL NETWORK UNIT |
| 62/262,104 | Dec. 2, 2015 | PROCESSOR WITH VARIABLE RATE EXECUTION UNIT |
| 62/299,191 | Feb. 4, 2016 | MECHANISM FOR COMMUNICATION BETWEEN ARCHITECTURAL PROGRAM RUNNING ON PROCESSOR AND NON-ARCHITECTURAL PROGRAM RUNNING ON EXECUTION UNIT OF THE PROCESSOR REGARDING SHARED RESOURCE; NEURAL NETWORK UNIT WITH OUTPUT BUFFER FEEDBACK AND MASKING CAPABILITY, AND THAT PERFORMS CONCURRENT LSTM CELL CALCULATIONS, AND WITH OUTPUT BUFFER FEEDBACK FOR PERFORMING RECURRENT NEURAL NETWORK COMPUTATIONS |

This application is also related to the following concurrently filed U.S. Non-Provisional Applications, each of which is hereby incorporated by reference in its entirety.

| Serial No. | Title |
|---|---|
| VAS.3085 | PROCESSOR WITH MEMORY ARRAY OPERABLE AS EITHER CACHE MEMORY OR NEURAL NETWORK UNIT MEMORY |
| VAS.3095 | PROCESSOR WITH MEMORY ARRAY OPERABLE AS EITHER LAST LEVEL CACHE SLICE OR NEURAL NETWORK UNIT MEMORY |
| VAS.3099 | PROCESSOR WITH MEMORY ARRAY OPERABLE AS EITHER VICTIM CACHE OR NEURAL NETWORK UNIT MEMORY |
| VAS.3087 | NEURAL NETWORK UNIT THAT PERFORMS EFFICIENT 3-DIMENSIONAL CONVOLUTIONS |
| VAS.3094 | NEURAL NETWORK UNIT WITH MEMORY LAYOUT TO PERFORM EFFICIENT 3-DIMENSIONAL CONVOLUTIONS |
| VAS.3071 | NEURAL NETWORK UNIT WITH NEURAL MEMORY AND ARRAY OF NEURAL PROCESSING UNITS THAT COLLECTIVELY PERFORM MULTI-WORD DISTANCE ROTATES OF ROW OF DATA RECEIVED FROM NEURAL MEMORY |

BACKGROUND

Recently, there has been a resurgence of interest in artificial neural networks (ANN), and such research has commonly been termed deep learning, computer learning and similar terms. The increase in general-purpose processor computation power has given rise to the renewed interest that waned a couple of decades ago. Recent applications of ANNs have included speech and image recognition, along with others. There appears to be an increasing demand for improved performance and efficiency of computations associated with ANNs.

BRIEF DESCRIPTION OF THE DRAWINGS

FIG. 4 is a table illustrating a program for storage in the program memory of and execution by the NNU of FIG. 1.

FIG. 5 is a timing diagram illustrating the execution of the program of FIG. 4 by the NNU.

FIG. 6A is a block diagram illustrating the NNU of FIG. 1 to execute the program of FIG. 4.-

FIG. 8 is a block diagram illustrating a NPU of FIG. 1 according to an alternate embodiment.

FIG. 9 is a table illustrating a program for storage in the program memory of and execution by the NNU of FIG. 1.

FIG. 10 is a timing diagram illustrating the execution of the program of FIG. 9 by the NNU.

FIG. 20 is a table illustrating a program for storage in the program memory of and execution by the NNU of FIG. 1 having NPUs according to the embodiment of FIG. 18.

FIG. 21 is a timing diagram illustrating the execution of the program of FIG. 20 by the NNU that includes NPUs of FIG. 18 operating in a narrow configuration.

FIG. 22 is a block diagram illustrating the NNU of FIG. 1 including the NPUs of FIG. 18 to execute the program of FIG. 20.

FIG. 26A is a program listing of an NNU program that performs a convolution of a data matrix with the convolution kernel of FIG. 24 and writes it back to the weight RAM.

FIG. 26B is a block diagram illustrating certain fields of the control register of the NNU of FIG. 1 according to one embodiment.

FIG. 27 is a block diagram illustrating an example of the weight RAM of FIG. 1 populated with input data upon which a pooling operation is performed by the NNU of FIG. 1.

FIG. 28 is a program listing of an NNU program that performs a pooling operation of the input data matrix of FIG. 27 and writes it back to the weight RAM.

FIG. 29A is a block diagram illustrating an embodiment of the control register of FIG. 1.

FIG. 29B is a block diagram illustrating an embodiment of the control register of FIG. 1 according to an alternate embodiment.

FIG. 29C is a block diagram illustrating an embodiment of the reciprocal of FIG. 29A stored as two parts according to one embodiment.

FIG. 31 is an example of operation of the AFU of FIG. 30.

FIG. 32 is a second example of operation of the AFU of FIG. 30.

FIG. 33 is a third example of operation of the AFU of FIG. 30.

DETAILED DESCRIPTION OF THE EMBODIMENTS

Processor with Architectural Neural Network Unit

Figure 1:
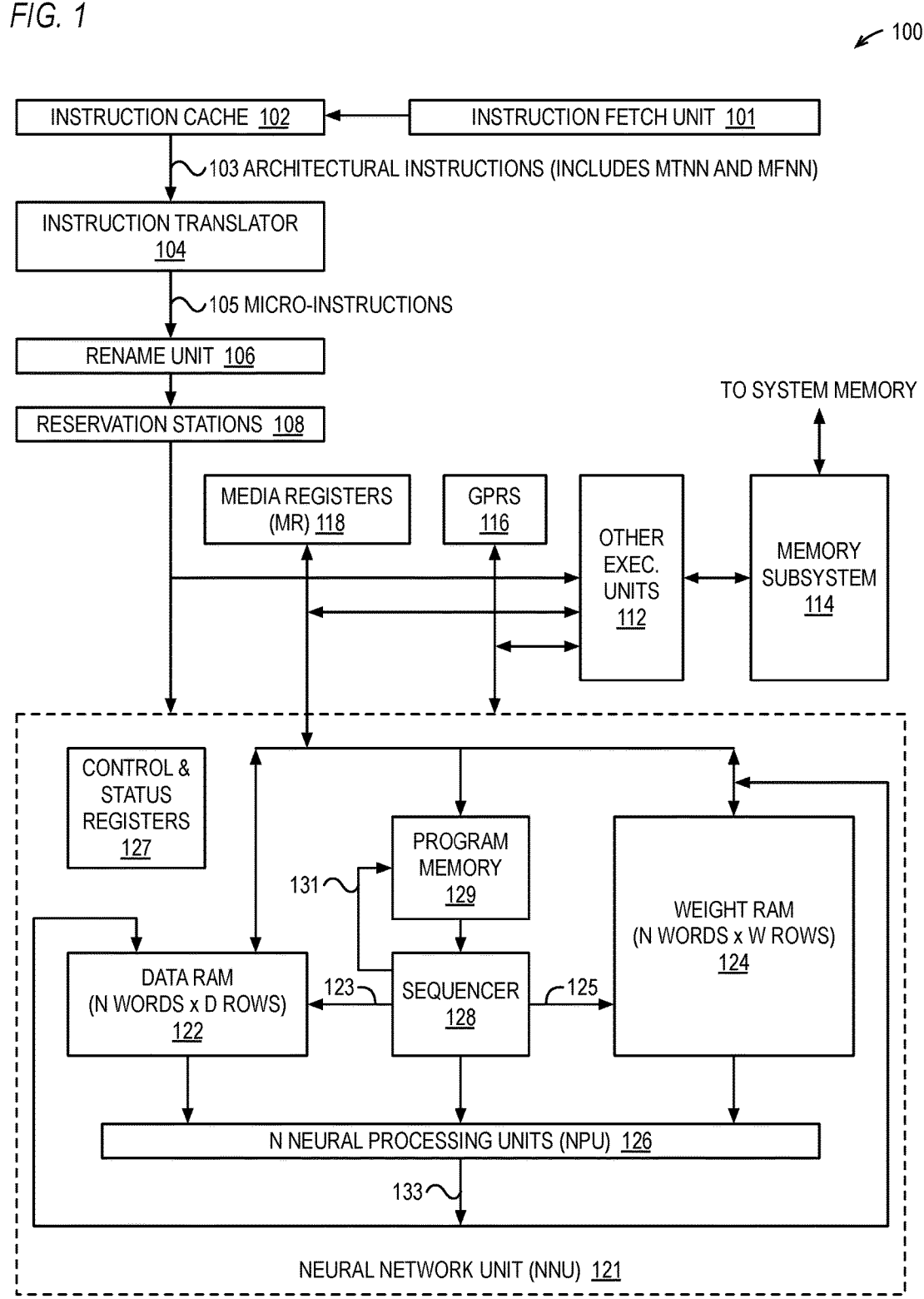
FIG. 1 is a block diagram illustrating a processor that includes a neural network unit (NNU).

Referring now to FIG. 1, a block diagram illustrating a processor 100 that includes a neural network unit (NNU) 121 is shown. The processor 100 includes an instruction fetch unit 101, an instruction cache 102, and instruction translator 104, a rename unit 106, reservation stations 108, media registers 118, general purpose registers (GPR) 116, execution units 112 other than the NNU 121, and a memory subsystem 114.

The processor 100 is an electronic device that functions as a central processing unit (CPU) on an integrated circuit. The processor 100 receives digital data as input, processes the data according to instructions fetched from a memory, and generates results of operations prescribed by the instructions as output. The processor 100 may be employed in a desktop, mobile, or tablet computer, and is employed for uses such as computation, text editing, multimedia display, and Internet browsing. The processor 100 may also be disposed in an embedded system to control a wide variety of devices including appliances, mobile telephones, smart phones, automobiles and industrial control devices. A CPU is the electronic circuits (i.e., "hardware") that execute the instructions of a computer program (also known as a "computer application" or "application") by performing operations on data that include arithmetic operations, logical operations, and input/output operations. An integrated circuit (IC) is a set of electronic circuits fabricated on a small piece of semiconductor material, typically silicon. An IC is also referred to as a chip, a microchip, or a die.

The instruction fetch unit 101 controls the fetching of architectural instructions 103 from system memory (not shown) into the instruction cache 102. The instruction fetch unit 101 provides a fetch address to the instruction cache 102 that specifies a memory address at which the processor 100 fetches a cache line of architectural instruction bytes into the instruction cache 102. The fetch address is based on the current value of the instruction pointer (not shown), or program counter, of the processor 100. Normally, the program counter is incremented sequentially by the size of an instruction unless a control instruction is encountered in the instruction stream, such as a branch, call or return instruction, or an exception condition occurs, such as an interrupt, trap, exception or fault, in which case the program counter is updated with a non-sequential address, such as a branch target address, return address or exception vector. Generally speaking, the program counter is updated in response to the execution of instructions by the execution units 112/121. The program counter may also be updated in response to detection of an exception condition such as the instruction translator 104 encountering an instruction 103 that is not defined by the instruction set architecture of the processor 100.

The instruction cache 102 caches the architectural instructions 103 fetched from a system memory that is coupled to the processor 100. The architectural instructions 103 include a move to neural network (MTNN) instruction and a move from neural network (MFNN) instruction, which are described in more detail below. In one embodiment, the architectural instructions 103 are instructions of the x86 instruction set architecture (ISA), with the addition of the MTNN and MFNN instructions. In the context of the present disclosure, an x86 ISA processor as a processor that generates the same results at the instruction set architecture level that an Intel® 80386® processor generates when it executes the same machine language instructions. However, other embodiments contemplate other instruction set architectures, such as Advanced RISC Machines (ARM)®, Sun SPARC®, or PowerPC®. The instruction cache 102 provides the architectural instructions 103 to the instruction translator 104, which translates the architectural instructions 103 into microinstructions 105.

The microinstructions 105 are provided to the rename unit 106 and eventually executed by the execution units 112/121. The microinstructions 105 implement the architectural instructions. Preferably, the instruction translator 104 includes a first portion that translates frequently executed and/or relatively less complex architectural instructions 103 into microinstructions 105. The instruction translator 104 also includes a second portion that includes a microcode unit (not shown). The microcode unit includes a microcode memory that holds microcode instructions that implement complex and/or infrequently used instructions of the architectural instruction set. The microcode unit also includes a microsequencer that provides a non-architectural microprogram counter (micro-PC) to the microcode memory. Preferably, the microcode instructions are translated by a microtranslator (not shown) into the microinstructions 105. A selector selects the microinstructions 105 from either the first portion or the second portion for provision to the rename unit 106, depending upon whether or not the microcode unit currently has control.

The rename unit 106 renames architectural registers specified in the architectural instructions 103 to physical registers of the processor 100. Preferably, the processor 100 includes a reorder buffer (not shown). The rename unit 106 allocates, in program order, an entry in the reorder buffer for each microinstruction 105. This enables the processor 100 to retire the microinstructions 105, and their corresponding architectural instructions 103, in program order. In one embodiment, the media registers 118 are 256 bits wide and the GPR 116 are 64 bits wide. In one embodiment, the media registers 118 are x86 media registers, such as Advanced Vector Extensions (AVX) registers.

In one embodiment, each entry in the reorder buffer includes storage for the result of the microinstruction 105; additionally, the processor 100 includes an architectural register file that includes a physical register for each of the architectural registers, e.g., the media registers 118 and the GPR 116 and other architectural registers. (Preferably, there are separate register files for the media registers 118 and GPR 116, for example, since they are different sizes.) For each source operand of a microinstruction 105 that specifies an architectural register, the rename unit populates the source operand field in the microinstruction 105 with the reorder buffer index of the newest older microinstruction 105 that writes to the architectural register. When the execution unit 112/121 completes execution of the microinstruction 105, it writes the result to the microinstruction's 105 reorder buffer entry. When the microinstruction 105 retires, a retire unit (not shown) writes the result from the microinstruction's reorder buffer entry to the register of the physical register file associated with the architectural destination register specified by the retiring microinstruction 105.

In another embodiment, the processor 100 includes a physical register file that includes more physical registers than the number of architectural registers, but does not include an architectural register file, and the reorder buffer entries do not include result storage. (Preferably, there are separate physical register files for the media registers 118 and GPR 116, for example, since they are different sizes.) The processor 100 also includes a pointer table with an associated pointer for each architectural register. For the operand of a microinstruction 105 that specifies an architectural register, the rename unit populates the destination operand field in the microinstruction 105 with a pointer to a free register in the physical register file. If no registers are free in the physical register file, the rename unit 106 stalls the pipeline. For each source operand of a microinstruction 105 that specifies an architectural register, the rename unit populates the source operand field in the microinstruction 105 with a pointer to the register in the physical register file assigned to the newest older microinstruction 105 that writes to the architectural register. When the execution unit 112/121 completes execution of the microinstruction 105, it writes the result to a register of the physical register file pointed to by the microinstruction's 105 destination operand field. When the microinstruction 105 retires, the retire unit copies the microinstruction's 105 destination operand field value to the pointer in the pointer table associated with the architectural destination register specified by the retiring microinstruction 105.

The reservation stations 108 hold microinstructions 105 until they are ready to be issued to an execution unit 112/121 for execution. A microinstruction 105 is ready to be issued when all of its source operands are available and an execution unit 112/121 is available to execute it. The execution units 112/121 receive register source operands from the reorder buffer or the architectural register file in the first embodiment or from the physical register file in the second embodiment described above. Additionally, the execution units 112/121 may receive register source operands directly from the execution units 112/121 via result forwarding buses (not shown). Additionally, the execution units 112/121 may receive from the reservation stations 108 immediate operands specified by the microinstructions 105. As discussed in more detail below, the MTNN and MFNN architectural instructions 103 include an immediate operand that specifies a function to be performed by the NNU 121 that is provided in one of the one or more microinstructions 105 into which the MTNN and MFNN architectural instructions 103 are translated.

The execution units 112 include one or more load/store units (not shown) that load data from the memory subsystem 114 and store data to the memory subsystem 114. Preferably, the memory subsystem 114 includes a memory management unit (not shown), which may include, e.g., translation lookaside buffers and a tablewalk unit, a level-1 data cache (and the instruction cache 102), a level-2 unified cache, and a bus interface unit that interfaces the processor 100 to system memory. In one embodiment, the processor 100 of FIG. 1 is representative of a processing core that is one of multiple processing cores in a multi-core processor that share a last-level cache memory. The execution units 112 may also include integer units, media units, floating-point units and a branch unit.

The NNU 121 includes a weight random access memory (RAM) 124, a data RAM 122, N neural processing units (NPUs) 126, a program memory 129, a sequencer 128 and control and status registers 127. The NPUs 126 function conceptually as neurons in a neural network. The weight RAM 124, data RAM 122 and program memory 129 are all writable and readable via the MTNN and MFNN architectural instructions 103, respectively. The weight RAM 124 is arranged as W rows of N weight words, and the data RAM 122 is arranged as D rows of N data words. Each data word and each weight word is a plurality of bits, preferably 8 bits, 9 bits, 12 bits or 16 bits. Each data word functions as the output value (also sometimes referred to as an activation) of a neuron of the previous layer in the network, and each weight word functions as a weight associated with a connection coming into a neuron of the instant layer of the network. Although in many uses of the NNU 121 the words, or operands, held in the weight RAM 124 are in fact weights associated with a connection coming into a neuron, it should be understood that in other uses of the NNU 121 the words held in the weight RAM 124 are not weights, but are nevertheless referred to as "weight words" because they are stored in the weight RAM 124. For example, in some uses of the NNU 121, e.g., the convolution example of FIGS. 24 through 26A or the pooling example of FIGS. 27 through 28, the weight RAM 124 may hold non-weights, such as elements of a data matrix, e.g., image pixel data. Similarly, although in many uses of the NNU 121 the words, or operands, held in the data RAM 122 are in fact the output value, or activation, of a neuron, it should be understood that in other uses of the NNU 121 the words held in the data RAM 122 are not such, but are nevertheless referred to as "data words" because they are stored in the data RAM 122. For example, in some uses of the NNU 121, e.g., the convolution example of FIGS. 24 through 26A, the data RAM 122 may hold non-neuron outputs, such as elements of a convolution kernel.

In one embodiment, the NPUs 126 and sequencer 128 comprise combinatorial logic, sequential logic, state machines, or a combination thereof. An architectural instruction (e.g., MFNN instruction 1500) loads the contents of the status register 127 into one of the GPR 116 to determine the status of the NNU 121, e.g., that the NNU 121 has completed a command or completed a program the NNU 121 was running from the program memory 129, or that the NNU 121 is free to receive a new command or start a new NNU program.

Advantageously, the number of NPUs 126 may be increased as needed, and the size of the weight RAM 124 and data RAM 122 may be extended in both width and depth accordingly. Preferably, the weight RAM 124 is larger since in a classic neural network layer there are many connections, and therefore weights, associated with each neuron. Various embodiments are described herein regarding the size of the data and weight words and the sizes of the weight RAM 124 and data RAM 122 and the number of NPUs 126. In one embodiment, a NNU 121 with a 64 KB (8192 bits×64 rows) data RAM 122, a 2 MB (8192 bits×2048 rows) weight RAM 124, and 512 NPUs 126 is implemented in a Taiwan Semiconductor Manufacturing Company, Limited (TSMC) 16 nm process and occupies approximately a 3.3 mm² area.

The sequencer 128 fetches instructions from the program memory 129 and executes them, which includes, among other things, generating address and control signals for provision to the data RAM 122, weight RAM 124 and NPUs 126. The sequencer 128 generates a memory address 123 and a read command for provision to the data RAM 122 to select one of the D rows of N data words for provision to the N NPUs 126. The sequencer 128 also generates a memory address 125 and a read command for provision to the weight RAM 124 to select one of the W rows of N weight words for provision to the N NPUs 126. The sequence of the addresses 123 and 125 generated by the sequencer 128 for provision to the NPUs 126 determines the "connections" between neurons. The sequencer 128 also generates a memory address 123 and a write command for provision to the data RAM 122 to select one of the D rows of N data words for writing from the N NPUs 126. The sequencer 128 also generates a memory address 125 and a write command for provision to the weight RAM 124 to select one of the W rows of N weight words for writing from the N NPUs 126. The sequencer 128 also generates a memory address 131 to the program memory 129 to select a NNU instruction that is provided to the sequencer 128, such as described below. The memory address 131 corresponds to a program counter (not shown) that the sequencer 128 generally increments through sequential locations of the program memory 129 unless the sequencer 128 encounters a control instruction, such as a loop instruction (see, for example, FIG. 26A), in which case the sequencer 128 updates the program counter to the target address of the control instruction. The sequencer 128 also generates control signals to the NPUs 126 to instruct them to perform various operations or functions, such as initialization, arithmetic/logical operations, rotate and shift operations, activation functions and write back operations, examples of which are described in more detail below (see, for example, micro-operations 3418 of FIG. 34).

The N NPUs 126 generate N result words 133 that may be written back to a row of the weight RAM 124 or to the data RAM 122. Preferably, the weight RAM 124 and the data RAM 122 are directly coupled to the N NPUs 126. More specifically, the weight RAM 124 and data RAM 122 are dedicated to the NPUs 126 and are not shared by the other execution units 112 of the processor 100, and the NPUs 126 are capable of consuming a row from one or both of the weight RAM 124 and data RAM 122 each clock cycle in a sustained manner, preferably in a pipelined fashion. In one embodiment, each of the data RAM 122 and the weight RAM 124 is capable of providing 8192 bits to the NPUs 126 each clock cycle. The 8192 bits may be consumed as 512 16-bit words or as 1024 8-bit words, as described in more detail below.

Advantageously, the size of the data set that may be processed by the NNU 121 is not limited to the size of the weight RAM 124 and data RAM 122, but is rather only limited by the size of system memory since data and weights may be moved between system memory and the weight RAM 124 and data RAM 122 using the MTNN and MFNN instructions (e.g., through the media registers 118). In one embodiment, the data RAM 122 is dual-ported to enable data words to be written to the data RAM 122 while data words are concurrently read from or written to the data RAM 122. Furthermore, the large memory hierarchy of the memory subsystem 114, including the cache memories, provides very high data bandwidth for the transfers between the system memory and the NNU 121. Still further, preferably, the memory subsystem 114 includes hardware data prefetchers that track memory access patterns, such as loads of neural data and weights from system memory, and perform data prefetches into the cache hierarchy to facilitate high bandwidth and low latency transfers to the weight RAM 124 and data RAM 122.

Although embodiments are described in which one of the operands provided to each NPU 126 is provided from a weight memory and is denoted a weight, which are commonly used in neural networks, it should be understood that the operands may be other types of data associated with calculations whose speed may be improved by the apparatuses described.

Figure 2:
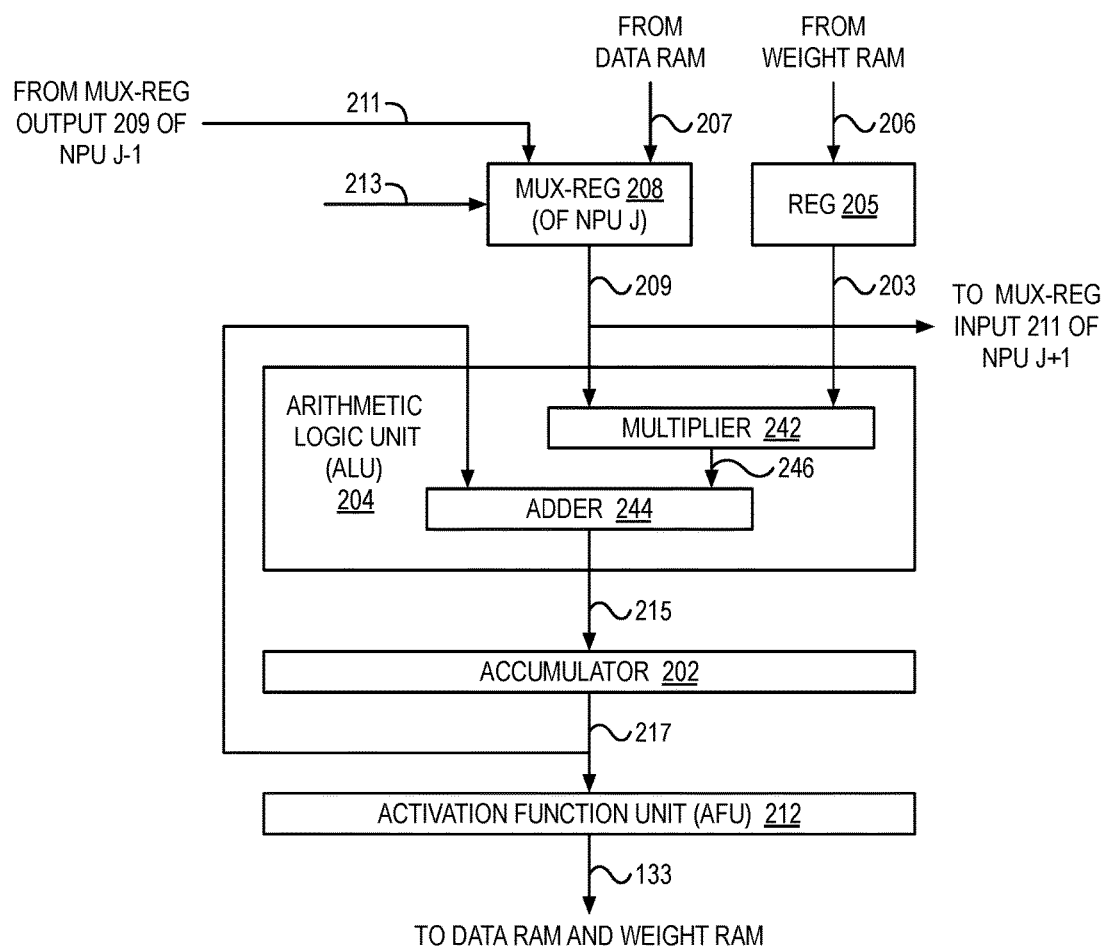
FIG. 2 is a block diagram illustrating a NPU of FIG. 1.

Referring now to FIG. 2, a block diagram illustrating a NPU 126 of FIG. 1 is shown. The NPU 126 operates to perform many functions, or operations. In particular, advantageously the NPU 126 is configured to operate as a neuron, or node, in an artificial neural network to perform a classic multiply-accumulate function, or operation. That is, generally speaking, the NPU 126 (neuron) is configured to: (1) receive an input value from each neuron having a connection to it, typically but not necessarily from the immediately previous layer of the artificial neural network; (2) multiply each input value by a corresponding weight value associated with the connection to generate a product; (3) add all the products to generate a sum; and (4) perform an activation function on the sum to generate the output of the neuron. However, rather than performing all the multiplies associated with all the connection inputs and then adding all the products together as in a conventional manner, advantageously each neuron is configured to perform, in a given clock cycle, the weight multiply operation associated with one of the connection inputs and then add (accumulate) the product with the accumulated value of the products associated with connection inputs processed in previous clock cycles up to that point. Assuming there are M connections to the neuron, after all M products have been accumulated (which takes approximately M clock cycles), the neuron performs the activation function on the accumulated value to generate the output, or result. This has the advantage of requiring fewer multipliers and a smaller, simpler and faster adder circuit (e.g., a 2-input adder) in the neuron than an adder that would be required to add all, or even a subset of, the products associated with all the connection inputs. This, in turn, has the advantage of facilitating a very large number (N) of neurons (NPUs 126) in the NNU 121 so that after approximately M clock cycles, the NNU 121 has generated the output for all of the large number (N) of neurons. Finally, the NNU 121 constructed of such neurons has the advantage of efficiently performing as an artificial neural network layer for a large number of different connection inputs. That is, as M increases or decreases for different layers, the number of clock cycles required to generate the neuron outputs correspondingly increases or decreases, and the resources (e.g., multipliers and accumulators) are fully utilized; whereas, in a more conventional design, some of the multipliers and a portion of the adder may not be utilized for smaller values of M. Thus, the embodiments described herein have the benefit of flexibility and efficiency with respect to the number of connection inputs to the neurons of the NNU 121, and provide extremely high performance.

The NPU 126 includes a register 205, a 2-input multiplexed register (mux-reg) 208, an arithmetic logic unit (ALU) 204, an accumulator 202, and an activation function unit (AFU) 212. The register 205 receives a weight word 206 from the weight RAM 124 and provides its output 203 on a subsequent clock cycle. The mux-reg 208 selects one of its inputs 207 or 211 to store in its register and then to provide on its output 209 on a subsequent clock cycle. One input 207 receives a data word from the data RAM 122. The other input 211 receives the output 209 of the adjacent NPU 126. The NPU 126 shown in FIG. 2 is denoted NPU J from among the N NPUs 126 of FIG. 1. That is, NPU J is a representative instance of the N NPUs 126. Preferably, the mux-reg 208 input 211 of NPU J receives the mux-reg 208 output 209 of NPU 126 instance J−1, and the mux-reg 208 output 209 of NPU J is provided to the mux-reg 208 input 211 of NPU 126 instance J+1. In this manner, the mux-regs 208 of the N NPUs 126 collectively operate as an N-word rotater, or circular shifter, as described in more detail below with respect to FIG. 3. A control input 213 controls which of the two inputs the mux-reg 208 selects to store in its register and that is subsequently provided on the output 209.

The ALU 204 has three inputs. One input receives the weight word 203 from the register 205. Another input receives the output 209 of the mux-reg 208. The other input receives the output 217 of the accumulator 202. The ALU 204 performs arithmetic and/or logical operations on its inputs to generate a result provided on its output. Preferably, the arithmetic and/or logical operations to be performed by the ALU 204 are specified by instructions stored in the program memory 129. For example, the multiply-accumulate instruction of FIG. 4 specifies a multiply-accumulate operation, i.e., the result 215 is the sum of the accumulator 202 value 217 and the product of the weight word 203 and the data word of the mux-reg 208 output 209. Other operations that may be specified include, but are not limited to: the result 215 is the passed-through value of the mux-reg output 209; the result 215 is the passed-through value of the weight word 203; the result 215 is zero; the result 215 is the passed-through value of the weight word 203; the result 215 is the sum of the accumulator 202 value 217 and the weight word 203; the result 215 is the sum of the accumulator 202 value 217 and the mux-reg output 209; the result 215 is the maximum of the accumulator 202 value 217 and the weight word 203; the result 215 is the maximum of the accumulator 202 value 217 and the mux-reg output 209.

The ALU 204 provides its output 215 to the accumulator 202 for storage therein. The ALU 204 includes a multiplier 242 that multiplies the weight word 203 and the data word of the mux-reg 208 output 209 to generate a product 246. In one embodiment, the multiplier 242 multiplies two 16-bit operands to generate a 32-bit result. The ALU 204 also includes an adder 244 that adds the product 246 to the accumulator 202 output 217 to generate a sum, which is the result 215 accumulated in the accumulator 202 for storage in the accumulator 202. In one embodiment, the adder 244 adds the 32-bit result of the multiplier 242 to a 41-bit value 217 of the accumulator 202 to generate a 41-bit result. In this manner, using the rotater aspect of the mux-reg 208 over the course of multiple clock cycles, the NPU 126 accomplishes a sum of products for a neuron as required by neural networks. The ALU 204 may also include other circuit elements to perform other arithmetic/logical operations such as those above. In one embodiment, a second adder subtracts the weight word 203 from the data word of the mux-reg 208 output 209 to generate a difference, which the adder 244 then adds to the accumulator 202 output 217 to generate a sum 215, which is the result accumulated in the accumulator 202. In this manner, over the course of multiple clock cycles, the NPU 126 may accomplish a sum of differences. Preferably, although the weight word 203 and the data word 209 are the same size (in bits), they may have different binary point locations, as described in more detail below. Preferably, the multiplier 242 and adder 244 are integer multipliers and adders, as described in more detail below, to advantageously accomplish less complex, smaller, faster and lower power consuming ALUs 204 than floating-point counterparts. However, it should be understood that in other embodiments the ALU 204 performs floating-point operations.

Although FIG. 2 shows only a multiplier 242 and adder 244 in the ALU 204, preferably the ALU 204 includes other elements to perform the other operations described above. For example, preferably the ALU 204 includes a comparator (not shown) for comparing the accumulator 202 with a data/weight word and a mux (not shown) that selects the larger (maximum) of the two values indicated by the comparator for storage in the accumulator 202. For another example, preferably the ALU 204 includes selection logic (not shown) that bypasses the multiplier 242 with a data/weight word to enable the adder 244 to add the data/weight word to the accumulator 202 value 217 to generate a sum for storage in the accumulator 202. These additional operations are described in more detail below, for example, with respect to FIGS. 18 through 29A, and may be useful for performing convolution and pooling operations, for example.

The AFU 212 receives the output 217 of the accumulator 202. The AFU 212 performs an activation function on the accumulator 202 output 217 to generate a result 133 of FIG. 1. Generally speaking, the activation function in a neuron of an intermediate layer of an artificial neural network may serve to normalize the accumulated sum of products, preferably in a non-linear fashion. To "normalize" the accumulated sum, the activation function of an instant neuron produces a resulting value within a range of values that neurons connected to the instant neuron expect to receive as input. (The normalized result is sometimes referred to as an "activation" that, as described herein, is the output of an instant node that a receiving node multiplies by a weight associated with the connection between the outputting node and the receiving node to generate a product that is accumulated with other products associated with the other input connections to the receiving node.) For example, the receiving/connected neurons may expect to receive as input a value between 0 and 1, in which case the outputting neuron may need to non-linearly squash and/or adjust (e.g., upward shift to transform negative to positive values) the accumulated sum that is outside the 0 to 1 range to a value within the expected range. Thus, the AFU 212 performs an operation on the accumulator 202 value 217 to bring the result 133 within a known range. The results 133 of all of the N NPUs 126 may be written back concurrently to either the data RAM 122 or to the weight RAM 124. Preferably, the AFU 212 is configured to perform multiple activation functions, and an input, e.g., from the control register 127, selects one of the activation functions to perform on the accumulator 202 output 217. The activation functions may include, but are not limited to, a step function, a rectify function, a sigmoid function, a hyperbolic tangent (tan h) function and a softplus function (also referred to as smooth rectify). The softplus function is the analytic function $f(x)=\ln(1+e^x)$, that is, the natural logarithm of the sum of one and $e^x$, where "e" is Euler's number and x is the input 217 to the function. Preferably, the activation functions may also include a pass-through function that passes through the accumulator 202 value 217, or a portion thereof, as described in more detail below. In one embodiment, circuitry of the AFU 212 performs the activation function in a single clock cycle. In one embodiment, the AFU 212 comprises tables that receive the accumulated value and output a value that closely approximates the value that the true activation function would provide for some of the activation functions, e.g., sigmoid, hyperbolic tangent, softplus.

Preferably, the width (in bits) of the accumulator 202 is greater than the width of the AFU 212 output 133. For example, in one embodiment, the accumulator is 41 bits wide, to avoid loss of precision in the accumulation of up to 512 32-bit products (as described in more detail below, e.g., with respect to FIG. 30), and the result 133 is 16 bits wide. In one embodiment, an example of which is described in more detail below with respect to FIG. 8, during successive clock cycles different portions of the "raw" accumulator 202 output 217 value are passed through the AFU 212 and written back to the data RAM 122 or weight RAM 124. This enables the raw accumulator 202 values to be loaded back to the media registers 118 via the MFNN instruction so that instructions executing on other execution units 112 of the processor 100 may perform complex activation functions that the AFU 212 is not capable of performing, such as the well-known softmax activation function, also referred to as the normalized exponential function. In one embodiment, the processor 100 instruction set architecture includes an instruction that performs the exponential function, commonly referred to as $e^x$ or exp(x), which may be used to speed up the performance of the softmax activation function by the other execution units 112 of the processor 100.

In one embodiment, the NPU 126 is pipelined. For example, the NPU 126 may include registers of the ALU 204, such as a register between the multiplier and the adder and/or other circuits of the ALU 204, and a register that holds the output of the AFU 212. Other embodiments of the NPU 126 are described below.

Figure 3:
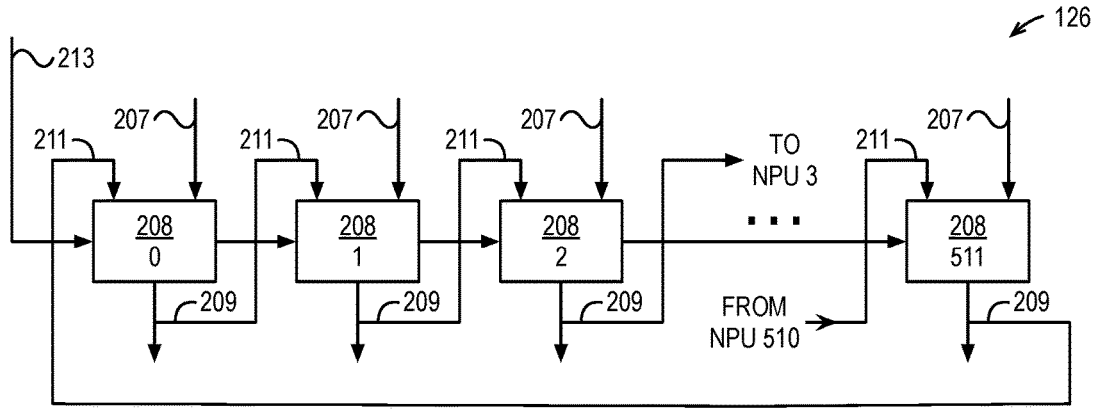
FIG. 3 is a block diagram illustrating an embodiment of the arrangement of the N mux-regs of the N NPUs of the NNU of FIG. 1 to illustrate their operation as an N-word rotater, or circular shifter, for a row of data words received from the data RAM of FIG. 1.

Referring now to FIG. 3, a block diagram illustrating an embodiment of the arrangement of the N mux-regs 208 of the N NPUs 126 of the NNU 121 of FIG. 1 to illustrate their operation as an N-word rotater, or circular shifter, for a row of data words 207 received from the data RAM 122 of FIG. 1 is shown. In the embodiment of FIG. 3, N is 512 such that the NNU 121 has 512 mux-regs 208, denoted 0 through 511, corresponding to 512 NPUs 126, as shown. Each mux-reg 208 receives its corresponding data word 207 of one row of the D rows of the data RAM 122. That is, mux-reg 0 receives data word 0 of the data RAM 122 row, mux-reg 1 receives data word 1 of the data RAM 122 row, mux-reg 2 receives data word 2 of the data RAM 122 row, and so forth to mux-reg 511 receives data word 511 of the data RAM 122 row. Additionally, mux-reg 1 receives on its other input 211 the output 209 of mux-reg 0, mux-reg 2 receives on its other input 211 the output 209 of mux-reg 1, mux-reg 3 receives on its other input 211 the output 209 of mux-reg 2, and so forth to mux-reg 511 that receives on its other input 211 the output 209 of mux-reg 510, and mux-reg 0 receives on its other input 211 the output 209 of mux-reg 511. Each of the mux-regs 208 receives the control input 213 that controls whether to select the data word 207 or the rotated input 211. As described in more detail below, in one mode of operation, on a first clock cycle, the control input 213 controls each of the mux-regs 208 to select the data word 207 for storage in the register and for subsequent provision to the ALU 204; and during subsequent clock cycles (e.g., M−1 clock cycles as described above), the control input 213 controls each of the mux-regs 208 to select the rotated input 211 for storage in the register and for subsequent provision to the ALU 204.

Although FIG. 3 (and FIGS. 7 and 19 below) describe an embodiment in which the NPUs 126 are configured to rotate the values of the mux-regs 208/705 to the right, i.e., from NPU J to NPU J+1, embodiments are contemplated (such as with respect to the embodiment of FIGS. 24 through 26) in which the NPUs 126 are configured to rotate the values of the mux-regs 208/705 to the left, i.e., from NPU J to NPU J−1. Furthermore, embodiments are contemplated in which the NPUs 126 are configured to rotate the values of the mux-regs 208/705 selectively to the left or to the right, e.g., as specified by the NNU instructions.

Referring now to FIG. 4, a table illustrating a program for storage in the program memory 129 of and execution by the NNU 121 of FIG. 1 is shown. The example program performs the calculations associated with a layer of an artificial neural network as described above. In the table of FIG. 4, four rows and three columns are shown. Each row corresponds to an address of the program memory 129 denoted in the first column. The second column specifies the instruction, and the third column indicates the number of clock cycles associated with the instruction. Preferably, the number of clock cycles indicates the effective number of clocks in a clocks-per-instruction type value in a pipelined embodiment, rather than the latency of the instruction. As shown, each of the instructions has an associated one clock cycle due to the pipelined nature of the NNU 121, with the exception of the instruction at address 2 which requires 511 clocks because it effectively repeats itself 511 times, as described in more detail below.

For each instruction of the program, all of the NPUs 126 perform the instruction in parallel. That is, all N NPUs 126 performs the instruction in the first row in the same clock cycle(s), all N NPUs 126 performs the instruction in the second row in the same clock cycle(s), and so forth. However, other embodiments are described below in which some of the instructions are performed in a partially parallel and partially sequential fashion, e.g., the activation function and output instructions at addresses 3 and 4 in an embodiment in which NPUs 126 share an activation function unit, e.g., with respect to the embodiment of FIG. 11. The example of FIG. 4 assumes 512 neurons (NPUs 126) of a layer, each having 512 connection inputs from a previous layer of 512 neurons, for a total of 256K connections. Each neuron receives a 16-bit data value from each connection input and multiplies the 16-bit data value by an appropriate 16-bit weight value.

The first row, at address 0 (although other addresses may be specified), specifies an initialize NPU instruction. The initialize instruction clears the accumulator 202 value to zero. In one embodiment, the initialize instruction can also specify to load the accumulator 202 with the corresponding word of a row of the data RAM 122 or weight RAM 124 whose address is specified by the instruction. The initialize instruction also loads configuration values into the control register 127, as described in more detail below with respect to FIGS. 29A and 29B. For example, the width of the data word 207 and weight word 209 may be loaded, which may be used by the ALU 204 to determine the sizes of the operations performed by the circuits and may affect the result 215 stored in the accumulator 202. In one embodiment, the NPU 126 includes a circuit that saturates the ALU 204 output 215 before being stored in the accumulator 202, and the initialize instruction loads a configuration value into the circuit to affect the saturation. In one embodiment, the accumulator 202 may also be cleared to a zero value by so specifying in an ALU function instruction (e.g., multiply-accumulate instruction at address 1) or an output instruction, such as the write AFU output instruction at address 4.

The second row, at address 1, specifies a multiply-accumulate instruction that instructs the 512 NPUs 126 to load a respective data word from a row of the data RAM 122 and to load a respective weight word from a row of the weight RAM 124, and to perform a first multiply-accumulate operation on the data word input 207 and weight word input 206, which is accumulated with the initialized accumulator 202 zero value. More specifically, the instruction instructs the sequencer 128 to generate a value on the control input 213 to select the data word input 207. In the example of FIG. 4, the specified data RAM 122 row is row 17, and the specified weight RAM 124 row is row 0, which instructs the sequencer 128 to output a data RAM address 123 value of 17 and to output a weight RAM address 125 value of 0. Consequently, the 512 data words from row 17 of the data RAM 122 are provided to the corresponding data input 207 of the 512 NPUs 126 and the 512 weight words from row 0 of the weight RAM 124 are provided to the corresponding weight input 206 of the 512 NPUs 126.

The third row, at address 2, specifies a multiply-accumulate rotate instruction with a count of 511, which instructs each of the 512 NPUs 126 to perform 511 multiply-accumulate operations. The instruction instructs the 512 NPUs 126 that the data word 209 input to the ALU 204 for each of the 511 multiply-accumulate operations is to be the rotated value 211 from the adjacent NPU 126. That is, the instruction instructs the sequencer 128 to generate a value on the control input 213 to select the rotated value 211. Additionally, the instruction instructs the 512 NPUs 126 to load a respective weight word for each of the 511 multiply-accumulate operations from the "next" row of the weight RAM 124. That is, the instruction instructs the sequencer 128 to increment the weight RAM address 125 by one relative to its value in the previous clock cycle, which in the example would be row 1 on the first clock cycle of the instruction, row 2 on the next clock cycle, row 3 on the next clock cycle, and so forth to row 511 on the $511^{th}$ clock cycle. For each of the 511 multiply-accumulate operations, the product of the rotated input 211 and weight word input 206 is accumulated with the previous value in the accumulator 202. The 512 NPUs 126 perform the 511 multiply-accumulate operations in 511 clock cycles, in which each NPU 126 performs a multiply-accumulate operation on a different data word from row 17 of the data RAM 122—namely, the data word operated on by the adjacent NPU 126 in the previous cycle—and a different weight word associated with the data word, which is conceptually a different connection input to the neuron. In the example, it is assumed that the number of connection inputs to each NPU 126 (neuron) is 512, thus involving 512 data words and 512 weight words. Once the last iteration of the multiply-accumulate rotate instruction of row 2 is performed, the accumulator 202 contains the sum of products for all 512 of the connection inputs. In one embodiment, rather than having a separate instruction for each type of ALU operation (e.g., multiply-accumulate, maximum of accumulator and weight word, etc. as described above), the NPU 126 instruction set includes an "execute" instruction that instructs the ALU 204 to perform an ALU operation specified by the initialize NPU instruction, such as specified in the ALU function 2926 of FIG. 29A.

The fourth row, at address 3, specifies an activation function instruction. The activation function instruction instructs the AFU 212 to perform the specified activation function on the accumulator 202 value 217 to generate the result 133. The activation functions according to one embodiment are described in more detail below.

The fifth row, at address 4, specifies a write AFU output instruction that instructs the 512 NPUs 126 to write back their AFU 212 output as results 133 to a row of the data RAM 122, which is row 16 in the example. That is, the instruction instructs the sequencer 128 to output a data RAM address 123 value of 16 and a write command (in contrast to a read command in the case of the multiply-accumulate instruction at address 1). Preferably the execution of the write AFU output instruction may be overlapped with the execution of other instructions in a pipelined nature such that the write AFU output instruction effectively executes in a single clock cycle.

Preferably, each NPU 126 is configured as a pipeline that includes the various functional elements, e.g., the mux-reg 208 (and mux-reg 705 of FIG. 7), ALU 204, accumulator 202, AFU 212, mux 802 (of FIG. 8), row buffer 1104 and AFUs 1112 (of FIG. 11), etc., some of which may themselves be pipelined. In addition to the data words 207 and weight words 206, the pipeline receives the instructions from the program memory 129. The instructions flow down the pipeline and control the various functional units. In an alternate embodiment, the activation function instruction is not included in the program. Rather, the initialize NPU instruction specifies the activation function to be performed on the accumulator 202 value 217, and a value indicating the specified activation function is saved in a configuration register for later use by the AFU 212 portion of the pipeline once the final accumulator 202 value 217 has been generated, i.e., once the last iteration of the multiply-accumulate rotate instruction at address 2 has completed. Preferably, for power savings purposes, the AFU 212 portion of the pipeline is inactive until the write AFU output instruction reaches it, at which time the AFU 212 is powered up and performs the activation function on the accumulator 202 output 217 specified by the initialize instruction.

Referring now to FIG. 5, a timing diagram illustrating the execution of the program of FIG. 4 by the NNU 121 is shown. Each row of the timing diagram corresponds to a successive clock cycle indicated in the first column. Each of the other columns corresponds to a different one of the 512 NPUs 126 and indicates its operation. For simplicity and clarity of illustration, the operations only for NPUs 0, 1 and 511 are shown.

At clock 0, each of the 512 NPUs 126 performs the initialization instruction of FIG. 4, which is illustrated in FIG. 5 by the assignment of a zero value to the accumulator 202.

At clock 1, each of the 512 NPUs 126 performs the multiply-accumulate instruction at address 1 of FIG. 4. NPU 0 accumulates the accumulator 202 value (which is zero) with the product of data RAM 122 row 17 word 0 and weight RAM 124 row 0 word 0; NPU 1 accumulates the accumulator 202 value (which is zero) with the product of data RAM 122 row 17 word 1 and weight RAM 124 row 0 word 1; and so forth to NPU 511 accumulates the accumulator 202 value (which is zero) with the product of data RAM 122 row 17 word 511 and weight RAM 124 row 0 word 511, as shown.

At clock 2, each of the 512 NPUs 126 performs a first iteration of the multiply-accumulate rotate instruction at address 2 of FIG. 4. NPU 0 accumulates the accumulator 202 value with the product of the rotated data word 211 received from the mux-reg 208 output 209 of NPU 511 (which was data word 511 received from the data RAM 122) and weight RAM 124 row 1 word 0; NPU 1 accumulates the accumulator 202 value with the product of the rotated data word 211 received from the mux-reg 208 output 209 of NPU 0 (which was data word 0 received from the data RAM 122) and weight RAM 124 row 1 word 1; and so forth to NPU 511 accumulates the accumulator 202 value with the product of the rotated data word 211 received from the mux-reg 208 output 209 of NPU 510 (which was data word 510 received from the data RAM 122) and weight RAM 124 row 1 word 511, as shown.

At clock 3, each of the 512 NPUs 126 performs a second iteration of the multiply-accumulate rotate instruction at address 2 of FIG. 4. NPU 0 accumulates the accumulator 202 value with the product of the rotated data word 211 received from the mux-reg 208 output 209 of NPU 511 (which was data word 510 received from the data RAM 122) and weight RAM 124 row 2 word 0; NPU 1 accumulates the accumulator 202 value with the product of the rotated data word 211 received from the mux-reg 208 output 209 of NPU 0 (which was data word 511 received from the data RAM 122) and weight RAM 124 row 2 word 1; and so forth to NPU 511 accumulates the accumulator 202 value with the product of the rotated data word 211 received from the mux-reg 208 output 209 of NPU 510 (which was data word 509 received from the data RAM 122) and weight RAM 124 row 2 word 511, as shown. As indicated by the ellipsis of FIG. 5, this continues for each of the following 509 clock cycles until . . . .

At clock 512, each of the 512 NPUs 126 performs a $511^{th}$ iteration of the multiply-accumulate rotate instruction at address 2 of FIG. 4. NPU 0 accumulates the accumulator 202 value with the product of the rotated data word 211 received from the mux-reg 208 output 209 of NPU 511 (which was data word 1 received from the data RAM 122) and weight RAM 124 row 511 word 0; NPU 1 accumulates the accumulator 202 value with the product of the rotated data word 211 received from the mux-reg 208 output 209 of NPU 0 (which was data word 2 received from the data RAM 122) and weight RAM 124 row 511 word 1; and so forth to NPU 511 accumulates the accumulator 202 value with the product of the rotated data word 211 received from the mux-reg 208 output 209 of NPU 510 (which was data word 0 received from the data RAM 122) and weight RAM 124 row 511 word 511, as shown. In one embodiment, multiple clock cycles are required to read the data words and weight words from the data RAM 122 and weight RAM 124 to perform the multiply-accumulate instruction at address 1 of FIG. 4; however, the data RAM 122 and weight RAM 124 and NPUs 126 are pipelined such that once the first multiply-accumulate operation is begun (e.g., as shown during clock 1 of FIG. 5), the subsequent multiply accumulate operations (e.g., as shown during clocks 2-512) are begun in successive clock cycles. Preferably, the NPUs 126 may briefly stall in response to an access of the data RAM 122 and/or weight RAM 124 by an architectural instruction, e.g., MTNN or MFNN instruction (described below with respect to FIGS. 14 and 15) or a microinstruction into which the architectural instructions are translated.

At clock 513, the AFU 212 of each of the 512 NPUs 126 performs the activation function instruction at address 3 of FIG. 4. Finally, at clock 514, each of the 512 NPUs 126 performs the write AFU output instruction at address 4 of FIG. 4 by writing back its result 133 to its corresponding word of row 16 of the data RAM 122, i.e., the result 133 of NPU 0 is written to word 0 of the data RAM 122, the result 133 of NPU 1 is written to word 1 of the data RAM 122, and so forth to the result 133 of NPU 511 is written to word 511 of the data RAM 122. The operation described above with respect to FIG. 5 is also shown in block diagram form in FIG. 6A.

Referring now to FIG. 6A, a block diagram illustrating the NNU 121 of FIG. 1 to execute the program of FIG. 4 is shown. The NNU 121 includes the 512 NPUs 126, the data RAM 122 that receives its address input 123, and the weight RAM 124 that receives its address input 125. Although not shown, on clock 0 the 512 NPUs 126 perform the initialization instruction. As shown, on clock 1, the 512 16-bit data words of row 17 are read out of the data RAM 122 and provided to the 512 NPUs 126. On clocks 1 through 512, the 512 16-bit weight words of rows 0 through 511, respectively, are read out of the weight RAM 124 and provided to the 512 NPUs 126. Although not shown, on clock 1, the 512 NPUs 126 perform their respective multiply-accumulate operations on the loaded data words and weight words. On clocks 2 through 512, the mux-regs 208 of the 512 NPUs 126 operate as a 512 16-bit word rotater to rotate the previously loaded data words of row 17 of the data RAM 122 to the adjacent NPU 126, and the NPUs 126 perform the multiply-accumulate operation on the respective rotated data word and the respective weight word loaded from the weight RAM 124. Although not shown, on clock 513, the 512 AFUs 212 perform the activation instruction. On clock 514, the 512 NPUs 126 write back their respective 512 16-bit results 133 to row 16 of the data RAM 122.

As may be observed, the number clocks required to generate the result words (neuron outputs) produced and written back to the data RAM 122 or weight RAM 124 is approximately the square root of the number of data inputs (connections) received by the current layer of the neural network. For example, if the currently layer has 512 neurons that each has 512 connections from the previous layer, the total number of connections is 256K and the number of clocks required to generate the results for the current layer is slightly over 512. Thus, the NNU 121 provides extremely high performance for neural network computations.

Figure 6B:
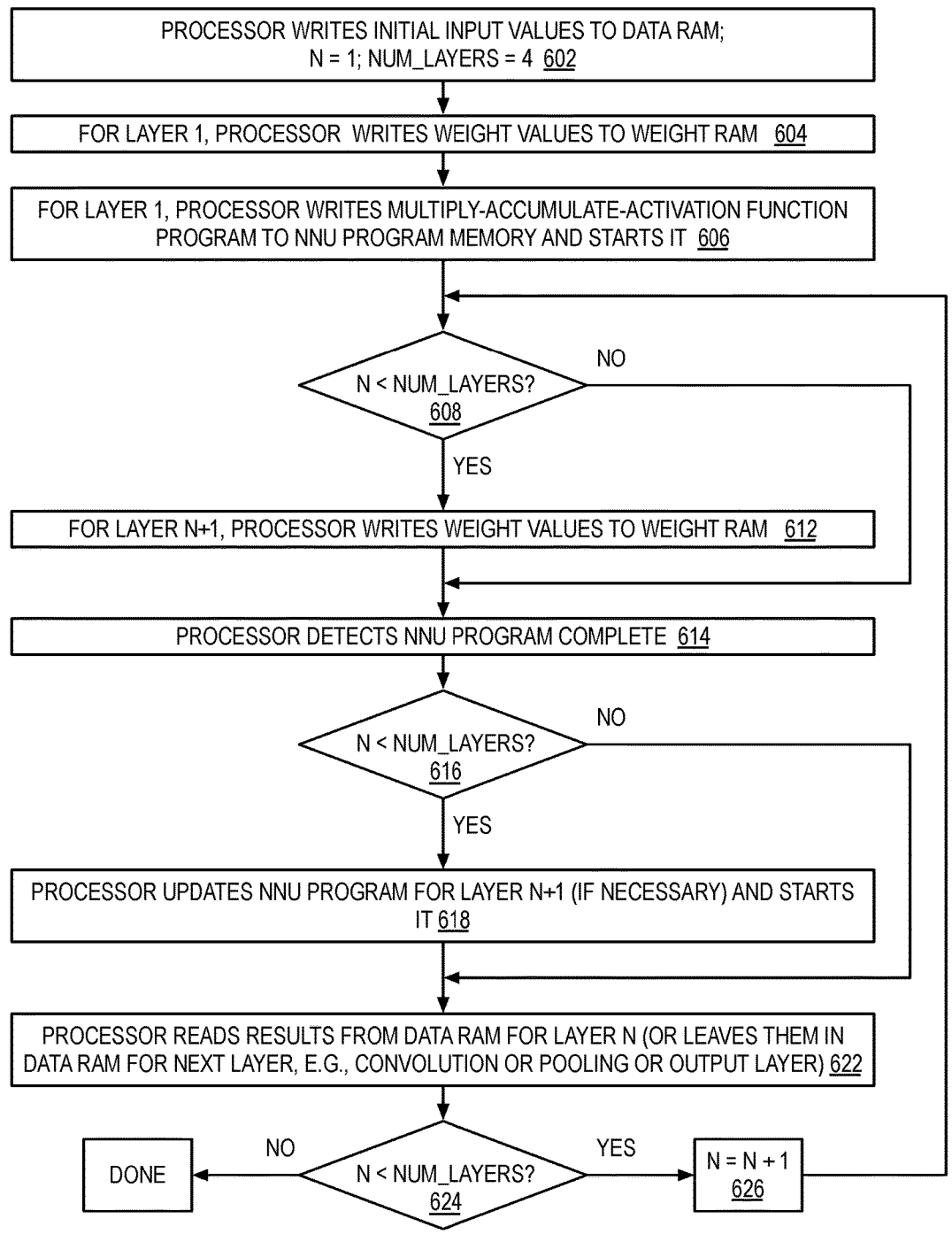
FIG. 6B is a flowchart illustrating operation of the processor of FIG. 1 to perform an architectural program that uses the NNU to perform multiply-accumulate-activation-function computations classically associated with neurons of hidden layers of an artificial neural network such as performed by the program of FIG. 4.

Referring now to FIG. 6B, a flowchart illustrating operation of the processor 100 of FIG. 1 to perform an architectural program that uses the NNU 121 to perform multiply-accumulate-activation function computations classically associated with neurons of hidden layers of an artificial neural network such as performed by the program of FIG. 4, for example. The example of FIG. 6B assumes computations for 4 hidden layers (signified by the initialization of the NUM_LAYERS variable at block 602), each having 512 neurons each fully connected to 512 neurons of the previous layer (by use of the program of FIG. 4). However, it should be understood that these numbers of layers and neurons are selected for illustration purposes, and the NNU 121 may be employed to perform similar computations for different numbers of hidden layers and different numbers of neurons per layer and for non-fully connected neurons. In one embodiment, the weight values may be set to zero for non-existent neurons in a layer or for non-existent connections to a neuron. Preferably, the architectural program writes a first set of weights to the weight RAM 124 and starts the NNU 121, and while the NNU 121 is performing the computations associated with the first layer, the architectural program writes a second set of weights to the weight RAM 124 so that as soon as the NNU 121 completes the computations for the first hidden layer, the NNU 121 can start the computations for the second layer. In this manner, the architectural program ping-pongs back and forth between the two regions of the weight RAM 124 in order to keep the NNU 121 fully utilized. Flow begins at block 602.

At block 602, the processor 100, i.e., the architectural program running on the processor 100, writes the input values to the current hidden layer of neurons to the data RAM 122, e.g., into row 17 of the data RAM 122, as shown and described with respect to FIG. 6A. Alternatively, the values may already be in row 17 of the data RAM 122 as results 133 of the operation of the NNU 121 for a previous layer (e.g., convolution, pooling or input layer). Additionally, the architectural program initializes a variable N to a value of 1. The variable N denotes the current layer of the hidden layers being processed by the NNU 121. Additionally, the architectural program initializes a variable NUM_LAYERS to a value of 4 since there are 4 hidden layers in the example. Flow proceeds to block 604.

At block 604, the processor 100 writes the weight words for layer 1 to the weight RAM 124, e.g., to rows 0 through 511, as shown in FIG. 6A. Flow proceeds to block 606.

At block 606, the processor 100 writes a multiply-accumulate-activation function program (e.g., of FIG. 4) to the NNU 121 program memory 129, using MTNN 1400 instructions that specify a function 1432 to write the program memory 129. The processor 100 then starts the NNU program using a MTNN 1400 instruction that specifies a function 1432 to start execution of the program. Flow proceeds to decision block 608.

At decision block 608, the architectural program determines whether the value of variable N is less than NUM_LAYERS. If so, flow proceeds to block 612; otherwise, flow proceeds to block 614.

At block 612, the processor 100 writes the weight words for layer N+1 to the weight RAM 124, e.g., to rows 512 through 1023. Thus, advantageously, the architectural program writes the weight words for the next layer to the weight RAM 124 while the NNU 121 is performing the hidden layer computations for the current layer so that the NNU 121 can immediately start performing the hidden layer computations for the next layer once the computations for the current layer are complete, i.e., written to the data RAM 122. Flow proceeds to block 614.

At block 614, the processor 100 determines that the currently running NNU program (started at block 606 in the case of layer 1, and started at block 618 in the case of layers 2 through 4) has completed. Preferably, the processor 100 determines this by executing a MFNN 1500 instruction to read the NNU 121 status register 127. In an alternate embodiment, the NNU 121 generates an interrupt to indicate it has completed the multiply-accumulate-activation function layer program. Flow proceeds to decision block 616.

At decision block 616, the architectural program determines whether the value of variable N is less than NUM_LAYERS. If so, flow proceeds to block 618; otherwise, flow proceeds to block 622.

At block 618, the processor 100 updates the multiply-accumulate-activation function program so that it can perform the hidden layer computations for layer N+1. More specifically, the processor 100 updates the data RAM 122 row value of the multiply-accumulate instruction at address 1 of FIG. 4 to the row of the data RAM 122 to which the previous layer wrote its results (e.g., to row 16) and also updates the output row (e.g., to row 15). The processor 100 then starts the updated NNU program. Alternatively, the program of FIG. 4 specifies the same row in the output instruction of address 4 as the row specified in the multiply-accumulate instruction at address 1 (i.e., the row read from the data RAM 122). In this embodiment, the current row of input data words is overwritten (which is acceptable as long as the row of data words is not needed for some other purpose, because the row of data words has already been read into the mux-regs 208 and is being rotated among the NPUs 126 via the N-word rotater). In this case, no update of the NNU program is needed at block 618, but only a re-start of it. Flow proceeds to block 622.

At block 622, the processor 100 reads the results of the NNU program from the data RAM 122 for layer N. However, if the results are simply to be used by the next layer, then the architectural program may not need to read the results from the data RAM 122, but instead leave them in the data RAM 122 for the next hidden layer computations. Flow proceeds to decision block 624.

At decision block 624, the architectural program determines whether the value of variable N is less than NUM_LAYERS. If so, flow proceeds to block 626; otherwise, flow ends.

At block 626, the architectural program increments N by one. Flow returns to decision block 608.

As may be determined from the example of FIG. 6B, approximately every 512 clock cycles, the NPUs 126 read once from and write once to the data RAM 122 (by virtue of the operation of the NNU program of FIG. 4). Additionally, the NPUs 126 read the weight RAM 124 approximately every clock cycle to read a row of the weight words. Thus, the entire bandwidth of the weight RAM 124 is consumed by the hybrid manner in which the NNU 121 performs the hidden layer operation. Additionally, assuming an embodiment that includes a write and read buffer such as the buffer 1704 of FIG. 17, concurrently with the NPU 126 reads, the processor 100 writes the weight RAM 124 such that the buffer 1704 performs one write to the weight RAM 124 approximately every 16 clock cycles to write the weight words. Thus, in a single-ported embodiment of the weight RAM 124 (such as described with respect to FIG. 17), approximately every 16 clock cycles, the NPUs 126 must be stalled from reading the weight RAM 124 to enable the buffer 1704 to write the weight RAM 124. However, in an embodiment in which the weight RAM 124 is dual-ported, the NPUs 126 need not be stalled.

Figure 7:
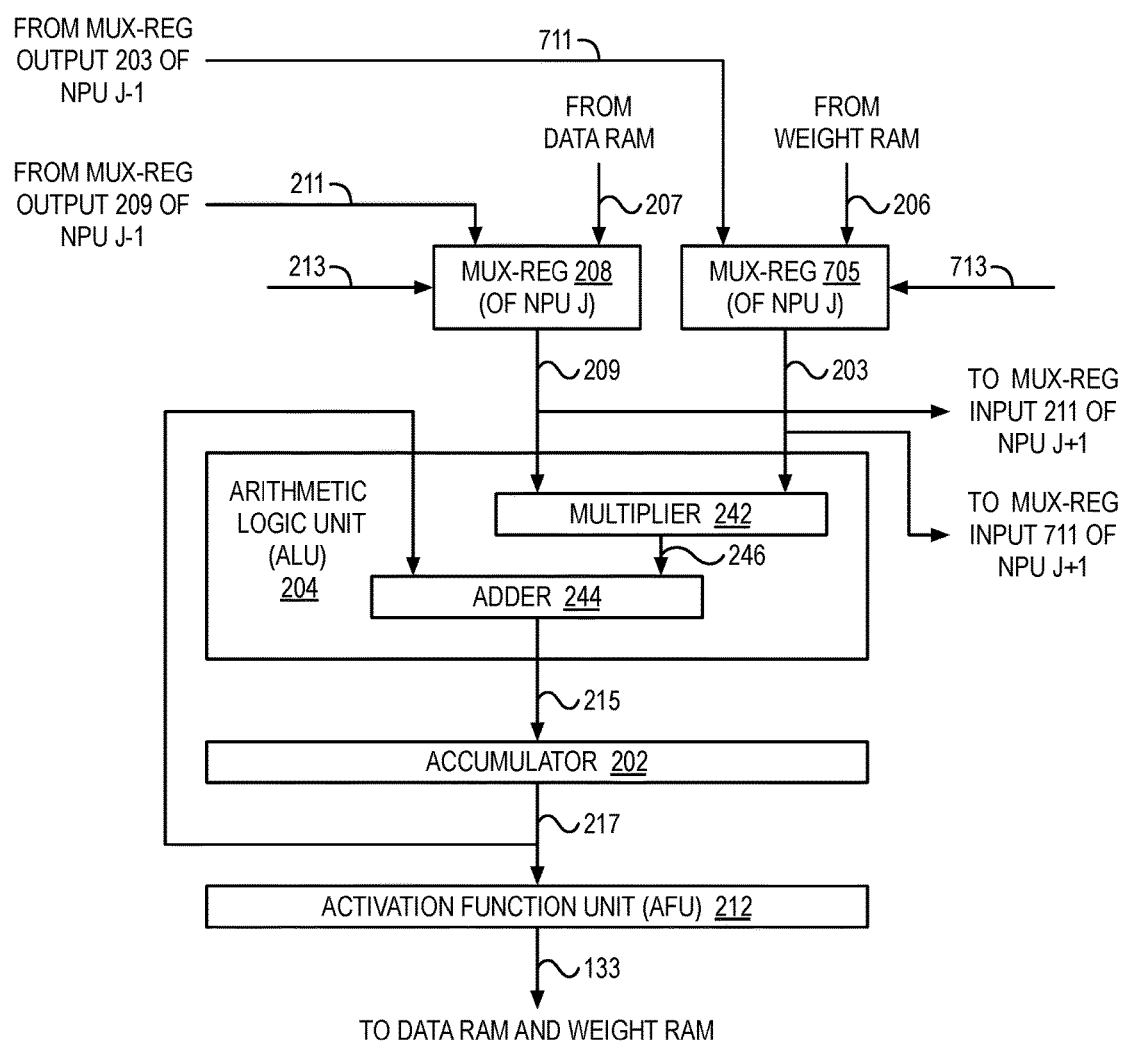
FIG. 7 is a block diagram illustrating a NPU of FIG. 1 according to an alternate embodiment.

Referring now to FIG. 7, a block diagram illustrating a NPU 126 of FIG. 1 according to an alternate embodiment is shown. The NPU 126 of FIG. 7 is similar in many respects to the NPU 126 of FIG. 2. However, the NPU 126 of FIG. 7 additionally includes a second 2-input mux-reg 705. The mux-reg 705 selects one of its inputs 206 or 711 to store in its register and then to provide on its output 203 on a subsequent clock cycle. Input 206 receives the weight word from the weight RAM 124. The other input 711 receives the output 203 of the second mux-reg 705 of the adjacent NPU 126. Preferably, the mux-reg 705 input 711 of NPU J receives the mux-reg 705 output 203 of NPU 126 instance J−1, and the output of NPU J is provided to the mux-reg 705 input 711 of NPU 126 instance J+1. In this manner, the mux-regs 705 of the N NPUs 126 collectively operate as an N-word rotater, similar to the manner described above with respect to FIG. 3, but for the weight words rather than for the data words. A control input 713 controls which of the two inputs the mux-reg 705 selects to store in its register and that is subsequently provided on the output 203.

Including the mux-regs 208 and/or mux-regs 705 (as well as the mux-regs of other embodiments, such as of FIGS. 18 and 23) to effectively form a large rotater that rotates the data/weights of a row received from the data RAM 122 and/or weight RAM 124 has an advantage that the NNU 121 does not require an extremely large mux that would otherwise be required between the data RAM 122 and/or weight RAM 124 in order to provide the necessary data/weight words to the appropriate NNU 121.

Writing Back Accumulator Values in Addition to Activation Function Result

Figure 15:
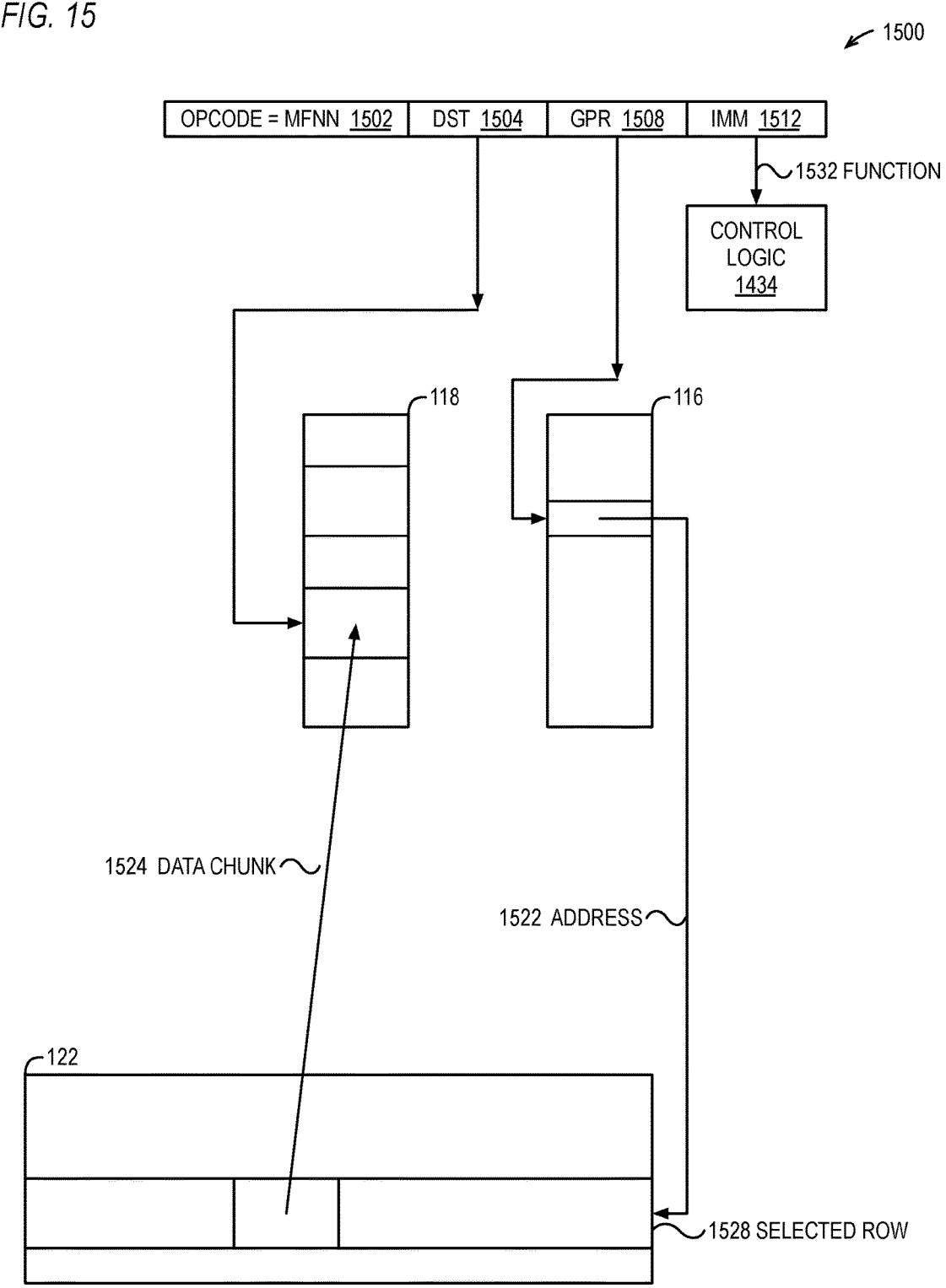
FIG. 15 is a block diagram illustrating a move from neural network (MFNN) architectural instruction and its operation with respect to portions of the NNU of FIG. 1.

In some applications, it is useful for the processor 100 to receive back (e.g., to the media registers 118 via the MFNN instruction of FIG. 15) the raw accumulator 202 value 217 upon which instructions executing on other execution units 112 can perform computations. For example, in one embodiment, in order to reduce the complexity of the AFU 212, it is not configured to perform the softmax activation function. Consequently, the NNU 121 may output the raw accumulator 202 value 217, or a subset thereof, to the data RAM 122 or weight RAM 124, which the architectural program subsequently reads from the data RAM 122 or weight RAM 124 and performs computations on the raw values. However, use of the raw accumulator 202 value 217 is not limited to performance of softmax, and other uses are contemplated.

Referring now to FIG. 8, a block diagram illustrating a NPU 126 of FIG. 1 according to an alternate embodiment is shown. The NPU 126 of FIG. 8 is similar in many respects to the NPU 126 of FIG. 2. However, the NPU 126 of FIG. 8 includes a multiplexer (mux) 802 in the AFU 212 that has a control input 803. The width (in bits) of the accumulator 202 is greater than the width of a data word. The mux 802 has multiple inputs that receive data word-width portions of the accumulator 202 output 217. In one embodiment, the width of the accumulator 202 is 41 bits and the NPU 126 is configured to output a result word 133 that is 16 bits; thus, for example, the mux 802 (or mux 3032 and/or mux 3037 of FIG. 30) includes three inputs that receive bits [15:0], bits [31:16], and bits [47:32] of the accumulator 202 output 217, respectively. Preferably, output bits not provided by the accumulator 202 (e.g., bits [47:41]) are forced to zero value bits.

The sequencer 128 generates a value on the control input 803 to control the mux 802 to select one of the words (e.g., 16 bits) of the accumulator 202 in response to a write ACC instruction such as the write ACC instructions at addresses 3 through 5 of FIG. 9 described below. Preferably, the mux 802 also has one or more inputs that receive the output of activation function circuits (e.g., elements 3022, 3024, 3026, 3018, 3014, and 3016 of FIG. 30) that generate outputs that are the width of a data word. The sequencer 128 generates a value on the control input 803 to control the mux 802 to select one of the activation function circuit outputs, rather than one of the words of the accumulator 202, in response to an instruction such as the write AFU output instruction at address 4 of FIG. 4.

Referring now to FIG. 9, a table illustrating a program for storage in the program memory 129 of and execution by the NNU 121 of FIG. 1 is shown. The example program of FIG. 9 is similar in many respects to the program of FIG. 4. Specifically, the instructions at addresses 0 through 2 are identical. However, the instructions at addresses 3 and 4 of FIG. 4 are replaced in FIG. 9 by write ACC instructions that instruct the 512 NPUs 126 to write back their accumulator 202 output 217 as results 133 to three rows of the data RAM 122, which is rows 16 through 18 in the example. That is, the write ACC instruction instructs the sequencer 128 to output a data RAM address 123 value of 16 and a write command in a first clock cycle, to output a data RAM address 123 value of 17 and a write command in a second clock cycle, and to output a data RAM address 123 value of 18 and a write command in a third clock cycle. Preferably the execution of the write ACC instruction may be overlapped with the execution of other instructions such that the write ACC instruction effectively executes in three clock cycles, one for each row written to in the data RAM 122. In one embodiment, the user specifies values of the activation function 2934 and output command 2956 fields in the control register 127 (of FIG. 29A) to accomplish the writing of the desired portions of the accumulator 202 to the data RAM 122 or weight RAM 124. Alternatively, rather than writing back the entire contents of the accumulator 202, the write ACC instruction may optionally write back a subset of the accumulator 202. In one embodiment, a canonical form of the accumulator 202 may written back, as described in more detail below with respect to FIGS. 29 through 31.

Referring now to FIG. 10, a timing diagram illustrating the execution of the program of FIG. 9 by the NNU 121 is shown. The timing diagram of FIG. 10 is similar to the timing diagram of FIG. 5, and clocks 0 through 512 are the same. However, at clocks 513-515, the AFU 212 of each of the 512 NPUs 126 performs one of the write ACC instructions at addresses 3 through 5 of FIG. 9. Specifically, at clock 513, each of the 512 NPUs 126 writes back as its result 133 to its corresponding word of row 16 of the data RAM 122 bits [15:0] of the accumulator 202 output 217; at clock 514, each of the 512 NPUs 126 writes back as its result 133 to its corresponding word of row 17 of the data RAM 122 bits [31:16] of the accumulator 202 output 217; and at clock 515, each of the 512 NPUs 126 writes back as its result 133 to its corresponding word of row 18 of the data RAM 122 bits [40:32] of the accumulator 202 output 217. Preferably, bits [47:41] are forced to zero values.

Shared AFUs

Figure 11:
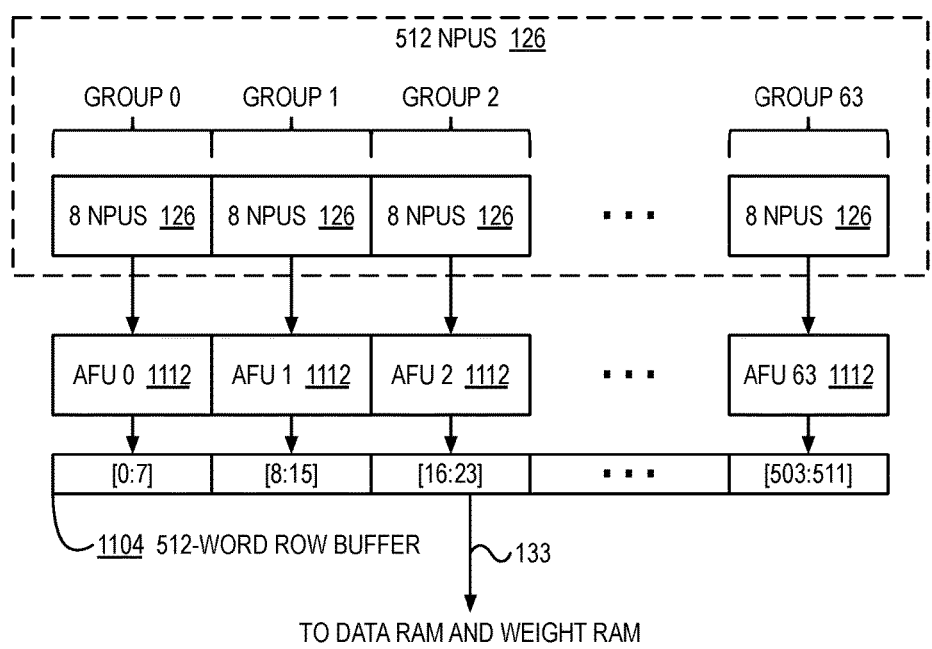
FIG. 11 is a block diagram illustrating an embodiment of the NNU of FIG. 1 is shown. In the embodiment of FIG. 11, a neuron is split into two portions, the activation function unit portion and the ALU portion (which also includes the shift register portion), and each activation function unit portion is shared by multiple ALU portions.

Referring now to FIG. 11, a block diagram illustrating an embodiment of the NNU 121 of FIG. 1 is shown. In the embodiment of FIG. 11, a neuron is split into two portions, the activation function unit portion and the ALU portion (which also includes the shift register portion), and each activation function unit portion is shared by multiple ALU portions. In FIG. 11, the ALU portions are referred to as NPUs 126 and the shared activation function unit portions are referred to as AFUs 1112. This is in contrast to the embodiment of FIG. 2, for example, in which each neuron includes its own AFU 212. Hence, for example, in one embodiment the NPUs 126 (ALU portions) of the embodiment of FIG. 11 include the accumulator 202, ALU 204, mux-reg 208 and register 205 of FIG. 2, but not the AFU 212. In the embodiment of FIG. 11, the NNU 121 includes 512 NPUs 126 as an example; however, other embodiments with other numbers of NPUs 126 are contemplated. In the example of FIG. 11, the 512 NPUs 126 are grouped into 64 groups of eight NPUs 126 each, referred to as groups 0 through 63 in FIG. 11.

The NNU 121 also includes a row buffer 1104 and a plurality of shared AFUs 1112 coupled between the NPUs 126 and the row buffer 1104. The row buffer 1104 is the same width (in bits) as a row of the data RAM 122 or weight RAM 124, e.g., 512 words. There is one AFU 1112 per NPU 126 group, i.e., each AFU 1112 has a corresponding NPU 126 group; thus, in the embodiment of FIG. 11 there are 64 AFUs 1112 that correspond to the 64 NPU 126 groups. Each of the eight NPUs 126 in a group shares the corresponding AFU 1112. Other embodiments with different numbers of AFUs 1112 and NPUs 126 per group are contemplated. For example, other embodiments are contemplated in which two or four or sixteen NPUs 126 in a group share an AFU 1112.

A motivation for sharing AFUs 1112 is to reduce the size of the NNU 121. The size reduction is obtained at the cost of a performance reduction. That is, it may take several clocks longer, depending upon the sharing ratio, to generate the results 133 for the entire array of NPUs 126, as demonstrated in FIG. 12 below, for example, in which seven additional clock cycles are required because of the 8:1 sharing ratio. However, generally speaking, the additional number of clocks (e.g., 7) is relatively small compared to the number of clocks required to generated the accumulated sum (e.g., 512 clocks for a layer that has 512 connections per neuron). Hence, the relatively small performance impact (e.g., one percent increase in computation time) may be a worthwhile tradeoff for the reduced size of the NNU 121.

In one embodiment, each of the NPUs 126 includes an AFU 212 that performs relatively simple activation functions, thus enabling the simple AFUs 212 to be relatively small and therefore included in each NPU 126; whereas, the shared, or complex, AFUs 1112 perform relatively complex activation functions and are thus relatively significantly larger than the simple AFUs 212. In such an embodiment, the additional clock cycles are only required when a complex activation function is specified that requires sharing of a complex AFU 1112, but not when an activation function is specified that the simple AFU 212 is configured to perform.

Figure 12:
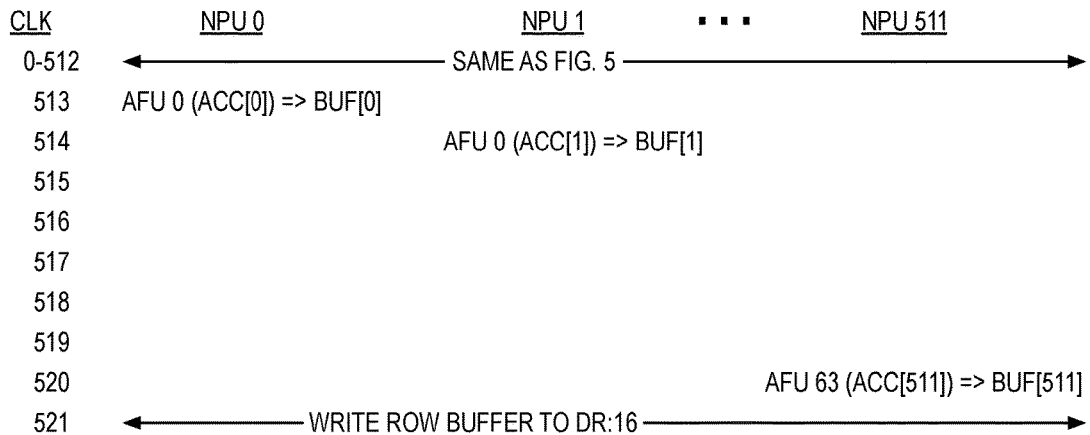
FIG. 12 is a timing diagram illustrating the execution of the program of FIG. 4 by the NNU of FIG. 11.
Figure 13:
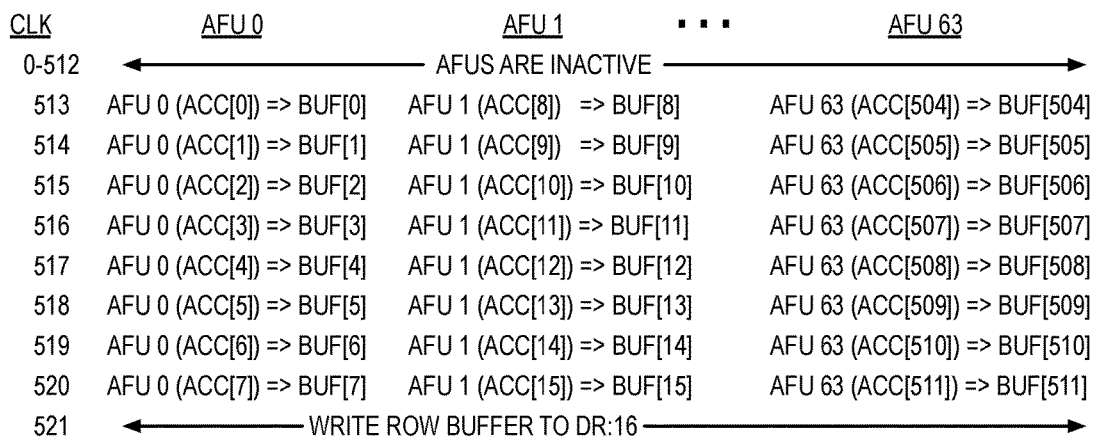
FIG. 13 is a timing diagram illustrating the execution of the program of FIG. 4 by the NNU of FIG. 11.

Referring now to FIGS. 12 and 13, two timing diagrams illustrating the execution of the program of FIG. 4 by the NNU 121 of FIG. 11 is shown. The timing diagram of FIG. 12 is similar to the timing diagram of FIG. 5, and clocks 0 through 512 are the same. However, at clock 513, operation is different than described in the timing diagram of FIG. 5 because the NPUs 126 of FIG. 11 share the AFUs 1112; that is, the NPUs 126 of a group share the AFU 1112 associated with the group, and FIG. 11 illustrates the sharing.

Each row of the timing diagram of FIG. 13 corresponds to a successive clock cycle indicated in the first column. Each of the other columns corresponds to a different one of the 64 AFUs 1112 and indicates its operation. For simplicity and clarity of illustration, the operations only for AFUs 0, 1 and 63 are shown. The clock cycles of FIG. 13 correspond to the clock cycles of FIG. 12 but illustrate the sharing of the AFUs 1112 by the NPUs 126 in a different manner. At clocks 0-512, each of the 64 AFUs 1112 is inactive, as shown in FIG. 13, while the NPUs 126 perform the initialize NPU and multiply-accumulate and multiply-accumulate rotate instructions.

As shown in both FIGS. 12 and 13, at clock 513, AFU 0 (the AFU 1112 associated with group 0) begins to perform the specified activation function on the accumulator 202 value 217 of NPU 0, which is the first NPU 126 in group 0, and the output of AFU 0 will be stored to row buffer 1104 word 0. Also at clock 513, each of the AFUs 1112 begins to perform the specified activation function on the accumulator 202 of the first NPU 126 in its corresponding group of NPUs 126. Thus, in clock 513, as shown in FIG. 13, AFU 0 begins to perform the specified activation function on the accumulator 202 of NPU 0 to generate a result that will be stored to row buffer 1104 word 0; AFU 1 begins to perform the specified activation function on the accumulator 202 of NPU 8 to generate a result that will be stored to row buffer 1104 word 8; and so forth to AFU 63 begins to perform the specified activation function on the accumulator 202 of NPU 504 to generate a result that will be stored to row buffer 1104 word 504.

At clock 514, AFU 0 (the AFU 1112 associated with group 0) begins to perform the specified activation function on the accumulator 202 value 217 of NPU 1, which is the second NPU 126 in group 0, and the output of AFU 0 will be stored to row buffer 1104 word 1, as shown. Also at clock 514, each of the AFUs 1112 begins to perform the specified activation function on the accumulator 202 of the second NPU 126 in its corresponding group of NPUs 126. Thus, in clock 514, as shown in FIG. 13, AFU 0 begins to perform the specified activation function on the accumulator 202 of NPU 1 to generate a result that will be stored to row buffer 1104 word 1; AFU 1 begins to perform the specified activation function on the accumulator 202 of NPU 9 to generate a result that will be stored to row buffer 1104 word 9; and so forth to AFU 63 begins to perform the specified activation function on the accumulator 202 of NPU 505 to generate a result that will be stored to row buffer 1104 word 505. This pattern continues until at clock cycle 520, AFU 0 (the AFU 1112 associated with group 0) begins to perform the specified activation function on the accumulator 202 value 217 of NPU 7, which is the eighth (last) NPU 126 in group 0, and the output of AFU 0 will be stored to row buffer 1104 word 7, as shown. Also at clock 520, each of the AFUs 1112 begins to perform the specified activation function on the accumulator 202 of the eighth NPU 126 in its corresponding group of NPUs 126. Thus, in clock 520, as shown in FIG. 13, AFU 0 begins to perform the specified activation function on the accumulator 202 of NPU 7 to generate a result that will be stored to row buffer 1104 word 7; AFU 1 begins to perform the specified activation function on the accumulator 202 of NPU 15 to generate a result that will be stored to row buffer 1104 word 15; and so forth to AFU 63 begins to perform the specified activation function on the accumulator 202 of NPU 511 to generate a result that will be stored to row buffer 1104 word 511.

At clock 521, once all 512 results associated with the 512 NPUs 126 have been generated and written to the row buffer 1104, the row buffer 1104 begins to write its contents to the data RAM 122 or weight RAM 124. In this fashion, the AFU 1112 of each of the 64 groups of NPUs 126 performs a portion of the activation function instruction at address 3 of FIG. 4.

Embodiments such as that of FIG. 11 that share AFUs 1112 among groups of ALUs 204 may be particularly advantageous in conjunction with integer ALUs 204, as described more below, e.g., with respect to FIGS. 29A through 33.

MTNN and MFNN Architectural Instructions

Figure 14:
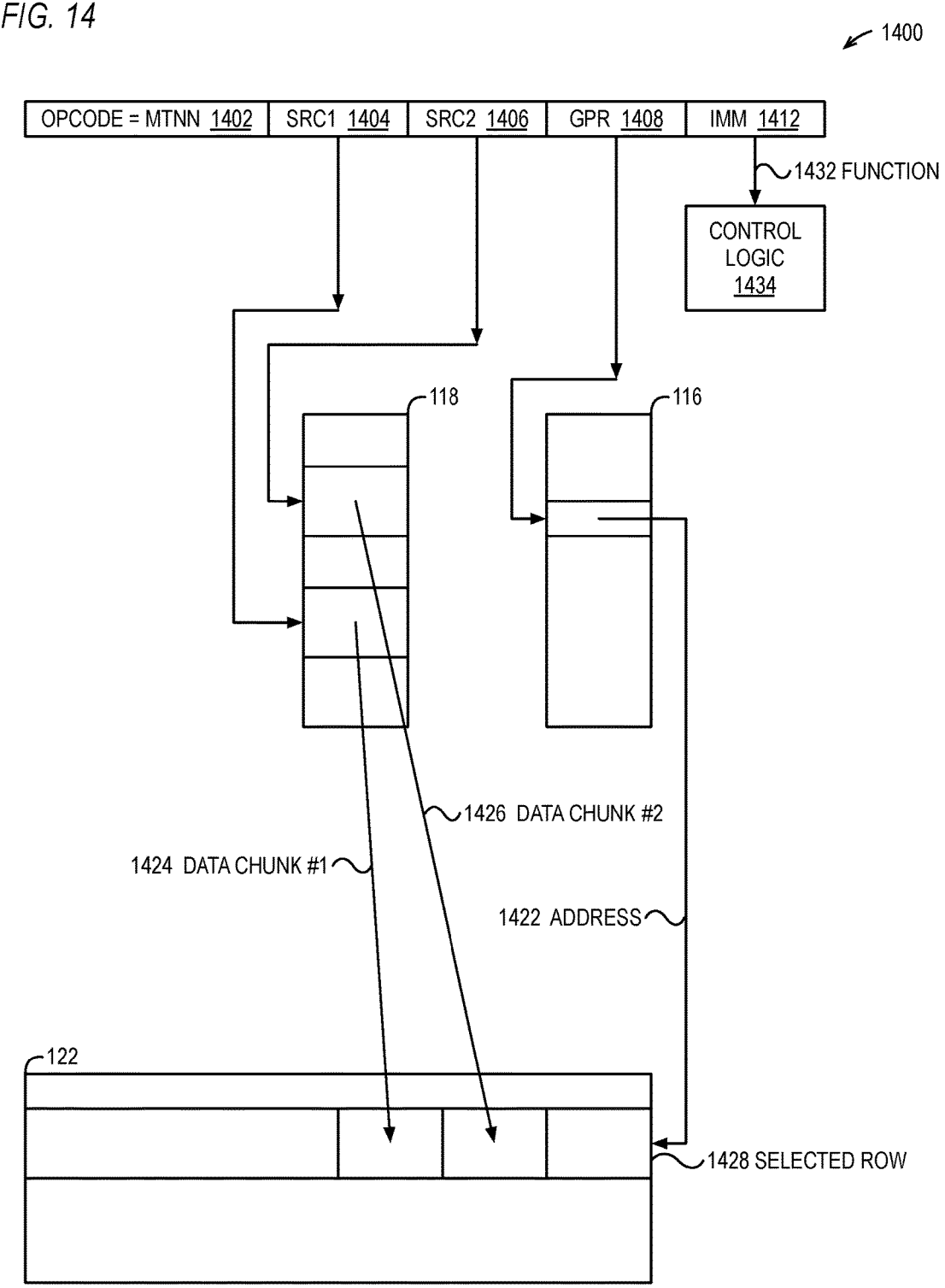
FIG. 14 is a block diagram illustrating a move to neural network (MTNN) architectural instruction and its operation with respect to portions of the NNU of FIG. 1.

Referring now to FIG. 14, a block diagram illustrating a move to neural network (MTNN) architectural instruction 1400 and its operation with respect to portions of the NNU 121 of FIG. 1 is shown. The MTNN instruction 1400 includes an opcode field 1402, a src1 field 1404, a src2 field 1406, a gpr field 1408, and an immediate field 1412. The MTNN instruction 1400 is an architectural instruction, i.e., it is included in the instruction set architecture of the processor 100. Preferably, the instruction set architecture associates a predetermined value of the opcode field 1402 with the MTNN instruction 1400 to distinguish it from other instructions in the instruction set architecture. The MTNN instruction 1400 opcode 1402 may or may not include prefixes, such as are common, for example, in the x86 architecture.

The immediate field 1412 provides a value that specifies a function 1432 to control logic 1434 of the NNU 121. Preferably, the function 1432 is provided as an immediate operand of a microinstruction 105 of FIG. 1. The functions 1432 that may be performed by the NNU 121 include, but are not limited to, writing to the data RAM 122, writing to the weight RAM 124, writing to the program memory 129, writing to the control register 127, starting execution of a program in the program memory 129, pausing the execution of a program in the program memory 129, request notification (e.g., interrupt) of completion of the execution of a program in the program memory 129, and resetting the NNU 121. Preferably, the NNU instruction set includes an instruction whose result indicates the NNU program is complete. Alternatively, the NNU instruction set includes an explicit generate interrupt instruction. Preferably, resetting the NNU 121 includes effectively forcing the NNU 121 back to a reset state (e.g., internal state machines are cleared and set to an idle state), except the contents of the data RAM 122, weight RAM 124, program memory 129 are left intact. Additionally, internal registers such as the accumulator 202 are not affected by the reset function and must be explicitly cleared, e.g., by an initialize NPU instruction at address 0 of FIG. 4. In one embodiment, the function 1432 may include a direct execution function in which the first source register contains a micro-operation (see for example micro-operation 3418 of FIG. 34). The direct execution function instructs the NNU 121 to directly execute the specified micro-operation. In this manner, an architectural program may directly control the NNU 121 to perform operations, rather than writing instructions to the program memory 129 and then instructing the NNU 121 to execute the instructions in the program memory or by executing an MTNN instruction 1400 (or an MFNN instruction 1500 of FIG. 15). FIG. 14 illustrates an example of the function 1432 of writing to the data RAM 122.

The gpr field 1408 specifies one of the GPR in the general purpose register file 116. In one embodiment, each GPR is 64 bits. The general purpose register file 116 provides the value from the selected GPR to the NNU 121, as shown, which uses the value as an address 1422. The address 1422 selects a row of the memory specified in the function 1432. In the case of the data RAM 122 or weight RAM 124, the address 1422 additionally selects a chunk that is twice the size of a media register (e.g., 512 bits) location within the selected row. Preferably, the location is on a 512-bit boundary. In one embodiment, a multiplexer selects either the address 1422 (or address 1422 in the case of a MFNN instruction 1400 described below) or the address 123/125/131 from the sequencer 128 for provision to the data RAM 122/weight RAM 124/program memory 129. In one embodiment, as described in more detail below, the data RAM 122 is dual-ported to allow the NPUs 126 to read/write the data RAM 122 concurrently with the media registers 118 reading/writing the data RAM 122. In one embodiment, the weight RAM 124 is also dual-ported for a similar purpose.

The src1 field 1404 and src2 field 1406 each specify a media register in the media register file 118. In one embodiment, each media register 118 is 256 bits. The media register file 118 provides the concatenated data (e.g., 512 bits) from the selected media registers to the data RAM 122 (or weight RAM 124 or program memory 129) for writing into the selected row 1428 specified by the address 1422 and into the location specified by the address 1422 within the selected row 1428, as shown. Advantageously, by executing a series of MTNN instructions 1400 (and MFNN instructions 1400 described below), an architectural program executing on the processor 100 can populate rows of the data RAM 122 and rows of the weight RAM 124 and write a program to the program memory 129, such as the programs described herein (e.g., of FIGS. 4 and 9) to cause the NNU 121 to perform operations on the data and weights at extremely high speeds to accomplish an artificial neural network. In one embodiment, the architectural program directly controls the NNU 121 rather than writing a program into the program memory 129.

In one embodiment, rather than specifying two source registers (e.g., 1404 and 1406), the MTNN instruction 1400 specifies a start source register and a number of source registers, Q. This form of the MTNN instruction 1400 instructs the processor 100 to write the media register 118 specified as the start source register as well as the next Q−1 sequential media registers 118 to the NNU 121, i.e., to the data RAM 122 or weight RAM 124 specified. Preferably, the instruction translator 104 translates the MTNN instruction 1400 into as many microinstructions as needed to write all the Q specified media registers 118. For example, in one embodiment, when the MTNN instruction 1400 specifies a start source register as MR4 and Q is 8, then the instruction translator 104 translates the MTNN instruction 1400 into four microinstructions, the first of which writes MR4 and MR5, the second of which writes MR6 and MR7, the third of which writes MR8 and MR9, and the fourth of which writes MR10 and MR11. In an alternate embodiment in which the data path from the media registers 118 to the NNU 121 is 1024 bits rather than 512, the instruction translator 104 translates the MTNN instruction 1400 into two microinstructions, the first of which writes MR4 through MR7, and the second of which writes MR8 through MR11. A similar embodiment is contemplated in which the MFNN instruction 1500 specifies a start destination register and a number of destination registers, to enable reading larger chunks of a row of the data RAM 122 or weight RAM 124 per MFNN instruction 1500 than a single media register 118.

Referring now to FIG. 15, a block diagram illustrating a move from neural network (MFNN) architectural instruction 1500 and its operation with respect to portions of the NNU 121 of FIG. 1 is shown. The MFNN instruction 1500 includes an opcode field 1502, a dst field 1504, a gpr field 1508, and an immediate field 1512. The MFNN instruction 1500 is an architectural instruction, i.e., it is included in the instruction set architecture of the processor 100. Preferably, the instruction set architecture associates a predetermined value of the opcode field 1502 with the MFNN instruction 1500 to distinguish it from other instructions in the instruction set architecture. The MFNN instruction 1500 opcode 1502 may or may not include prefixes, such as are common, for example, in the x86 architecture.

The immediate field 1512 provides a value that specifies a function 1532 to the control logic 1434 of the NNU 121. Preferably, the function 1532 is provided as an immediate operand of a microinstruction 105 of FIG. 1. The functions 1532 that may be performed by the NNU 121 include, but are not limited to, reading from the data RAM 122, reading from the weight RAM 124, reading from the program memory 129, and reading from the status register 127. FIG. 15 illustrates an example of the function 1532 of reading from the data RAM 122.

The gpr field 1508 specifies one of the GPR in the general purpose register file 116. The general purpose register file 116 provides the value from the selected GPR to the NNU 121, as shown, which uses the value as an address 1522 that operates in a manner similar to the address 1422 of FIG. 14 to select a row of the memory specified in the function 1532 and, in the case of the data RAM 122 or weight RAM 124, the address 1522 additionally selects a chunk that is the size of a media register (e.g., 256 bits) location within the selected row. Preferably, the location is on a 256-bit boundary.

The dst field 1504 specifies a media register in the media register file 118. The media register file 118 receives the data (e.g., 256 bits) into the selected media register from the data RAM 122 (or weight RAM 124 or program memory 129) read from the selected row 1528 specified by the address 1522 and from the location specified by the address 1522 within the selected row 1528, as shown.

NNU Internal RAM Port Configurations

Figure 16:
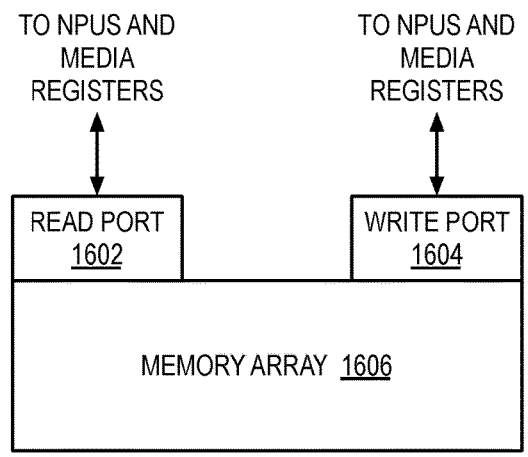
FIG. 16 is a block diagram illustrating an embodiment of the data RAM of FIG. 1.

Referring now to FIG. 16, a block diagram illustrating an embodiment of the data RAM 122 of FIG. 1 is shown. The data RAM 122 includes a memory array 1606, a read port 1602 and a write port 1604. The memory array 1606 holds the data words and is preferably arranged as D rows of N words, as described above. In one embodiment, the memory array 1606 comprises an array of 64 horizontally arranged static RAM cells in which each cell is 128 bits wide and 64 tall to provide a 64 KB data RAM 122 that is 8192 bits wide and has 64 rows, and the data RAM 122 occupies approximately 0.2 square millimeters of die area. However, other embodiments are contemplated.

The read port 1602 is coupled, preferably in a multiplexed fashion, to the NPUs 126 and to the media registers 118. (More precisely, the media registers 118 may be coupled to the read port 1602 via result busses that may also provide data to a reorder buffer and/or result forwarding busses to the other execution units 112). The NPUs 126 and media registers 118 share the read port 1602 to read the data RAM 122. The write port 1604 is also coupled, preferably in a multiplexed fashion, to the NPUs 126 and to the media registers 118. The NPUs 126 and media registers 118 shared the write port 1604 to write the data RAM 122. Thus, advantageously, the media registers 118 can concurrently write to the data RAM 122 while the NPUs 126 are also reading from the data RAM 122, or the NPUs 126 can concurrently write to the data RAM 122 while the media registers 118 are reading from the data RAM 122. This may advantageously provide improved performance. For example, the NPUs 126 can read the data RAM 122 (e.g., to continue to perform calculations) while the media registers 118 write more data words to the data RAM 122. For another example, the NPUs 126 can write calculation results to the data RAM 122 while the media registers 118 read calculation results from the data RAM 122. In one embodiment, the NPUs 126 can write a row of calculation results to the data RAM 122 while the NPUs 126 also read a row of data words from the data RAM 122. In one embodiment, the memory array 1606 is configured in banks. When the NPUs 126 access the data RAM 122, all of the banks are activated to access an entire row of the memory array 1606; whereas, when the media registers 118 access the data RAM 122, only the specified banks are activated. In one embodiment, each bank is 128 bits wide and the media registers 118 are 256 bits wide, hence two banks are activated per media register 118 access, for example. In one embodiment, one of the ports 1602/1604 is a read/write port. In one embodiment, both the ports 1602 and 1604 are read/write ports.

An advantage of the rotater capability of the NPUs 126 as described herein is that it facilitates the ability for the memory array 1606 of the data RAM 122 to have significantly fewer rows, and therefore be relatively much smaller, than might otherwise be needed in order to insure that the NPUs 126 are highly utilized, which requires the architectural program (via the media registers 118) to be able to continue to provide data to the data RAM 122 and to retrieve results from it while the NPUs 126 are performing computations.

Internal RAM Buffer

Figure 17:
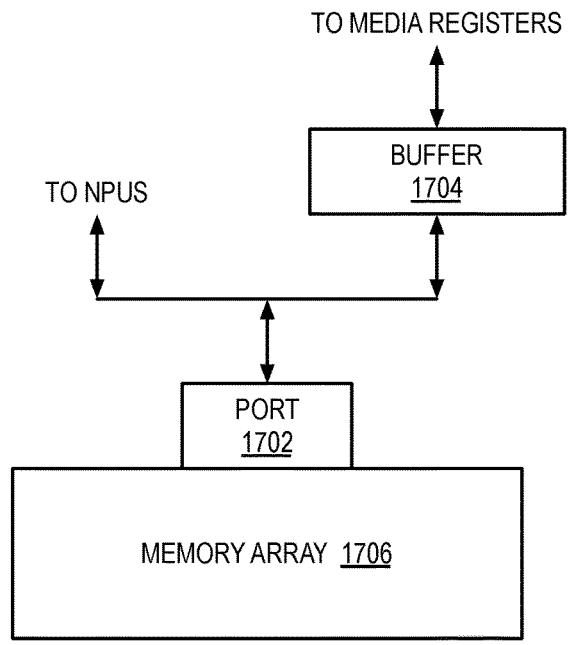
FIG. 17 is a block diagram illustrating an embodiment of the weight RAM of FIG. 1 and a buffer.

Referring now to FIG. 17, a block diagram illustrating an embodiment of the weight RAM 124 of FIG. 1 and a buffer 1704 is shown. The weight RAM 124 includes a memory array 1706 and a port 1702. The memory array 1706 holds the weight words and is preferably arranged as W rows of N words, as described above. In one embodiment, the memory array 1706 comprises an array of 128 horizontally arranged static RAM cells in which each cell is 64 bits wide and 2048 tall to provide a 2 MB weight RAM 124 that is 8192 bits wide and has 2048 rows, and the weight RAM 124 occupies approximately 2.4 square millimeters of die area. However, other embodiments are contemplated.

The port 1702 is coupled, preferably in a multiplexed fashion, to the NPUs 126 and to the buffer 1704. The NPUs 126 and buffer 1704 read and write the weight RAM 124 via the port 1702. The buffer 1704 is also coupled to the media registers 118 of FIG. 1 such that the media registers 118 read and write the weight RAM 124 through the buffer 1704. Thus, advantageously, the media registers 118 can concurrently write to or read from the buffer 1704 while the NPUs 126 are also reading from or writing to the weight RAM 124 (although preferably the NPUs 126 stall, if they are currently executing, to avoid accessing the weight RAM 124 while the buffer 1704 is accessing the weight RAM 124). This may advantageously provide improved performance, particularly since the reads/writes by the media registers 118 to the weight RAM 124 are relatively much smaller than the reads/writes by the NPUs 126 to the weight RAM 124. For example, in one embodiment, the NPUs 126 read/write 8192 bits (one row) at a time, whereas the media registers 118 are 256 bits wide, and each MTNN instructions 1400 writes two media registers 118, i.e., 512 bits. Thus, in the case where the architectural program executes sixteen MTNN instructions 1400 to populate the buffer 1704, a conflict occurs between the NPUs 126 and the architectural program for access to the weight RAM 124 only less than approximately six percent of the time. In an alternate embodiment, the instruction translator 104 translates a MTNN instruction 1400 into two microinstructions 105, each of which writes a single media register 118 to the buffer 1704, in which case a conflict occurs between the NPUs 126 and the architectural program for access to the weight RAM 124 even less frequently.

In one embodiment that includes the buffer 1704, writing to the weight RAM 124 by an architectural program requires multiple MTNN instructions 1400. One or more MTNN instructions 1400 specify a function 1432 to write to specified chunks of the buffer 1704 followed by an MTNN instruction 1400 that specifies a function 1432 that instructs the NNU 121 to write the contents of the buffer 1704 to a specified row of the weight RAM 124, where the size of a chunk is twice the number of bits of a media register 118 and chunks are naturally aligned within the buffer 1704. In one embodiment, in each of the MTNN instructions 1400 that specify a function 1432 to write to specified chunks of the buffer 1704, a bitmask is included that has a bit corresponding to each chunk of the buffer 1704. The data from the two specified source registers 118 is written to each chunk of the buffer 1704 whose corresponding bit in the bitmask is set. This may be useful for repeated data values within a row of the weight RAM 124. For example, in order to zero out the buffer 1704 (and subsequently a row of the weight RAM 124), the programmer may load the source registers with zero and set all bits of the bitmask. Additionally, the bitmask enables the programmer to only write to selected chunks of the buffer 1704 and thereby retain the previous data in the other chunks.

In one embodiment that includes the buffer 1704, reading from the weight RAM 124 by an architectural program requires multiple MFNN instructions 1500. An initial MFNN instruction 1500 specifies a function 1532 to load the buffer 1704 from a specified row of the weight RAM 124 followed by one or more MFNN instructions 1500 that specify a function 1532 to read a specified chunk of the buffer 1704 into the destination register, where the size of a chunk is the number of bits of a media register 118 and chunks are naturally aligned within the buffer 1704. Other embodiments are contemplated in which the weight RAM 124 includes multiple buffers 1704 to further reduce contention between the NPUs 126 and the architectural program for access to the weight RAM 124 by increasing the number of accesses that can be made by the architectural program while the NPUs 126 are executing, which may increase the likelihood that the accesses by the buffers 1704 can be performed during clock cycles in which the NPUs 126 do not need to access the weight RAM 124.

Although FIG. 16 describes a dual-ported data RAM 122, other embodiments are contemplated in which the weight RAM 124 is also dual-ported. Furthermore, although FIG. 17 describes a buffer for use with the weight RAM 124, other embodiments are contemplated in which the data RAM 122 also has an associated buffer similar to buffer 1704.

Dynamically Configurable NPUs

Figure 18:
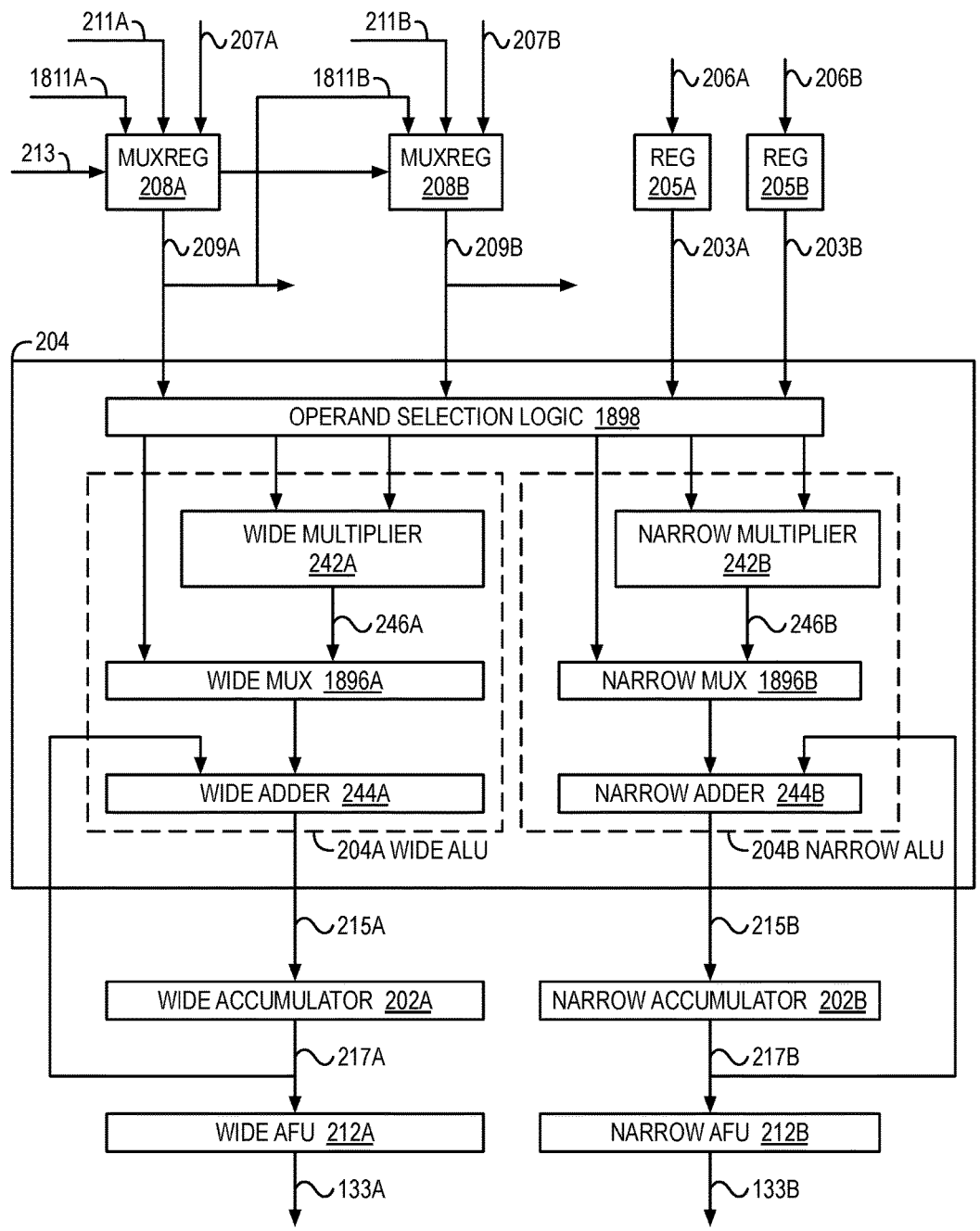
FIG. 18 is a block diagram illustrating a dynamically configurable NPU of FIG. 1.

Referring now to FIG. 18, a block diagram illustrating a dynamically configurable NPU 126 of FIG. 1 is shown. The NPU 126 of FIG. 18 is similar in many respects to the NPU 126 of FIG. 2. However, the NPU 126 of FIG. 18 is dynamically configurable to operate in one of two different configurations. In a first configuration, the NPU 126 of FIG. 18 operates similar to the NPU 126 of FIG. 2. That is, in the first configuration, referred to herein as "wide" configuration or "single" configuration, the ALU 204 of the NPU 126 performs operations on a single wide data word and a single wide weight word (e.g., 16 bits) to generate a single wide result. In contrast, in the second configuration, referred to herein as "narrow" configuration or "dual" configuration, the NPU 126 performs operations on two narrow data words and two respective narrow weight words (e.g., 8 bits) to generate two respective narrow results. In one embodiment, the configuration (wide or narrow) of the NPU 126 is made by the initialize NPU instruction (e.g., at address 0 of FIG. 20, described below). Alternatively, the configuration is made by an MTNN instruction whose function 1432 specifies to configure the NPU 126 to the configuration (wide or narrow). Preferably, configuration registers are populated by the program memory 129 instruction or the MTNN instruction that determine the configuration (wide or narrow). For example, the configuration register outputs are provided to the ALU 204, AFU 212 and logic that generates the mux-reg control signal 213. Generally speaking, the elements of the NPUs 126 of FIG. 18 perform similar functions to their like-numbered elements of FIG. 2 and reference should be made thereto for an understanding of FIG. 18. However, the embodiment of FIG. 18 will now be described, including differences from FIG. 2.

The NPU 126 of FIG. 18 includes two registers 205A and 205B, two 3-input mux-regs 208A and 208B, an ALU 204, two accumulators 202A and 202B, and two AFUs 212A and 212B. Each of the registers 205A/205B is separately half the width (e.g., 8 bits) of register 205 of FIG. 2. Each of the registers 205A/205B receives a respective narrow weight word 206A/206B (e.g., 8 bits) from the weight RAM 124 and provides its output 203A/203B on a subsequent clock cycle to operand selection logic 1898 of the ALU 204. When the NPU 126 is in a wide configuration, the registers 205A/205B effectively function together to receive a wide weight word 206A/206B (e.g., 16 bits) from the weight RAM 124, similar to the manner of the register 205 of the embodiment of FIG. 2; and when the NPU 126 is in a narrow configuration, the registers 205A/205B effectively function individually to each receive a narrow weight word 206A/206B (e.g., 8 bits) from the weight RAM 124 such that the NPU 126 is effectively two separate narrow NPUs. Nevertheless, the same output bits of the weight RAM 124 are coupled to and provided to the registers 205A/205B, regardless of the configuration of the NPU 126. For example, the register 205A of NPU 0 receives byte 0, the register 205B of NPU 0 receives byte 1, the register 205A of NPU 1 receives byte 2, the register 205A of NPU 1 receives byte 3, and so forth to the register 205B of NPU 511 receives byte 1023.

Each of the mux-regs 208A/208B is separately half the width (e.g., 8 bits) of register 208 of FIG. 2. The mux-reg 208A selects one of its inputs 207A or 211A or 1811A to store in its register and then to provide on its output 209A on a subsequent clock cycle, and the mux-reg 208B selects one of its inputs 207B or 211B or 1811B to store in its register and then to provide on its output 209B on a subsequent clock cycle to the operand selection logic 1898. The input 207A receives a narrow data word (e.g., 8 bits) from the data RAM 122, and the input 207B receives a narrow data word from the data RAM 122. When the NPU 126 is in a wide configuration, the mux-regs 208A/208B effectively function together to receive a wide data word 207A/207B (e.g., 16 bits) from the data RAM 122, similar to the manner of the mux-reg 208 of the embodiment of FIG. 2; and when the NPU 126 is in a narrow configuration, the mux-regs 208A/208B effectively function individually to each receive a narrow data word 207A/207B (e.g., 8 bits) from the data RAM 122 such that the NPU 126 is effectively two separate narrow NPUs. Nevertheless, the same output bits of the data RAM 122 are coupled to and provided to the mux-regs 208A/208B, regardless of the configuration of the NPU 126. For example, the mux-reg 208A of NPU 0 receives byte 0, the mux-reg 208B of NPU 0 receives byte 1, the mux-reg 208A of NPU 1 receives byte 2, the mux-reg 208A of NPU 1 receives byte 3, and so forth to the mux-reg 208B of NPU 511 receives byte 1023.

The input 211A receives the output 209A of mux-reg 208A of the adjacent NPU 126, and the input 211B receives the output 209B of mux-reg 208B of the adjacent NPU 126. The input 1811A receives the output 209B of mux-reg 208B of the adjacent NPU 126, and the input 1811B receives the output 209A of mux-reg 208A of the instant NPU 126, as shown. The NPU 126 shown in FIG. 18 is denoted NPU J from among the N NPUs 126 of FIG. 1. That is, NPU J is a representative instance of the N NPUs 126. Preferably, the mux-reg 208A input 211A of NPU J receives the mux-reg 208A output 209A of NPU 126 instance J−1, the mux-reg 208A input 1811A of NPU J receives the mux-reg 208B output 209B of NPU 126 instance J−1, and the mux-reg 208A output 209A of NPU J is provided both to the mux-reg 208A input 211A of NPU 126 instance J+1 and to the mux-reg 208B input 211B of NPU 126 instance J; and the mux-reg 208B input 211B of NPU J receives the mux-reg 208B output 209B of NPU 126 instance J−1, the mux-reg 208B input 1811B of NPU J receives the mux-reg 208A output 209A of NPU 126 instance J, and the mux-reg 208B output 209B of NPU J is provided to both the mux-reg 208A input 1811A of NPU 126 instance J+1 and to the mux-reg 208B input 211B of NPU 126 instance J+1.

The control input 213 controls which of the three inputs each of the mux-regs 208A/208B selects to store in its respective register and that is subsequently provided on the respective outputs 209A/209B. When the NPU 126 is instructed to load a row from the data RAM 122 (e.g., as by the multiply-accumulate instruction at address 1 of FIG. 20, described below), regardless of whether the NPU 126 is in a wide or narrow configuration, the control input 213 controls each of the mux-regs 208A/208B to select a respective narrow data word 207A/207B (e.g., 8 bits) from the corresponding narrow word of the selected row of the data RAM 122.

When the NPU 126 is instructed to rotate the previously received data row values (e.g., as by the multiply-accumulate rotate instruction at address 2 of FIG. 20, described below), if the NPU 126 is in a narrow configuration, the control input 213 controls each of the mux-regs 208A/208B to select the respective input 1811A/1811B. In this case, the mux-regs 208A/208B function individually effectively such that the NPU 126 is effectively two separate narrow NPUs. In this manner, the mux-regs 208A and 208B of the N NPUs 126 collectively operate as a 2N-narrow-word rotater, as described in more detail below with respect to FIG. 19.

When the NPU 126 is instructed to rotate the previously received data row values, if the NPU 126 is in a wide configuration, the control input 213 controls each of the mux-regs 208A/208B to select the respective input 211A/211B. In this case, the mux-regs 208A/208B function together effectively as if the NPU 126 is a single wide NPU 126. In this manner, the mux-regs 208A and 208B of the N NPUs 126 collectively operate as an N-wide-word rotater, similar to the manner described with respect to FIG. 3.

The ALU 204 includes the operand selection logic 1898, a wide multiplier 242A, a narrow multiplier 242B, a wide two-input mux 1896A, a narrow two-input mux 1896B, a wide adder 244A and a narrow adder 244B. Effectively, the ALU 204 comprises the operand selection logic 1898, a wide ALU 204A (comprising the wide multiplier 242A, the wide mux 1896A and the wide adder 244A) and a narrow ALU 204B (comprising the narrow multiplier 242B, the narrow mux 1896B and the narrow adder 244B). Preferably, the wide multiplier 242A multiplies two wide words and is similar to the multiplier 242 of FIG. 2, e.g., a 16-bit by 16-bit multiplier. The narrow multiplier 242B multiplies two narrow words, e.g., an 8-bit by 8-bit multiplier that generates a 16-bit result. When the NPU 126 is in a narrow configuration, the wide multiplier 242A is effectively used, with the help of the operand selection logic 1898, as a narrow multiplier to multiply two narrow words so that the NPU 126 effectively functions as two narrow NPUs. Preferably, the wide adder 244A adds the output of the wide mux 1896A and the wide accumulator 202A output 217A to generate a sum 215A for provision to the wide accumulator 202A and is similar to the adder 244 of FIG. 2. The narrow adder 244B adds the output of the narrow mux 1896B and the narrow accumulator 202B output 217B to generate a sum 215B for provision to the narrow accumulator 202B. In one embodiment, the narrow accumulator 202B is 28 bits wide to avoid loss of precision in the accumulation of up to 1024 16-bit products. When the NPU 126 is in a wide configuration, the narrow multiplier 242B, narrow mux 1896B, narrow adder 244B, narrow accumulator 202B and narrow AFU 212B are preferably inactive to reduce power consumption.

The operand selection logic 1898 selects operands from 209A, 209B, 203A and 203B to provide to the other elements of the ALU 204, as described in more detail below. Preferably, the operand selection logic 1898 also performs other functions, such as performing sign extension of signed-valued data words and weight words. For example, if the NPU 126 is in a narrow configuration, the operand selection logic 1898 sign extends the narrow data word and weight word to the width of a wide word before providing them to the wide multiplier 242A. Similarly, if the ALU 204 is instructed to pass through a narrow data/weight word (bypass the wide multiplier 242A via wide mux 1896A), the operand selection logic 1898 sign extends the narrow data/weight word to the width of a wide word before providing it to the wide adder 244A. Preferably, logic is also present in the ALU 204 of the NPU 126 of FIG. 2 to perform the sign-extension function.

The wide mux 1896A receives the output of the wide multiplier 242A and an operand from the operand selection logic 1898 and selects one of the inputs for provision to the wide adder 244A, and the narrow mux 1896B receives the output of the narrow multiplier 242B and an operand from the operand selection logic 1898 and selects one of the inputs for provision to the narrow adder 244B.

The operands provided by the operand selection logic 1898 depend upon the configuration of the NPU 126 and upon the arithmetic and/or logical operations to be performed by the ALU 204 based on the function specified by the instruction being executed by the NPU 126. For example, if the instruction instructs the ALU 204 to perform a multiply-accumulate and the NPU 126 is in a wide configuration, the operand selection logic 1898 provides to the wide multiplier 242A on one input a wide word that is the concatenation of outputs 209A and 209B and on the other input a wide word that is the concatenation of outputs 203A and 203B, and the narrow multiplier 242B is inactive, so that the NPU 126 functions as a single wide NPU 126 similar to the NPU 126 of FIG. 2. Whereas, if the instruction instructs the ALU 204 to perform a multiply-accumulate and the NPU 126 is in a narrow configuration, the operand selection logic 1898 provides to the wide multiplier 242A on one input an extended, or widened, version of the narrow data word 209A and on the other input an extended version of the narrow weight word 203A; additionally, the operand selection logic 1898 provides to the narrow multiplier 242B on one input the narrow data words 209B and on the other input the narrow weight word 203B. To extend, or widen, a narrow word, if the narrow word is signed, then the operand selection logic 1898 sign-extends the narrow word, whereas if the narrow word is unsigned, the operand selection logic 1898 pads the narrow word with zero-valued upper bits.

For another example, if the NPU 126 is in a wide configuration and the instruction instructs the ALU 204 to perform an accumulate of the weight word, the wide multiplier 242A is bypassed and the operand selection logic 1898 provides the concatenation of outputs 203A and 203B to the wide mux 1896A for provision to the wide adder 244A. Whereas, if the NPU 126 is in a narrow configuration and the instruction instructs the ALU 204 to perform an accumulate of the weight word, the wide multiplier 242A is bypassed and the operand selection logic 1898 provides an extended version of the output 203A to the wide mux 1896A for provision to the wide adder 244A; and the narrow multiplier 242B is bypassed and the operand selection logic 1898 provides an extended version of the output 203B to the narrow mux 1896B for provision to the narrow adder 244B.

For another example, if the NPU 126 is in a wide configuration and the instruction instructs the ALU 204 to perform an accumulate of the data word, the wide multiplier 242A is bypassed and the operand selection logic 1898 provides the concatenation of outputs 209A and 209B to the wide mux 1896A for provision to the wide adder 244A. Whereas, if the NPU 126 is in a narrow configuration and the instruction instructs the ALU 204 to perform an accumulate of the data word, the wide multiplier 242A is bypassed and the operand selection logic 1898 provides an extended version of the output 209A to the wide mux 1896A for provision to the wide adder 244A; and the narrow multiplier 242B is bypassed and the operand selection logic 1898 provides an extended version of the output 209B to the narrow mux 1896B for provision to the narrow adder 244B. The accumulation of weight/data words may be useful for performing averaging operations that are used in pooling layers of some artificial neural network applications, such as image processing.

Preferably, the NPU 126 also includes a second wide mux (not shown) for bypassing the wide adder 244A to facilitate loading the wide accumulator 202A with a wide data/weight word in wide configuration or an extended narrow data/weight word in narrow configuration, and a second narrow mux (not shown) for bypassing the narrow adder 244B to facilitate loading the narrow accumulator 202B with a narrow data/weight word in narrow configuration. Preferably, the ALU 204 also includes wide and narrow comparator/mux combinations (not shown) that receive the respective accumulator value 217A/217B and respective mux 1896A/1896B output to select the maximum value between the accumulator value 217A/217B and a data/weight word 209A/B/203A/B, an operation that is used in pooling layers of some artificial neural network applications, as described in more detail below, e.g., with respect to FIGS. 27 and 28. Additionally, the operand selection logic 1898 is configured to provide zero-valued operands (for addition with zero or for clearing the accumulators) and to provide one-valued operands (for multiplication by one).

The narrow AFU 212B receives the output 217B of the narrow accumulator 202B and performs an activation function on it to generate a narrow result 133B, and the wide AFU 212A receives the output 217A of the wide accumulator 202A and performs an activation function on it to generate a wide result 133A. When the NPU 126 is in a narrow configuration, the wide AFU 212A considers the output 217A of the wide accumulator 202A accordingly and performs an activation function on it to generate a narrow result, e.g., 8 bits, as described in more detail below with respect to FIGS. 29A through 30, for example.

As may observed from the above description, advantageously the single NPU 126 operates effectively as two narrow NPUs when in a narrow configuration, thus providing, for smaller words, approximately up to twice the throughput as when in the wide configuration. For example, assume a neural network layer having 1024 neurons each receiving 1024 narrow inputs from the previous layer (and having narrow weight words), resulting in 1 Mega-connections. An NNU 121 having 512 NPUs 126 in a narrow configuration (1024 narrow NPU) compared to an NNU 121 having 512 NPUs 126 in a wide configuration is capable of processing four times the number of connections (1 Mega-connections vs. 256K connections) in approximately half the time (approx. 1026 clocks vs. 514 clocks), albeit for narrow words rather than wide words.

In one embodiment, the dynamically configurable NPU 126 of FIG. 18 includes 3-input multiplexed-registers similar to mux-regs 208A and 208B in place of the registers 205A and 205B to accomplish a rotater for a row of weight words received from the weight RAM 124 somewhat similar to the manner described with respect to the embodiment of FIG. 7 but in a dynamically configurable fashion as described with respect to FIG. 18.

Figure 19:
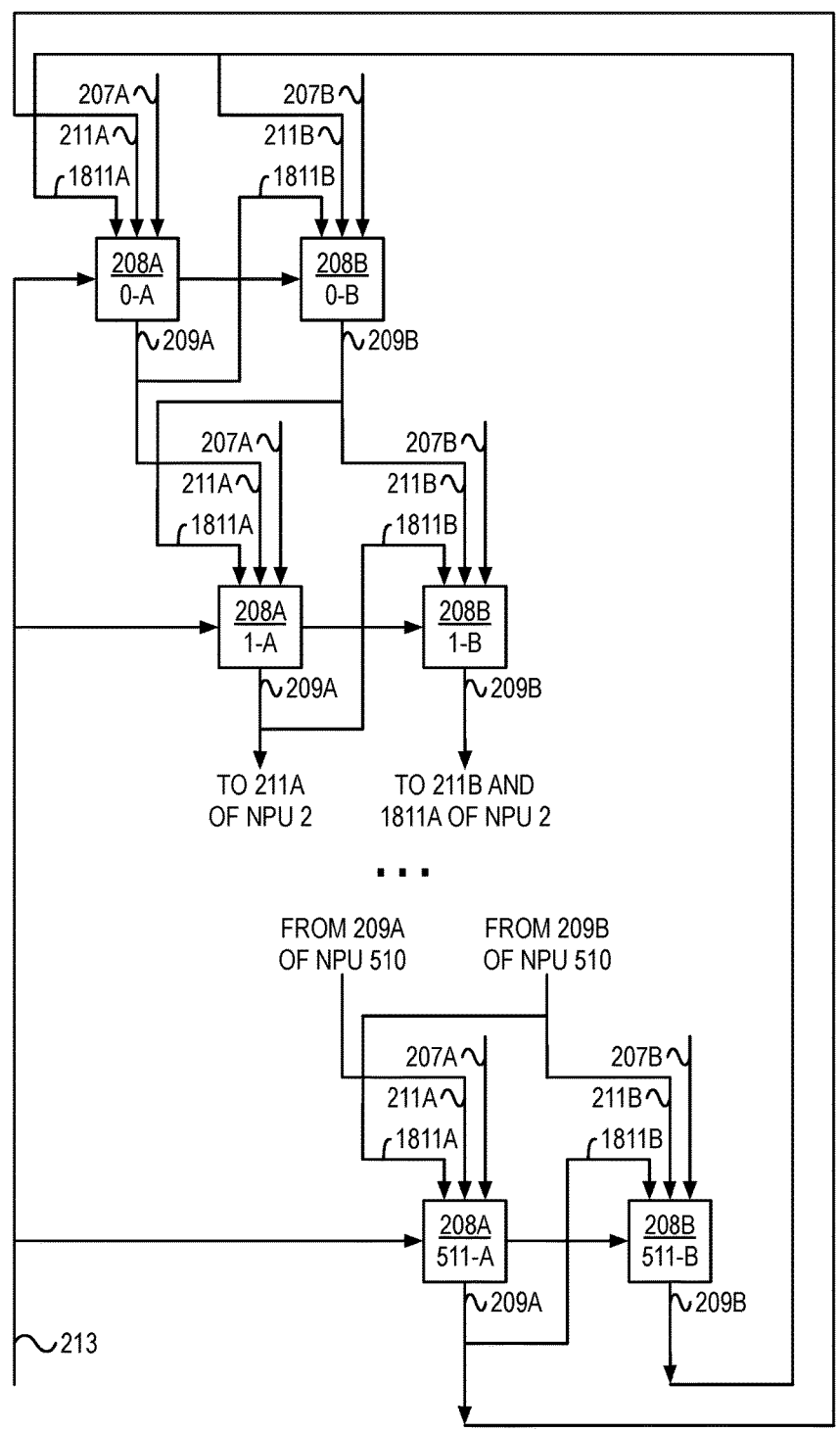
FIG. 19 is a block diagram illustrating an embodiment of the arrangement of the 2N mux-regs of the N NPUs of the NNU of FIG. 1 according to the embodiment of FIG. 18 to illustrate their operation as a rotater for a row of data words received from the data RAM of FIG. 1.

Referring now to FIG. 19, a block diagram illustrating an embodiment of the arrangement of the 2N mux-regs 208A/208B of the N NPUs 126 of the NNU 121 of FIG. 1 according to the embodiment of FIG. 18 to illustrate their operation as a rotater for a row of data words 207 received from the data RAM 122 of FIG. 1 is shown. In the embodiment of FIG. 19, N is 512 such that the NNU 121 has 1024 mux-regs 208A/208B, denoted 0 through 511, corresponding to 512 NPUs 126 and effectively 1024 narrow NPUs, as shown. The two narrow NPUs within a NPU 126 are denoted A and B, and within each of the mux-regs 208, the designation of the corresponding narrow NPU is shown. More specifically, mux-reg 208A of NPU 126 0 is designated 0-A, mux-reg 208B of NPU 126 0 is designated 0-B, mux-reg 208A of NPU 126 1 is designated 1-A, mux-reg 208B of NPU 126 1 is designated 1-B, mux-reg 208A of NPU 126 511 is designated 511-A, and mux-reg 208B of NPU 126 511 is designated 0-B, which values also correspond to the narrow NPUs of FIG. 21 described below.

Each mux-reg 208A receives its corresponding narrow data word 207A of one row of the D rows of the data RAM 122, and each mux-reg 208B receives its corresponding narrow data word 207B of one row of the D rows of the data RAM 122. That is, mux-reg 0A receives narrow data word 0 of the data RAM 122 row, mux-reg 0B receives narrow data word 1 of the data RAM 122 row, mux-reg 1A receives narrow data word 2 of the data RAM 122 row, mux-reg 1B receives narrow data word 3 of the data RAM 122 row, and so forth to mux-reg 511A receives narrow data word 1022 of the data RAM 122 row, and mux-reg 511B receives narrow data word 1023 of the data RAM 122 row. Additionally, mux-reg 1A receives on its input 211A the output 209A of mux-reg 0A, mux-reg 1B receives on its input 211B the output 209B of mux-reg 1B, and so forth to mux-reg 511A that receives on its input 211A the output 209A of mux-reg 510A and mux-reg 511B that receives on its input 211B the output 209B of mux-reg 510B, and mux-reg 0A receives on its input 211A the output 209A of mux-reg 511A and mux-reg 0B receives on its input 211B the output 209B of mux-reg 511B. Each of the mux-regs 208A/208B receives the control input 213 that controls whether to select the data word 207A/207B or the rotated input 211A/211B or the rotated input 1811A/1811B. Finally, mux-reg 1A receives on its input 1811A the output 209B of mux-reg 0B, mux-reg 1B receives on its input 1811B the output 209A of mux-reg 1A, and so forth to mux-reg 511A that receives on its input 1811A the output 209B of mux-reg 510B and mux-reg 511B that receives on its input 1811B the output 209A of mux-reg 511A, and mux-reg 0A receives on its input 1811A the output 209B of mux-reg 511B and mux-reg 0B receives on its input 1811B the output 209A of mux-reg 0A. Each of the mux-regs 208A/208B receives the control input 213 that controls whether to select the data word 207A/207B or the rotated input 211A/211B or the rotated input 1811A/1811B. As described in more detail below, in one mode of operation, on a first clock cycle, the control input 213 controls each of the mux-regs 208A/208B to select the data word 207A/207B for storage in the register and for subsequent provision to the ALU 204; and during subsequent clock cycles (e.g., M−1 clock cycles as described above), the control input 213 controls each of the mux-regs 208A/208B to select the rotated input 1811A/1811B for storage in the register and for subsequent provision to the ALU 204.

Referring now to FIG. 20, a table illustrating a program for storage in the program memory 129 of and execution by the NNU 121 of FIG. 1 having NPUs 126 according to the embodiment of FIG. 18 is shown. The example program of FIG. 20 is similar in many ways to the program of FIG. 4. However, differences will now be described. The initialize NPU instruction at address 0 specifies that the NPU 126 is to be in a narrow configuration. Additionally, the multiply-accumulate rotate instruction at address 2 specifies a count of 1023 and requires 1023 clock cycles, as shown. This is because the example of FIG. 20 assumes effectively 1024 narrow (e.g., 8-bit) neurons (NPUs) of a layer, each having 1024 connection inputs from a previous layer of 1024 neurons, for a total of 1024K connections. Each neuron receives an 8-bit data value from each connection input and multiplies the 8-bit data value by an appropriate 8-bit weight value.

Referring now to FIG. 21, a timing diagram illustrating the execution of the program of FIG. 20 by the NNU 121 that includes NPUs 126 of FIG. 18 operating in a narrow configuration is shown. The timing diagram of FIG. 21 is similar in many ways to the timing diagram of FIG. 5; however, differences will now be described.

In the timing diagram of FIG. 21, the NPUs 126 are in a narrow configuration because the initialize NPU instruction at address 0 initializes them to a narrow configuration. Consequently, the 512 NPUs 126 effectively operate as 1024 narrow NPUs (or neurons), which are designated in the columns as NPU 0-A and NPU 0-B (the two narrow NPUs of NPU 126 0), NPU 1-A and NPU 1-B (the two narrow NPUs of NPU 126 1) and so forth through NPU 511-A and NPU 511-B (the two narrow NPUs of NPU 126 511). For simplicity and clarity of illustration, the operations only for narrow NPUs 0-A, 0-B and 511-B are shown. Due to the fact that the multiply-accumulate rotate at address 2 specifies a count of 1023, which requires 1023 clocks, the rows of the timing diagram of FIG. 21 include up to clock cycle 1026.

At clock 0, each of the 1024 NPUs performs the initialization instruction of FIG. 4, which is illustrated in FIG. 5 by the assignment of a zero value to the accumulator 202.

At clock 1, each of the 1024 narrow NPUs performs the multiply-accumulate instruction at address 1 of FIG. 20. Narrow NPU 0-A accumulates the accumulator 202A value (which is zero) with the product of data RAM 122 row 17 narrow word 0 and weight RAM 124 row 0 narrow word 0; narrow NPU 0-B accumulates the accumulator 202B value (which is zero) with the product of data RAM 122 row 17 narrow word 1 and weight RAM 124 row 0 narrow word 1; and so forth to narrow NPU 511-B accumulates the accumulator 202B value (which is zero) with the product of data RAM 122 row 17 narrow word 1023 and weight RAM 124 row 0 narrow word 1023, as shown.

At clock 2, each of the 1024 narrow NPUs performs a first iteration of the multiply-accumulate rotate instruction at address 2 of FIG. 20. Narrow NPU 0-A accumulates the accumulator 202A value 217A with the product of the rotated narrow data word 1811A received from the mux-reg 208B output 209B of narrow NPU 511-B (which was narrow data word 1023 received from the data RAM 122) and weight RAM 124 row 1 narrow word 0; narrow NPU 0-B accumulates the accumulator 202B value 217B with the product of the rotated narrow data word 1811B received from the mux-reg 208A output 209A of narrow NPU 0-A (which was narrow data word 0 received from the data RAM 122) and weight RAM 124 row 1 narrow word 1; and so forth to narrow NPU 511-B accumulates the accumulator 202B value 217B with the product of the rotated narrow data word 1811B received from the mux-reg 208A output 209A of narrow NPU 511-A (which was narrow data word 1022 received from the data RAM 122) and weight RAM 124 row 1 narrow word 1023, as shown.

At clock 3, each of the 1024 narrow NPUs performs a second iteration of the multiply-accumulate rotate instruction at address 2 of FIG. 20. Narrow NPU 0-A accumulates the accumulator 202A value 217A with the product of the rotated narrow data word 1811A received from the mux-reg 208B output 209B of narrow NPU 511-B (which was narrow data word 1022 received from the data RAM 122) and weight RAM 124 row 2 narrow word 0; narrow NPU 0-B accumulates the accumulator 202B value 217B with the product of the rotated narrow data word 1811B received from the mux-reg 208A output 209A of narrow NPU 0-A (which was narrow data word 1023 received from the data RAM 122) and weight RAM 124 row 2 narrow word 1; and so forth to narrow NPU 511-B accumulates the accumulator 202B value 217B with the product of the rotated narrow data word 1811B received from the mux-reg 208A output 209A of narrow NPU 511-A (which was narrow data word 1021 received from the data RAM 122) and weight RAM 124 row 2 narrow word 1023, as shown. As indicated by the ellipsis of FIG. 21, this continues for each of the following 1021 clock cycles until . . . .

At clock 1024, each of the 1024 narrow NPUs performs a 1023$^{rd}$ iteration of the multiply-accumulate rotate instruction at address 2 of FIG. 20. Narrow NPU 0-A accumulates the accumulator 202A value 217A with the product of the rotated narrow data word 1811A received from the mux-reg 208B output 209B of narrow NPU 511-B (which was narrow data word 1 received from the data RAM 122) and weight RAM 124 row 1023 narrow word 0; NPU 0-B accumulates the accumulator 202B value 217B with the product of the rotated narrow data word 1811B received from the mux-reg 208A output 209A of NPU 0-A (which was narrow data word 2 received from the data RAM 122) and weight RAM 124 row 1023 narrow word 1; and so forth to NPU 511-B accumulates the accumulator 202B value with the product of the rotated narrow data word 1811B received from the mux-reg 208A output 209A of NPU 511-A (which was narrow data word 0 received from the data RAM 122) and weight RAM 124 row 1023 narrow word 1023, as shown.

At clock 1025, the AFU 212A/212B of each of the 1024 narrow NPUs performs the activation function instruction at address 3 of FIG. 20. Finally, at clock 1026, each of the 1024 narrow NPUs performs the write AFU output instruction at address 4 of FIG. 20 by writing back its narrow result 133A/133B to its corresponding narrow word of row 16 of the data RAM 122, i.e., the narrow result 133A of NPU 0-A is written to narrow word 0 of the data RAM 122, the narrow result 133B of NPU 0-B is written to narrow word 1 of the data RAM 122, and so forth to the narrow result 133 of NPU 511-B is written to narrow word 1023 of the data RAM 122. The operation described above with respect to FIG. 21 is also shown in block diagram form in FIG. 22.

Referring now to FIG. 22, a block diagram illustrating the NNU 121 of FIG. 1 including the NPUs 126 of FIG. 18 to execute the program of FIG. 20 is shown. The NNU 121 includes the 512 NPUs 126, i.e., 1024 narrow NPUs, the data RAM 122 that receives its address input 123, and the weight RAM 124 that receives its address input 125. Although not shown, on clock 0 the 1024 narrow NPUs perform the initialization instruction of FIG. 20. As shown, on clock 1, the 1024 8-bit data words of row 17 are read out of the data RAM 122 and provided to the 1024 narrow NPUs. On clocks 1 through 1024, the 1024 8-bit weight words of rows 0 through 1023, respectively, are read out of the weight RAM 124 and provided to the 1024 narrow NPUs. Although not shown, on clock 1, the 1024 narrow NPUs perform their respective multiply-accumulate operations on the loaded data words and weight words. On clocks 2 through 1024, the mux-regs 208A/208B of the 1024 narrow NPUs operate as a 1024 8-bit word rotater to rotate the previously loaded data words of row 17 of the data RAM 122 to the adjacent narrow NPU, and the narrow NPUs perform the multiply-accumulate operation on the respective rotated data narrow word and the respective narrow weight word loaded from the weight RAM 124. Although not shown, on clock 1025, the 1024 narrow AFUs 212A/212B perform the activation instruction. On clock 1026, the 1024 narrow NPUs write back their respective 1024 8-bit results 133A/133B to row 16 of the data RAM 122.

As may be observed, the embodiment of FIG. 18 may be advantageous over the embodiment of FIG. 2, for example, because it provides the flexibility for the programmer to perform computations using wide data and weight words (e.g., 16-bits) when that amount of precision is needed by the particular application being modeled and narrow data and weight words (e.g., 8-bits) when that amount of precision is needed by the application. From one perspective, the embodiment of FIG. 18 provides double the throughput over the embodiment of FIG. 2 for narrow data applications at the cost of the additional narrow elements (e.g., mux-reg 208B, reg 205B, narrow ALU 204B, narrow accumulator 202B, narrow AFU 212B), which is approximately a 50% increase in area of the NPU 126.

Tri-Mode NPUs

Figure 23:
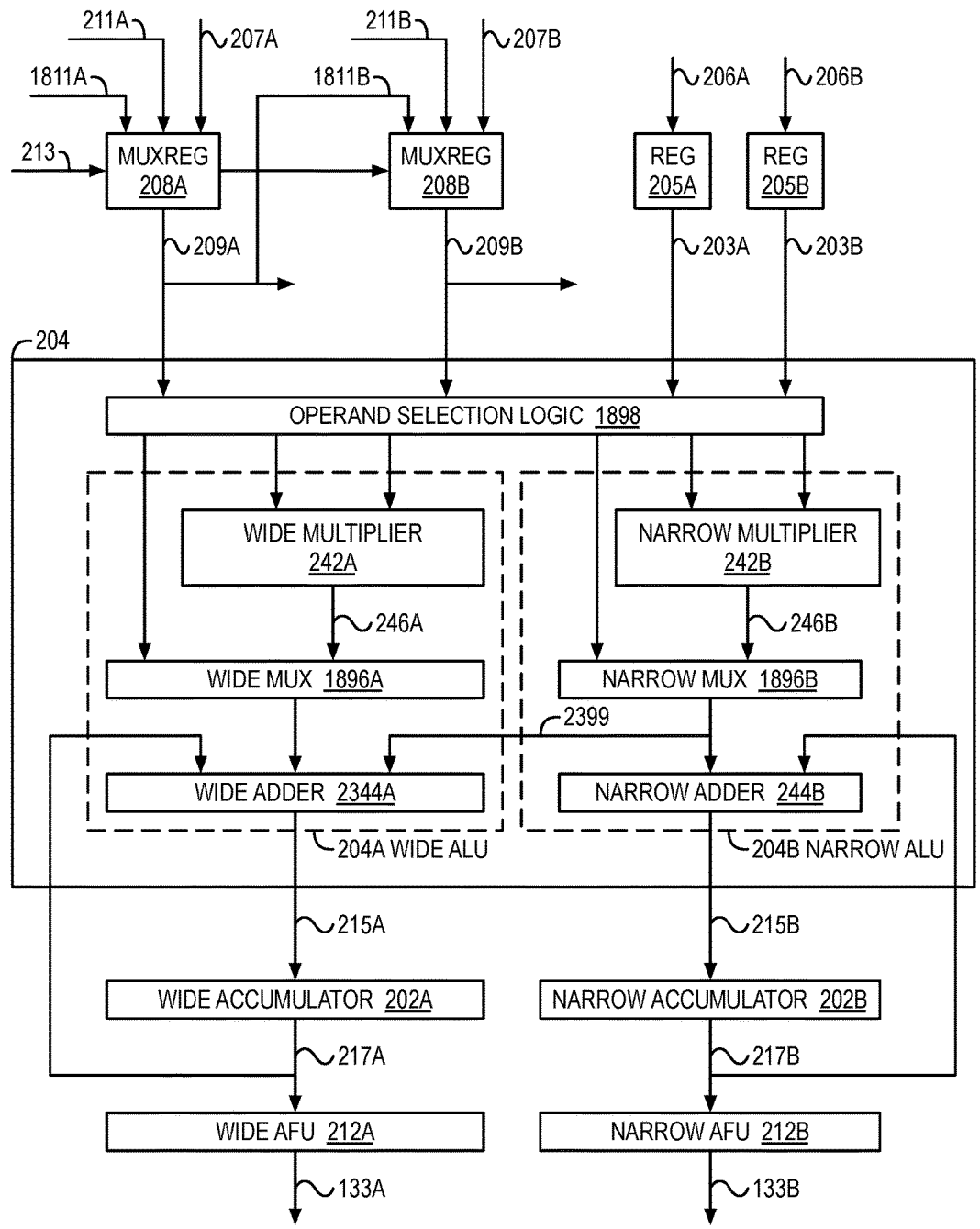
FIG. 23 is a block diagram illustrating a dynamically configurable NPU of FIG. 1 according to an alternate embodiment.

Referring now to FIG. 23, a block diagram illustrating a dynamically configurable NPU 126 of FIG. 1 according to an alternate embodiment is shown. The NPU 126 of FIG. 23 is configurable not only in wide and narrow configurations, but also in a third configuration referred to herein as a "funnel" configuration. The NPU 126 of FIG. 23 is similar in many respects to the NPU 126 of FIG. 18. However, the wide adder 244A of FIG. 18 is replaced in the NPU 126 of FIG. 23 with a 3-input wide adder 2344A that receives a third addend 2399 that is an extended version of the output of the narrow mux 1896B. A program for operating an NNU 121 having the NPUs 126 of FIG. 23 is similar in most respects to the program of FIG. 20. However, the initialize NPU instruction at address 0 initializes the NPUs 126 to a funnel configuration, rather than a narrow configuration. Additionally, the count of the multiply-accumulate rotate instruction at address 2 is 511 rather than 1023.

When in the funnel configuration, the NPU 126 operates similarly to when in the narrow configuration when executing a multiply-accumulate instruction such as at address 1 of FIG. 20 in that it receives two narrow data words 207A/207B and two narrow weight words 206A/206B; the wide multiplier 242A multiplies data word 209A and weight word 203A to generate product 246A which the wide mux 1896A selects; and the narrow multiplier 242B multiplies data word 209B and weight word 203B to generate product 246B which the narrow mux 1896B selects. However, the wide adder 2344A adds both the product 246A (selected by wide mux 1896A) and the product 246B/2399 (selected by wide mux 1896B) to the wide accumulator 202A value 217A, and narrow adder 244B and narrow accumulator 202B are inactive. Furthermore, when in the funnel configuration, when executing a multiply-accumulate rotate instruction such as at address 2 of FIG. 20, the control input 213 causes the mux-regs 208A/208B to rotate by two narrow words (e.g., 16-bits), i.e., the mux-regs 208A/208B select their respective 211A/211B inputs as if they were in a wide configuration. However, the wide multiplier 242A multiplies data word 209A and weight word 203A to generate product 246A which the wide mux 1896A selects; and the narrow multiplier 242B multiplies data word 209B and weight word 203B to generate product 246B which the narrow mux 1896B selects; and the wide adder 2344A adds both the product 246A (selected by wide mux 1896A) and the product 246B/2399 (selected by wide mux 1896B) to the wide accumulator 202A value 217A, and the narrow adder 244B and narrow accumulator 202B are inactive as described above. Finally, when in the funnel configuration, when executing an activation function instruction such as at address 3 of FIG. 20, the wide AFU 212A performs the activation function on the resulting sum 215A to generate a narrow result 133A and the narrow AFU 212B is inactive. Hence, only the A narrow NPUs generate a narrow result 133A, and the narrow results 133B generated by the B narrow NPUs are invalid. Consequently, the row of results written back (e.g., to row 16 as at the instruction at address 4 of FIG. 20) includes holes since only the narrow results 133A are valid and the narrow results 133B are invalid. Thus, conceptually, each clock cycle each neuron (NPU 126 of FIG. 23) processes two connection data inputs, i.e., multiplies two narrow data words by their respective weights and accumulates the two products, in contrast to the embodiments of FIGS. 2 and 18 which each process a single connection data input per clock cycle.

As may be observed with respect to the embodiment of FIG. 23, the number of result words (neuron outputs) produced and written back to the data RAM 122 or weight RAM 124 is half the square root of the number of data inputs (connections) received and the written back row of results has holes, i.e., every other narrow word result is invalid, more specifically, the B narrow NPU results are not meaningful. Thus, the embodiment of FIG. 23 may be particularly efficient in neural networks having two successive layers in which, for example, the first layer has twice as many neurons as the second layer (e.g., the first layer has 1024 neurons fully connected to a second layer of 512 neurons). Furthermore, the other execution units 112 (e.g., media units, such as x86 AVX units) may perform pack operations on a disperse row of results (i.e., having holes) to make compact it (i.e., without holes), if necessary, for use in subsequent computations while the NNU 121 is performing other computations associated with other rows of the data RAM 122 and/or weight RAM 124.

Hybrid NNU Operation; Convolution and Pooling Capabilities

Figure 24:
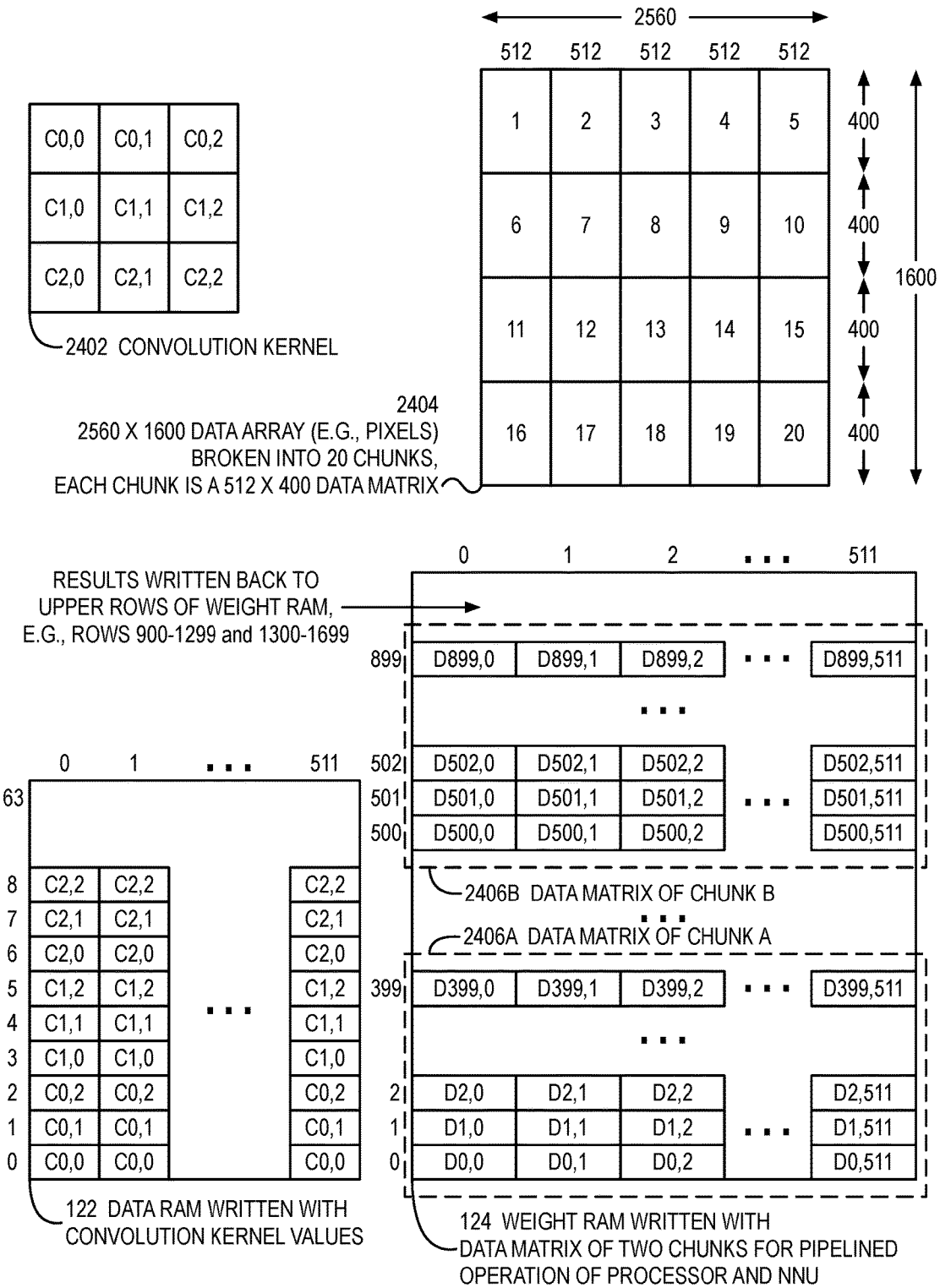
FIG. 24 is a block diagram illustrating an example of data structures used by the NNU of FIG. 1 to perform a convolution operation.
Figure 25:
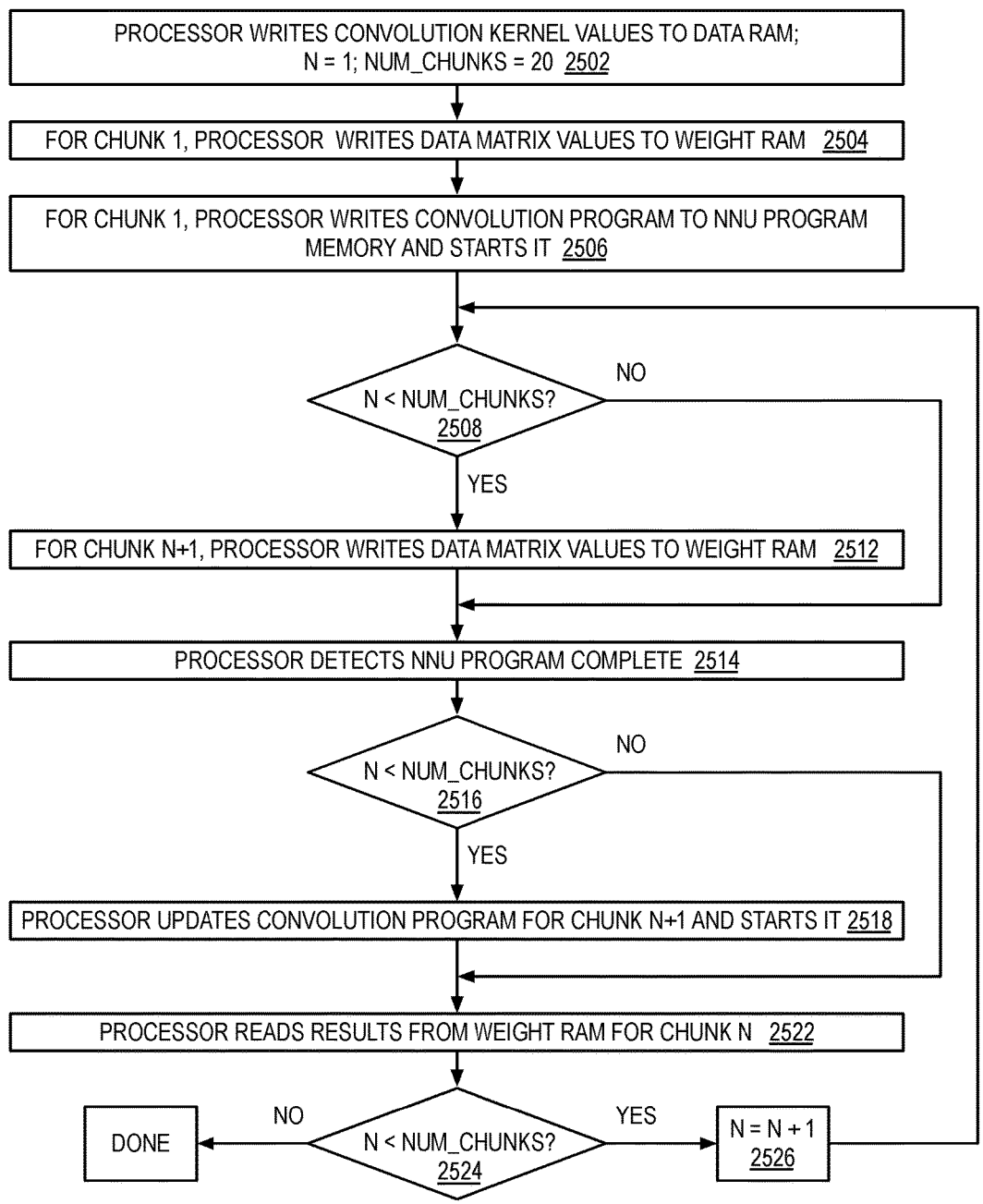
FIG. 25 is a flowchart illustrating operation of the processor of FIG. 1 to perform an architectural program that uses the NNU to perform a convolution of the convolution kernel with the data array of FIG. 24.

An advantage of the NNU 121 according to embodiments described herein is that the NNU 121 is capable of concurrently operating in a fashion that resembles a coprocessor in that it executes its own internal program and operating in a fashion that resembles an execution unit of a processor in that it executes architectural instructions (or microinstructions translated therefrom) issued to it. The architectural instructions are of an architectural program being performed by the processor that includes the NNU 121. In this manner, the NNU 121 operates in a hybrid fashion, which is advantageous because it provides the ability to sustain high utilization of the NNU 121. For example, the FIGS. 24 through 26 illustrate the operation of the NNU 121 to perform a convolution operation in which the NNU 121 is highly utilized, and FIGS. 27 through 28 illustrate the operation of the NNU 121 to perform a pooling operation, which are required for convolution layers and pooling layers and other digital data computing applications, such as image processing (e.g., edge detection, sharpening, blurring, recognition/classification). However, the hybrid operation of the NNU 121 is not limited to performing a convolution or pooling operation, rather the hybrid feature may be used to perform other operations, such as classic neural network multiply-accumulate and activation function operations as described above with respect to FIGS. 4 through 13. That is, the processor 100 (more specifically, the reservation stations 108) issue MTNN 1400 and MFNN 1500 instructions to the NNU 121 in response to which the NNU 121 writes data to the memories 122/124/129 and reads results from the memories 122/124 written there by the NNU 121, while concurrently the NNU 121 reads and writes the memories 122/124/129 in response to executing programs written to the program memory 129 by the processor 100 (via MTNN 1400 instructions).

Referring now to FIG. 24, a block diagram illustrating an example of data structures used by the NNU 121 of FIG. 1 to perform a convolution operation are shown. The block diagram includes a convolution kernel 2402, a data array 2404, and the data RAM 122 and weight RAM 124 of FIG. 1. Preferably, the data array 2404 (e.g., of image pixels) is held in system memory (not shown) attached to the processor 100 and loaded into the weight RAM 124 of the NNU 121 by the processor 100 executing MTNN instructions 1400. A convolution operation is an operation that convolves a first matrix with a second matrix, the second matrix referred to as a convolution kernel herein. As understood in the context of the present disclosure, a convolution kernel is a matrix of coefficients, which may also be referred to as weights, parameters, elements or values. Preferably, the convolution kernel 2042 is static data of the architectural program being executed by the processor 100.

The data array 2404 is a two-dimensional array of data values, and each data value (e.g., an image pixel value) is the size of a word of the data RAM 122 or weight RAM 124 (e.g., 16 bits or 8 bits). In the example, the data values are 16-bit words and the NNU 121 is configured as 512 wide configuration NPUs 126. Additionally, in the embodiment, the NPUs 126 include mux-regs for receiving the weight words 206 from the weight RAM 124, such as mux-reg 705 of FIG. 7, in order to perform the collective rotater operation of a row of data values received from the weight RAM 124, as described in more detail below. In the example, the data array 2404 is a 2560 column×1600 row pixel array. When the architectural program convolves the data array 2404 with the convolution kernel 2402, it breaks the data array 2404 into 20 chunks, each chunk being a 512×400 data matrix 2406, as shown.

The convolution kernel 2042, in the example, is a 3×3 matrix of coefficients, or weights, or parameters, or elements. The first row of coefficients are denoted C0,0; C0,1; and C0,2; the second row of coefficients are denoted C1,0; C1,1; and C1,2; and the third row of coefficients are denoted C2,0; C2,1; and C2,2. For example, a convolution kernel that may be used for performing edge detection has the following coefficients: 0, 1, 0, 1, −4, 1, 0, 1, 0. For another example, a convolution kernel that may be used to Gaussian blur an image has the following coefficients: 1, 2, 1, 2, 4, 2, 1, 2, 1. In this case, a divide is typically performed on the final accumulated value, where the divisor is the sum of the absolute values of the elements of the convolution kernel 2042, which is 16 in this example. For another example, the divisor is the number of elements of the convolution kernel 2042. For another example, the divisor is a value that compresses the convolutions back within a desired range of values, and the divisor is determined from the values of the elements of the convolution kernel 2042 and the desired range and the range of the input values of the matrix being convolved.

As shown in FIG. 24 and described in more detail with respect to FIG. 25, the architectural program writes the data RAM 122 with the coefficients of the convolution kernel 2042. Preferably, all the words of each of nine (the number of elements in the convolution kernel 2402) consecutive rows of the data RAM 122 are written with a different element of the convolution kernel 2402 in row-major order. That is, each word of one row is written with the first coefficient C0,0; the next row is written with the second coefficient C0,1; the next row is written with the third coefficient C0,2; the next row is written with the fourth coefficient C1,0; and so forth until each word of the ninth row is written with the ninth coefficient C2,2, as shown. To convolve a data matrix 2406 of a chunk of the data array 2404, the NPUs 126 repeatedly read, in order, the nine rows of the data RAM 122 that hold the convolution kernel 2042 coefficients, as described in more detail below, particularly with respect to FIG. 26A.

As shown in FIG. 24 and described in more detail with respect to FIG. 25, the architectural program writes the weight RAM 124 with the values of a data matrix 2406. As the NNU program performs the convolution, it writes back the resulting matrix to the weight RAM 124. Preferably, the architectural program writes a first data matrix 2406 to the weight RAM 124 and starts the NNU 121, and while the NNU 121 is convolving the first data matrix 2406 with the convolution kernel 2042, the architectural program writes a second data matrix 2406 to the weight RAM 124 so that as soon as the NNU 121 completes the convolution of the first data matrix 2406, the NNU 121 can start convolving the second data matrix 2406, as described in more detail with respect to FIG. 25. In this manner, the architectural program ping-pongs back and forth between the two regions of the weight RAM 124 in order to keep the NNU 121 fully utilized. Thus, the example of FIG. 24 shows a first data matrix 2406A corresponding to a first chunk occupying rows 0 through 399 of the weight RAM 124, and a second data matrix 2406B corresponding to a second chunk occupying rows 500 through 899 of the weight RAM 124. Furthermore, as shown, the NNU 121 writes back the results of the convolutions to rows 900-1299 and 1300-1699 of the weight RAM 124, which the architectural program subsequently reads out of the weight RAM 124. The data values of the data matrix 2406 held in the weight RAM 124 are denoted "Dx,y" where "x" is the weight RAM 124 row number and "y" is the word, or column, number of the weight RAM 124. Thus, for example, data word 511 in row 399 is denoted D399, 511 in FIG. 24, which is received by the mux-reg 705 of NPU 511.

Referring now to FIG. 25, a flowchart illustrating operation of the processor 100 of FIG. 1 to perform an architectural program that uses the NNU 121 to perform a convolution of the convolution kernel 2042 with the data array 2404 of FIG. 24. Flow begins at block 2502.

At block 2502, the processor 100, i.e., the architectural program running on the processor 100, writes the convolution kernel 2042 of FIG. 24 to the data RAM 122 in the manner shown and described with respect to FIG. 24. Additionally, the architectural program initializes a variable N to a value of 1. The variable N denotes the current chunk of the data array 2404 being processed by the NNU 121. Additionally, the architectural program initializes a variable NUM_CHUNKS to a value of 20. Flow proceeds to block 2504.

At block 2504, the processor 100 writes the data matrix 2406 for chunk 1 to the weight RAM 124, as shown in FIG. 24 (e.g., data matrix 2406A of chunk 1). Flow proceeds to block 2506.

At block 2506, the processor 100 writes a convolution program to the NNU 121 program memory 129, using MTNN 1400 instructions that specify a function 1432 to write the program memory 129. The processor 100 then starts the NNU convolution program using a MTNN 1400 instruction that specifies a function 1432 to start execution of the program. An example of the NNU convolution program is described in more detail with respect to FIG. 26A. Flow proceeds to decision block 2508.

At decision block 2508, the architectural program determines whether the value of variable N is less than NUM_CHUNKS. If so, flow proceeds to block 2512; otherwise, flow proceeds to block 2514.

At block 2512, the processor 100 writes the data matrix 2406 for chunk N+1 to the weight RAM 124, as shown in FIG. 24 (e.g., data matrix 2406B of chunk 2). Thus, advantageously, the architectural program writes the data matrix 2406 for the next chunk to the weight RAM 124 while the NNU 121 is performing the convolution on the current chunk so that the NNU 121 can immediately start performing the convolution on the next chunk once the convolution of the current chunk is complete, i.e., written to the weight RAM 124. Flow proceeds to block 2514.

At block 2514, the processor 100 determines that the currently running NNU program (started at block 2506 in the case of chunk 1, and started at block 2518 in the case of chunks 2-20) has completed. Preferably, the processor 100 determines this by executing a MFNN 1500 instruction to read the NNU 121 status register 127. In an alternate embodiment, the NNU 121 generates an interrupt to indicate it has completed the convolution program. Flow proceeds to decision block 2516.

At decision block 2516, the architectural program determines whether the value of variable N is less than NUM_CHUNKS. If so, flow proceeds to block 2518; otherwise, flow proceeds to block 2522.

At block 2518, the processor 100 updates the convolution program so that it can convolve chunk N+1. More specifically, the processor 100 updates the weight RAM 124 row value of the initialize NPU instruction at address 0 to the first row of the data matrix 2406 (e.g., to row 0 for data matrix 2406A or to row 500 for data matrix 2406B) and updates the output row (e.g., to 900 or 1300). The processor 100 then starts the updated NNU convolution program. Flow proceeds to block 2522.

At block 2522, the processor 100 reads the results of the NNU convolution program from the weight RAM 124 for chunk N. Flow proceeds to decision block 2524.

At decision block 2524, the architectural program determines whether the value of variable N is less than NUM_CHUNKS. If so, flow proceeds to block 2526; otherwise, flow ends.

At block 2526, the architectural program increments N by one. Flow returns to decision block 2508.

Referring now to FIG. 26A, a program listing of an NNU program that performs a convolution of a data matrix 2406 with the convolution kernel 2042 of FIG. 24 and writes it back to the weight RAM 124 is shown. The program loops a number of times through a loop body of instructions at addresses 1 through 9. An initialize NPU instruction at address 0 specifies the number of times each NPU 126 executes the loop body, which in the example of FIG. 26A has a loop count value of 400, corresponding to the number of rows in a data matrix 2406 of FIG. 24, and a loop instruction at the end of the loop (at address 10) decrements the current loop count value and if the result is non-zero causes control to return to the top of the loop body (i.e., to the instruction at address 1). The initialize NPU instruction also clears the accumulator 202 to zero. Preferably, the loop instruction at address 10 also clears the accumulator 202 to zero. Alternatively, as described above, the multiply-accumulate instruction at address 1 may specify to clear the accumulator 202 to zero.

For each execution of the loop body of the program, the 512 NPUs 126 concurrently perform 512 convolutions of the 3×3 convolution kernel 2402 and 512 respective 3×3 sub-matrices of a data matrix 2406. The convolution is the sum of the nine products of an element of the convolution kernel 2042 and its corresponding element of the respective sub-matrix. In the embodiment of FIG. 26A, the origin (center element) of each of the 512 respective 3×3 sub-matrices is the data word Dx+1, y+1 of FIG. 24, where y (column number) is the NPU 126 number, and x (row number) is the current weight RAM 124 row number that is read by the multiply-accumulate instruction at address 1 of the program of FIG. 26A (also, the row number is initialized by the initialize NPU instruction at address 0, incremented at each of the multiply-accumulate instructions at addresses 3 and 5, and updated by the decrement instruction at address 9). Thus, for each loop of the program, the 512 NPUs 126 compute the 512 convolutions and write the 512 convolution results back to a specified row of the weight RAM 124. In the present description, edge handling is ignored for simplicity, although it should be noted that the use of the collective rotating feature of the NPUs 126 will cause wrapping for two of the columns from one vertical edge of the data matrix 2406 (e.g., of the image in the case of image processing) to the other vertical edge (e.g., from the left edge to the right edge or vice versa). The loop body will now be described.

At address 1 is a multiply-accumulate instruction that specifies row 0 of the data RAM 122 and implicitly uses the current weight RAM 124 row, which is preferably held in the sequencer 128 (and which is initialized to zero by the instruction at address 0 for the first pass through the loop body). That is, the instruction at address 1 causes each of the NPUs 126 to read its corresponding word from row 0 of the data RAM 122 and read its corresponding word from the current weight RAM 124 row and perform a multiply-accumulate operation on the two words. Thus, for example, NPU 5 multiplies C0,0 and Dx, 5 (where "x" is the current weight RAM 124 row), adds the result to the accumulator 202 value 217 and writes the sum back to the accumulator 202.

At address 2 is a multiply-accumulate instruction that specifies to increment the data RAM 122 row (i.e., to row 1) and then read the row from the data RAM 122 at the incremented address. The instruction also specifies to rotate the values in the mux-reg 705 of each NPU 126 to the adjacent NPU 126, which in this case is the row of data matrix 2406 values just read from the weight RAM 124 in response to the instruction at address 1. In the embodiment of FIGS. 24 through 26, the NPUs 126 are configured to rotate the values of the mux-regs 705 to the left, i.e., from NPU J to NPU J−1, rather than from NPU J to NPU J+1 as described above with respect to FIGS. 3, 7 and 19. It should be understood that in an embodiment in which the NPUs 126 are configured to rotate right, the architectural program may write the convolution kernel 2042 coefficient values to the data RAM 122 in a different order (e.g., rotated around its central column) in order to accomplish a similar convolution result. Furthermore, the architectural program may perform additional pre-processing (e.g., transposition) of the convolution kernel 2042 as needed. Additionally, the instruction specifies a count value of 2. Thus, the instruction at address 2 causes each of the NPUs 126 to read its corresponding word from row 1 of the data RAM 122 and receive the rotated word into the mux-reg 705 and perform a multiply-accumulate operation on the two words. Due to the count value of 2, the instruction also causes each of the NPUs 126 to repeat the operation just described. That is, the sequencer 128 increments the data RAM 122 row address 123 (i.e., to row 2) and each NPU 126 reads its corresponding word from row 2 of the data RAM 122 and receives the rotated word into the mux-reg 705 and performs a multiply-accumulate operation on the two words. Thus, for example, assuming the current weight RAM 124 row is 27, after executing the instruction at address 2, NPU 5 will have accumulated into its accumulator 202 the product of C0,1 and D27,6 and the product of C0,2 and D27,7. Thus, after the completion of the instructions at addresses 1 and 2, the product of C0,0 and D27,5, the product of C0,1 and D27,6, and the product of C0,2 and D27,7 will have been accumulated into the accumulator 202, along with all the other accumulated values from previous passes through the loop body.

The instructions at addresses 3 and 4 perform a similar operation as the instructions at addresses 1 and 2, however for the next row of the weight RAM 124, by virtue of the weight RAM 124 row increment indicator, and for the next three rows of the data RAM 122, i.e., rows 3 through 5. That is, with respect to NPU 5, for example, after the completion of the instructions at addresses 1 through 4, the product of C0,0 and D27,5, the product of C0,1 and D27,6, the product of C0,2 and D27,7, the product of C1,0 and D28,5, the product of C1,1 and D28,6, and the product of C1,2 and D28,7 will have been accumulated into the accumulator 202, along with all the other accumulated values from previous passes through the loop body.

The instructions at addresses 5 and 6 perform a similar operation as the instructions at addresses 3 and 4, however for the next row of the weight RAM 124, and for the next three rows of the data RAM 122, i.e., rows 6 through 8. That is, with respect to NPU 5, for example, after the completion of the instructions at addresses 1 through 6, the product of C0,0 and D27,5, the product of C0,1 and D27,6, the product of C0,2 and D27,7, the product of C1,0 and D28,5, the product of C1,1 and D28,6, the product of C1,2 and D28,7, the product of C2,0 and D29,5, the product of C2,1 and D29,6, and the product of C2,2 and D29,7 will have been accumulated into the accumulator 202, along with all the other accumulated values from previous passes through the loop body. That is, after the completion of the instructions at addresses 1 through 6, and assuming the weight RAM 124 row at the beginning of the loop body was 27, NPU 5, for example, will have used the convolution kernel 2042 to convolve the following 3×3 sub-matrix:

$$D27,5 \quad D27,6 \quad D27,7$$
$$D28,5 \quad D28,6 \quad D28,7$$
$$D29,5 \quad D29,6 \quad D29,7$$

More generally, after the completion of the instructions at addresses 1 through 6, each of the 512 NPUs 126 will have used the convolution kernel 2042 to convolve the following 3×3 sub-matrix:

$$Dr,n \quad Dr,n+1 \quad Dr,n+2$$
$$Dr+1,n \quad Dr+1,n+1 \quad Dr+1,n+2$$
$$Dr+2,n \quad Dr+2,n+1 \quad Dr+2,n+2$$

where r is the weight RAM 124 row address value at the beginning of the loop body, and n is the NPU 126 number.

The instruction at address 7 passes through the accumulator 202 value 217 through the AFU 212. The pass through function passes through a word that is the size (in bits) of the words read from the data RAM 122 and weight RAM 124 (i.e., in the example, 16 bits). Preferably, the user may specify the format of the output, e.g., how many of the output bits are fractional bits, as described in more detail below. Alternatively, rather than specifying a pass through activation function, a divide activation function is specified that divides the accumulator 202 value 217 by a divisor, such as described herein, e.g., with respect to FIGS. 29A and 30, e.g., using one of the "dividers" 3014/3016 of FIG. 30. For example, in the case of a convolution kernel 2042 with a coefficient, such as the one-sixteenth coefficient of the Gaussian blur kernel described above, rather than a pass through function, the activation function instruction at address 7 may specify a divide (e.g., by 16) activation function. Alternatively, the architectural program may perform the divide by 16 on the convolution kernel 2042 coefficients before writing them to the data RAM 122 and adjust the location of the binary point accordingly for the convolution kernel 2402 values, e.g., using the data binary point 2922 of FIG. 29, described below.

The instruction at address 8 writes the output of the AFU 212 to the row of the weight RAM 124 specified by the current value of the output row register, which was initialized by the instruction at address 0 and which is incremented each pass through the loop by virtue of the increment indicator in the instruction.

As may be determined from the example of FIGS. 24 through 26 having a 3×3 convolution kernel 2402, the NPUs 126 read the weight RAM 124 approximately every third clock cycle to read a row of the data matrix 2406 and write the weight RAM 124 approximately every 12 clock cycles to write the convolution result matrix. Additionally, assuming an embodiment that includes a write and read buffer such as the buffer 1704 of FIG. 17, concurrently with the NPU 126 reads and writes, the processor 100 reads and writes the weight RAM 124 such that the buffer 1704 performs one write and one read of the weight RAM 124 approximately every 16 clock cycles to write the data matrices 2406 and to read the convolution result matrices, respectively. Thus, approximately half the bandwidth of the weight RAM 124 is consumed by the hybrid manner in which the NNU 121 performs the convolution operation. Although the example includes a 3×3 convolution kernel 2042, other size convolution kernels may be employed, such as 2×2, 4×4, 5×5, 6×6, 7×7, 8×8, etc. matrices, in which case the NNU program will vary. In the case of a larger convolution kernel, a smaller percentage of the weight RAM 124 bandwidth is consumed since the NPUs 126 read the weight RAM 124 a smaller percentage of the time because the count in the rotating versions of the multiply-accumulate instructions is larger (e.g., at addresses 2, 4 and 6 of the program of FIG. 26A and additional such instructions that would be needed for a larger convolution kernel).

Alternatively, rather than writing back the results of the convolutions to different rows of the weight RAM 124 (e.g., 900-1299 and 1300-1699), the architectural program configures the NNU program to overwrite rows of the input data matrix 2406 after the rows are no longer needed. For example, in the case of a 3×3 convolution kernel, rather than writing the data matrix 2406 into rows 0-399 of the weight RAM 124, the architectural program writes the data matrix 2406 into rows 2-401, and the NNU program is configured to write the convolution results to the weight RAM 124 beginning at row 0 and incrementing each pass through the loop body. In this fashion, the NNU program is overwriting only rows that are no longer needed. For example, after the first pass through the loop body (or more specifically after the execution of the instruction at address 1 which loads in row 0 of the weight RAM 124), the data in row 0 can now be overwritten, although the data in rows 1-3 will be needed in the second pass through the loop body and are therefore not overwritten by the first pass through the loop body; similarly, after the second pass through the loop body, the data in row 1 can now be overwritten, although the data in rows 2-4 will be needed in the second pass through the loop body and are therefore not overwritten by the second pass through the loop body; and so forth. In such an embodiment, the height of each data matrix 2406 (chunk) may be larger (e.g., 800 rows), resulting in fewer chunks.

Alternatively, rather than writing back the results of the convolutions to the weight RAM 124, the architectural program configures the NNU program to write back the results of the convolutions to rows of the data RAM 122 above the convolution kernel 2402 (e.g., above row 8), and the architectural program reads the results from the data RAM 122 as the NNU 121 writes them (e.g., using the address of the most recently written data RAM 122 row 2606 of FIG. 26B, described below). This alternative may be advantageous in an embodiment in which the weight RAM 124 is single-ported and the data RAM 122 is dual-ported.

As may be observed from the operation of the NNU 121 according to the embodiment of FIGS. 24 through 26A, each execution of the program of FIG. 26A takes approximately 5000 clock cycles and, consequently, the convolving of the entire 2560×1600 data array 2404 of FIG. 24 takes approximately 100,000 clock cycles, which may be considerably less than the number of clock cycles required to perform a similar task by conventional methods.

Referring now to FIG. 26B, a block diagram illustrating certain fields of the control register 127 of the NNU 121 of FIG. 1 according to one embodiment is shown. The status register 127 includes a field 2602 that indicates the address of the most recent row of the weight RAM 124 written by the NPUs 126; a field 2606 that indicates the address of the most recent row of the data RAM 122 written by the NPUs 126; a field 2604 that indicates the addresses of the most recent row of the weight RAM 124 read by the NPUs 126; and a field 2608 that indicates the addresses of the most recent row of the data RAM 122 read by the NPUs 126. This enables the architectural program executing on the processor 100 to determine the progress of the NNU 121 as it marches through reading and/or writing the data RAM 122 and/or weight RAM 124. Employing this capability, along with the choice to overwrite the input data matrix as described above (or to write the results to the data RAM 122, as mentioned above), the data array 2404 of FIG. 24 may be processed as 5 chunks of 512×1600 rather than 20 chunks of 512×400, for example, as follows. The processor 100 writes a first 512× 1600 chunk into the weight RAM 124 starting at row 2 and starts the NNU program (which has a loop count of 1600 and an initialized weight RAM 124 output row of 0). As the NNU 121 executes the NNU program, the processor 100 monitors the location/address of the weight RAM 124 output in order to (1) read (using MFNN 1500 instructions) the rows of the weight RAM 124 that have valid convolution results written by the NNU 121 (beginning at row 0), and (2) to write the second 512×1600 data matrix 2406 (beginning at row 2) over the valid convolution results once they have already been read, so that when the NNU 121 completes the NNU program on the first 512×1600 chunk, the processor 100 can immediately update the NNU program as needed and start it again to process the second 512×1600 chunk. This process is repeated three more times for the remaining three 512×1600 chunks to accomplish high utilization of the NNU 121.

Advantageously, in one embodiment, the AFU 212 includes the ability to efficiently perform an effective division of the accumulator 202 value 217, as described in more detail below, particularly with respect to FIGS. 29A and 29B and 30. For example, an activation function NNU instruction that divides the accumulator 202 value 217 by 16 may be used for the Gaussian blurring matrix described above.

Although the convolution kernel 2402 used in the example of FIG. 24 is a small static convolution kernel applied to the entire data array 2404, in other embodiments the convolution kernel may be a large matrix that has unique weights associated with the different data values of the data array 2404, such as is commonly found in convolutional neural networks. When the NNU 121 is used in such a manner, the architectural program may swap the locations of the data matrix and the convolution kernel, i.e., place the data matrix in the data RAM 122 and the convolution kernel in the weight RAM 124, and the number of rows that may be processed by a given execution of the NNU program may be relatively smaller.

Referring now to FIG. 27, a block diagram illustrating an example of the weight RAM 124 of FIG. 1 populated with input data upon which a pooling operation is performed by the NNU 121 of FIG. 1. A pooling operation, performed by a pooling layer of an artificial neural network, reduces the dimensions of a matrix of input data (e.g., an image or convolved image) by taking sub-regions, or sub-matrices, of the input matrix and computing either the maximum or average value of the sub-matrices, and the maximum or average values become a resulting matrix, or pooled matrix. In the example of FIGS. 27 and 28, the pooling operation computes the maximum value of each sub-matrix. Pooling operations are particularly useful in artificial neural networks that perform object classification or detection, for example. Generally, a pooling operation effectively reduces the size of its input matrix by a factor of the number of elements in the sub-matrix examined, and in particular, reduces the input matrix in each dimension by the number of elements in the corresponding dimension of the sub-matrix. In the example of FIG. 27, the input data is a 512×1600 matrix of wide words (e.g., 16 bits) stored in rows 0 through 1599 of the weight RAM 124. In FIG. 27, the words are denoted by their row, column location, e.g., the word in row 0 and column 0 is denoted D0,0; the word in row 0 and column 1 is denoted D0,1; the word in row 0 and column 2 is denoted D0,2; and so forth to the word in row 0 and column 511 is denoted D0,511. Similarly, the word in row 1 and column 0 is denoted D1,0; the word in row 1 and column 1 is denoted D1,1; the word in row 1 and column 2 is denoted D1,2; and so forth to the word in row 1 and column 511 is denoted D1,511; and so forth to the word in row 1599 and column 0 is denoted D1599,0; the word in row 1599 and column 1 is denoted D1599,1; the word in row 1599 and column 2 is denoted D1599,2; and so forth to the word in row 1599 and column 511 is denoted D1599,511.

Referring now to FIG. 28, a program listing of an NNU program that performs a pooling operation of the input data matrix of FIG. 27 and writes it back to the weight RAM 124 is shown. In the example of FIG. 28, the pooling operation computes the maximum value of respective 4×4 sub-matrices of the input data matrix. The program loops a number of times through a loop body of instructions at addresses 1 through 10. An initialize NPU instruction at address 0 specifies the number of times each NPU 126 executes the loop body, which in the example of FIG. 28 has a loop count value of 400, and a loop instruction at the end of the loop (at address 11) decrements the current loop count value and if the result is non-zero causes control to return to the top of the loop body (i.e., to the instruction at address 1). The input data matrix in the weight RAM 124 is effectively treated by the NNU program as 400 mutually exclusive groups of four adjacent rows, namely rows 0-3, rows 4-7, rows 8-11 and so forth to rows 1596-1599. Each group of four adjacent rows includes 128 4×4 sub-matrices, namely the 4×4 sub-matrices of elements formed by the intersection of the four rows of a group and four adjacent columns, namely columns 0-3, 4-7, 8-11 and so forth to columns 508-511. Of the 512 NPUs 126, every fourth NPU 126 of the 512 NPUs 126 (i.e., 128) performs a pooling operation on a respective 4×4 sub-matrix, and the other three-fourths of the NPUs 126 are unused. More specifically, NPUs 0, 4, 8, and so forth to NPU 508 each perform a pooling operation on their respective 4×4 sub-matrix whose left-most column number corresponds to the NPU number and whose lower row corresponds to the current weight RAM 124 row value, which is initialized to zero by the initialize instruction at address 0 and is incremented by four upon each iteration of the loop body, as described in more detail below. The 400 iterations of the loop body correspond to the number of groups of 4×4 sub-matrices of the input data matrix of FIG. 27 (the 1600 rows of the input data matrix divided by 4). The initialize NPU instruction also clears the accumulator 202 to zero. Preferably, the loop instruction at address 11 also clears the accumulator 202 to zero. Alternatively, the maxwacc instruction at address 1 specifies to clear the accumulator 202 to zero.

For each iteration of the loop body of the program, the 128 used NPUs 126 concurrently perform 128 pooling operations of the 128 respective 4×4 sub-matrices of the current 4-row group of the input data matrix. More specifically, the pooling operation determines the maximum-valued element of the sixteen elements of the 4×4 sub-matrix. In the embodiment of FIG. 28, for each NPU y of the used 128 NPUs 126, the lower left element of the 4×4 sub-matrix is element Dx,y of FIG. 27, where x is the current weight RAM 124 row number at the beginning of the loop body, which is read by the maxwacc instruction at address 1 of the program of FIG. 28 (also, the row number is initialized by the initialize NPU instruction at address 0, and incremented at each of the maxwacc instructions at addresses 3, 5 and 7). Thus, for each loop of the program, the used 128 NPUs 126 write back to a specified row of the weight RAM 124 the corresponding maximum-valued element of the respective 128 4×4 sub-matrices of the current group of rows. The loop body will now be described.

At address 1 is a maxwacc instruction that implicitly uses the current weight RAM 124 row, which is preferably held in the sequencer 128 (and which is initialized to zero by the instruction at address 0 for the first pass through the loop body). The instruction at address 1 causes each of the NPUs 126 to read its corresponding word from the current row of the weight RAM 124, compare the word to the accumulator 202 value 217, and store in the accumulator 202 the maximum of the two values. Thus, for example, NPU 8 determines the maximum value of the accumulator 202 value 217 and data word Dx,8 (where "x" is the current weight RAM 124 row) and writes the maximum value back to the accumulator 202.

At address 2 is a maxwacc instruction that specifies to rotate the values in the mux-reg 705 of each NPU 126 to the adjacent NPU 126, which in this case is the row of input data matrix values just read from the weight RAM 124 in response to the instruction at address 1. In the embodiment of FIGS. 27 through 28, the NPUs 126 are configured to rotate the values of the mux-regs 705 to the left, i.e., from NPU J to NPU J−1, as described above with respect to FIGS. 24 through 26. Additionally, the instruction specifies a count value of 3. Thus, the instruction at address 2 causes each of the NPUs 126 to receive the rotated word into the mux-reg 705 and determine the maximum value of the rotated word and the accumulator 202 value 217, and then to repeat this operation two more times. That is, each NPU 126 receives the rotated word into the mux-reg 705 and determines the maximum value of the rotated word and the accumulator 202 value 217 three times. Thus, for example, assuming the current weight RAM 124 row at the beginning of the loop body is 36, after executing the instruction at addresses 1 and 2, NPU 8, for example, will have stored in its accumulator 202 the maximum value of the accumulator 202 at the beginning of the loop body and the four weight RAM 124 words D36,8 and D36,9 and D36,10 and D36,11.

The maxwacc instructions at addresses 3 and 4 perform a similar operation as the instructions at addresses 1 and 2, however for the next row of the weight RAM 124, by virtue of the weight RAM 124 row increment indicator. That is, assuming the current weight RAM 124 row at the beginning of the loop body is 36, after the completion of the instructions at addresses 1 through 4, NPU 8, for example, will have stored in its accumulator 202 the maximum value of the accumulator 202 at the beginning of the loop body and the eight weight RAM 124 words D36,8 and D36,9 and D36,10 and D36,11 and D37,8 and D37,9 and D37,10 and D37,11.

The maxwacc instructions at addresses 5 through 8 perform a similar operation as the instructions at addresses 3 and 4, however for the next two rows of the weight RAM 124. That is, assuming the current weight RAM 124 row at the beginning of the loop body is 36, after the completion of the instructions at addresses 1 through 8, NPU 8, for example, will have stored in its accumulator 202 the maximum value of the accumulator 202 at the beginning of the loop body and the sixteen weight RAM 124 words D36,8 and D36,9 and D36,10 and D36,11 and D37,8 and D37,9 and D37,10 and D37,11 and D38,8 and D38,9 and D38,10 and D38,11 and D39,8 and D39,9 and D39,10 and D39,11. That is, after the completion of the instructions at addresses 1 through 8, and assuming the weight RAM 124 row at the beginning of the loop body was 36, NPU 8, for example, will have determined the maximum value of the following 4×4 sub-matrix:

| D36,8 | D36,9 | D36,10 | D36,11 |
| D37,8 | D37,9 | D37,10 | D37,11 |
| D38,8 | D38,9 | D38,10 | D38,11 |
| D39,8 | D39,9 | D39,10 | D39,11 |

More generally, after the completion of the instructions at addresses 1 through 8, each of the used 128 NPUs 126 will have determined the maximum value of the following 4×4 sub-matrix:

| Dr,n | Dr,n+1 | Dr,n+2 | Dr,n+3 |
| Dr+1,n | Dr+1,n+1 | Dr+1,n+2 | Dr+1,n+3 |
| Dr+2,n | Dr+2,n+1 | Dr+2,n+2 | Dr+2,n+3 |
| Dr+3,n | Dr+3,n+1 | Dr+3,n+2 | Dr+3,n+3 | where r is the weight RAM 124 row address value at the beginning of the loop body, and n is the NPU 126 number.

The instruction at address 9 passes through the accumulator 202 value 217 through the AFU 212. The pass through function passes through a word that is the size (in bits) of the words read from the weight RAM 124 (i.e., in the example, 16 bits). Preferably, the user may specify the format of the output, e.g., how many of the output bits are fractional bits, as described in more detail below.

The instruction at address 10 writes the accumulator 202 value 217 to the row of the weight RAM 124 specified by the current value of the output row register, which was initialized by the instruction at address 0 and which is incremented each pass through the loop by virtue of the increment indicator in the instruction. More specifically, the instruction at address 10 writes a wide word (e.g., 16 bits) of the accumulator 202 to the weight RAM 124. Preferably, the instruction writes the 16 bits as specified by the output binary point 2916, as describe in more detail below with respect to FIGS. 29A and 29B below.

As may be observed, each row written to the weight RAM 124 by an iteration of the loop body includes holes that have invalid data. That is, the resulting 133 wide words 1 through 3, 5 through 7, 9 through 11 and so forth to wide words 509 through 511 are invalid, or unused. In one embodiment, the AFU 212 includes a mux that enables packing of the results into adjacent words of a row buffer, such as the row buffer 1104 of FIG. 11, for writing back to the output weight RAM 124 row. Preferably, the activation function instruction specifies the number of words in each hole, and the number of words in the hole is used to control the mux to pack the results. In one embodiment, the number of holes may be specified as values from 2 to 6 in order to pack the output of pooling 3×3, 4×4, 5×5, 6×6 or 7×7 sub-matrices. Alternatively, the architectural program executing on the processor 100 reads the resulting sparse (i.e., including holes) result rows from the weight RAM 124 and performs the packing function using other execution units 112, such as a media unit using architectural pack instructions, e.g., x86 SSE instructions. Advantageously, in a concurrent manner similar to those described above and exploiting the hybrid nature of the NNU 121, the architectural program executing on the processor 100 may read the status register 127 to monitor the most recently written row of the weight RAM 124 (e.g., field 2602 of FIG. 26B) to read a resulting sparse row, pack it, and write it back to the same row of the weight RAM 124 so that it is ready to be used as an input data matrix for a next layer of the neural network, such as a convolution layer or a classic neural network layer (i.e., multiply-accumulate layer). Furthermore, although an embodiment is described that performs pooling operations on 4×4 sub-matrices, the NNU program of FIG. 28 may be modified to perform pooling operations on other size sub-matrices such as 3×3, 5×5, 6×6 or 7×7 sub-matrices.

As may also be observed, the number of result rows written to the weight RAM 124 is one-fourth the number of rows of the input data matrix. Finally, in the example, the data RAM 122 is not used. However, alternatively, the data RAM 122 may be used rather than the weight RAM 124 to perform a pooling operation.

In the example of FIGS. 27 and 28, the pooling operation computes the maximum value of the sub-region. However, the program of FIG. 28 may be modified to compute the average value of the sub-region by, for example, replacing the maxwacc instructions with sumwacc instructions (sum the weight word with the accumulator 202 value 217) and changing the activation function instruction at address 9 to divide (preferably via reciprocal multiply, as described below) the accumulated results by the number of elements of each sub-region, which is sixteen in the example.

As may be observed from the operation of the NNU 121 according to the embodiment of FIGS. 27 and 28, each execution of the program of FIG. 28 takes approximately 6000 clock cycles to perform a pooling operation of the entire 512×1600 data matrix of FIG. 27, which may be considerably less than the number of clock cycles required to perform a similar task by conventional methods.

Alternatively, rather than writing back the results of the pooling operation to the weight RAM 124, the architectural program configures the NNU program to write back the results to rows of the data RAM 122, and the architectural program reads the results from the data RAM 122 as the NNU 121 writes them (e.g., using the address of the most recently written data RAM 122 row 2606 of FIG. 26B). This alternative may be advantageous in an embodiment in which the weight RAM 124 is single-ported and the data RAM 122 is dual-ported.

Fixed-Point Arithmetic with User-Supplied Binary Points, Full Precision Fixed-Point Accumulation, User-Specified Reciprocal Value, Stochastic Rounding of Accumulator Value, and Selectable Activation/Output Functions Generally speaking, hardware units that perform arithmetic in digital computing devices may be divided into what are commonly termed "integer" units and "floating-point" units, because they perform arithmetic operations on integer and floating-point numbers, respectively. A floating-point number has a magnitude (or mantissa) and an exponent, and typically a sign. The exponent is an indication of the location of the radix point (typically binary point) with respect to the magnitude. In contrast, an integer number has no exponent, but only a magnitude, and frequently a sign. An advantage of a floating-point unit is that it enables a programmer to work with numbers that can take on different values within on an enormously large range, and the hardware takes care of adjusting the exponent values of the numbers as needed without the programmer having to do so. For example, assume the two floating-point numbers $0.111 \times 10^{29}$ and $0.81 \times 10^{31}$ are multiplied. (A decimal, or base 10, example is used here, although floating-point units most commonly work with base 2 floating-point numbers.) The floating-point unit automatically takes care of multiplying the mantissa, adding the exponents, and then normalizing the result back to a value of $0.8991 \times 10^{59}$. For another example, assume the same two floating-point numbers are added. The floating-point unit automatically takes care of aligning the binary points of the mantissas before adding them to generate a resulting sum with a value of $0.81111 \times 10^{31}$.

However, the complexity and consequent increase in size, power consumption and clocks per instruction and/or lengthened cycle times associated with floating-point units is well known. Indeed, for this reason many devices (e.g., embedded processors, microcontrollers and relatively low cost and/or low power microprocessors) do not include a floating-point unit. As may be observed from the example above, some of the complexities of floating-point units include logic that performs exponent calculations associated with floating-point addition and multiplication/division (adders to add/subtract exponents of operands to produce resulting exponent value for floating-point multiplication/division, subtracters to determine subtract exponents of operands to determine binary point alignment shift amounts for floating-point addition), shifters that accomplish binary point alignment of the mantissas for floating-point addition, shifters that normalize floating-point results. Additionally, flow proceeds to block units typically require logic to perform rounding of floating-point results, logic to convert between integer and floating-point formats or between different floating-point precision formats (e.g., extended precision, double precision, single precision, half precision), leading zero and leading one detectors, and logic to deal with special floating-point numbers, such as denormal numbers, NANs and infinity.

Furthermore, there is the disadvantage of the significant complexity in verification of the correctness of a floating-point unit largely due to the increased number space over which the design must be verified, which may lengthen the product development cycle and time to market. Still further, as described above, floating-point arithmetic implies the storage and use of separate mantissa and exponent fields for each floating-point number involved in the computation, which may increase the amount of storage required and/or reduce precision given an equal amount of storage to store integer numbers. Many of these disadvantages are avoided by the use of integer units that perform arithmetic operations on integer numbers.

Frequently, programmers write programs that process fractional numbers, i.e., numbers that are not whole numbers. The programs may run on processors that do not have a floating-point unit or, if they do, the integer instructions executed by the integer units of the processor may be faster. To take advantage of potential performance advantages associated with integer units, the programmer employs what is commonly known as fixed-point arithmetic on fixed-point numbers. Such programs include instructions that execute on integer units to process integer numbers, or integer data. The software is aware that the data is fractional and includes instructions that perform operations on the integer data to deal with the fact that the data is actually fractional, e.g., alignment shifts. Essentially, the fixed-point software manually performs some or all of the functionality that a floating-point unit performs.

As used in the present disclosure, a "fixed-point" number (or value or operand or input or output) is a number whose bits of storage are understood to include bits that represent a fractional portion of the fixed-point number, referred to herein as "fractional bits." The bits of storage of the fixed-point number are comprised in a memory or register, e.g., an 8-bit or 16-bit word in a memory or register. Furthermore, the bits of storage of the fixed-point number are all used to represent a magnitude, and in some cases a bit is used to represent a sign, but none of the storage bits of the fixed-point number are used to represent an exponent of the number. Furthermore, the number of fractional bits, or binary point location, of the fixed-point number is specified in storage that is distinct from the storage bits of the fixed-point number and that in a shared, or global, fashion indicates the number of fractional bits, or binary point location, for a set of fixed-point numbers to which the fixed-point number belongs, such as the set of input operands, accumulated values or output results of an array of processing units, for example.

Advantageously, embodiments are described herein in which the ALUs are integer units, but the activation function units include fixed-point arithmetic hardware assist, or acceleration. This enables the ALU portions to be smaller and faster, which facilitates having more ALUs within a given space on the die. This implies more neurons per die space, which is particularly advantageous in a neural network unit.

Furthermore advantageously, in contrast to floating-point numbers that require exponent storage bits for each floating-point number, embodiments are described in which fixed-point numbers are represented with an indication of the number of bits of storage that are fractional bits for an entire set of numbers, however, the indication is located in a single, shared storage that globally indicates the number of fractional bits for all the numbers of the entire set, e.g., a set of inputs to a series of operations, a set of accumulated values of the series, a set of outputs. Preferably, the user of the NNU is enabled to specify the number of fractional storage bits for the set of numbers. Thus, it should be understood that although in many contexts (e.g., common mathematics) the term "integer" refers to a signed whole number, i.e., a number not having a fractional portion, the term "integer" in the present context may refer to numbers having a fractional portion. Furthermore, the term "integer" in the present context is intended to distinguish from floating-point numbers for whom a portion of the bits of their individual storage are used to represent an exponent of the floating-point number. Similarly, an integer arithmetic operation, such as an integer multiply or add or compare performed by an integer unit, assumes the operands do not have an exponent and therefore the integer elements of the integer unit, e.g., integer multiplier, integer adder, integer comparator, do not include logic to deal with exponents, e.g., do not shift mantissas to align binary points for addition or compare operations, do not add exponents for multiply operations.

Additionally, embodiments are described herein that include a large hardware integer accumulator to accumulate a large series of integer operations (e.g., on the order of 1000 multiply-accumulates) without loss of precision. This enables the NNU to avoid dealing with floating-point numbers while at the same time retaining full precision in the accumulated values without having to saturate them or incur inaccurate results due to overflows. Once the series of integer operations has accumulated a result into the full precision accumulator, the fixed-point hardware assist performs the necessary scaling and saturating to convert the full-precision accumulated value to an output value using the user-specified indications of the number of fractional bits of the accumulated value and the desired number of fractional bits in the output value, as described in more detail below.

As described in more detail below, preferably the activation function units may selectively perform stochastic rounding on the accumulator value when compressing it from its full precision form for use as an input to an activation function or for being passed through. Finally, the NPUs may be selectively instructed to apply different activation functions and/or output a variety of different forms of the accumulator value as dictated by the different needs of a given layer of a neural network.

Referring now to FIG. 29A, a block diagram illustrating an embodiment of the control register 127 of FIG. 1 is shown. The control register 127 may include a plurality of control registers 127. The control register 127 includes the following fields, as shown: configuration 2902, signed data 2912, signed weight 2914, data binary point 2922, weight binary point 2924, ALU function 2926, round control 2932, activation function 2934, reciprocal 2942, shift amount 2944, output RAM 2952, output binary point 2954, and output command 2956. The control register 127 values may be written by both an MTNN instruction 1400 and an instruction of an NNU program, such as an initiate instruction.

The configuration 2902 value specifies whether the NNU 121 is in a narrow configuration, a wide configuration or a funnel configuration, as described above. The configuration 2902 implies the size of the input words received from the data RAM 122 and the weight RAM 124. In the narrow and funnel configurations, the size of the input words is narrow (e.g., 8 bits or 9 bits), whereas in the wide configuration, the size of the input words is wide (e.g., 12 bits or 16 bits). Furthermore, the configuration 2902 implies the size of the output result 133, which is the same as the input word size.

The signed data value 2912, if true, indicates the data words received from the data RAM 122 are signed values, and if false, indicates they are unsigned values. The signed weight value 2914, if true, indicates the weight words received from the weight RAM 124 are signed values, and if false, indicates they are unsigned values.

The data binary point 2922 value indicates the location of the binary point for the data words received from the data RAM 122. Preferably, the data binary point 2922 value indicates the number of bit positions from the right for the location of the binary point. Stated alternatively, the data binary point 2922 indicates how many of the least significant bits of the data word are fractional bits, i.e., to the right of the binary point. Similarly, the weight binary point 2924 value indicates the location of the binary point for the weight words received from the weight RAM 124. Preferably, when the ALU function 2926 is a multiply and accumulate or output accumulator, then the NPU 126 determines the number of bits to the right of the binary point for the value held in the accumulator 202 as the sum of the data binary point 2922 and the weight binary point 2924. Thus, for example, if the value of the data binary point 2922 is 5 and the value of the weight binary point 2924 is 3, then the value in the accumulator 202 has 8 bits to the right of the binary point. When the ALU function 2926 is a sum/maximum accumulator and data/weight word or pass through data/weight word, the NPU 126 determines the number of bits to the right of the binary point for the value held in the accumulator 202 as the data/weight binary point 2922/2924, respectively. In an alternate embodiment, described below with respect to FIG. 29B, rather than specifying an individual data binary point 2922 and weight binary point 2924, a single accumulator binary point 2923 is specified.

The ALU function 2926 specifies the function performed by the ALU 204 of the NPU 126. As described above, the ALU functions 2926 may include, but are not limited to: multiply data word 209 and weight word 203 and accumulate product with accumulator 202; sum accumulator 202 and weight word 203; sum accumulator 202 and the data word 209; maximum of accumulator 202 and data word 209; maximum of accumulator 202 and weight word 203; output accumulator 202; pass through data word 209; pass through weight word 203; output zero. In one embodiment, the ALU function 2926 is specified by an NNU initiate instruction and used by the ALU 204 in response to an execute instruction (not shown). In one embodiment, the ALU function 2926 is specified by individual NNU instructions, such as the multiply-accumulate and maxwacc instructions described above.

Figure 30:
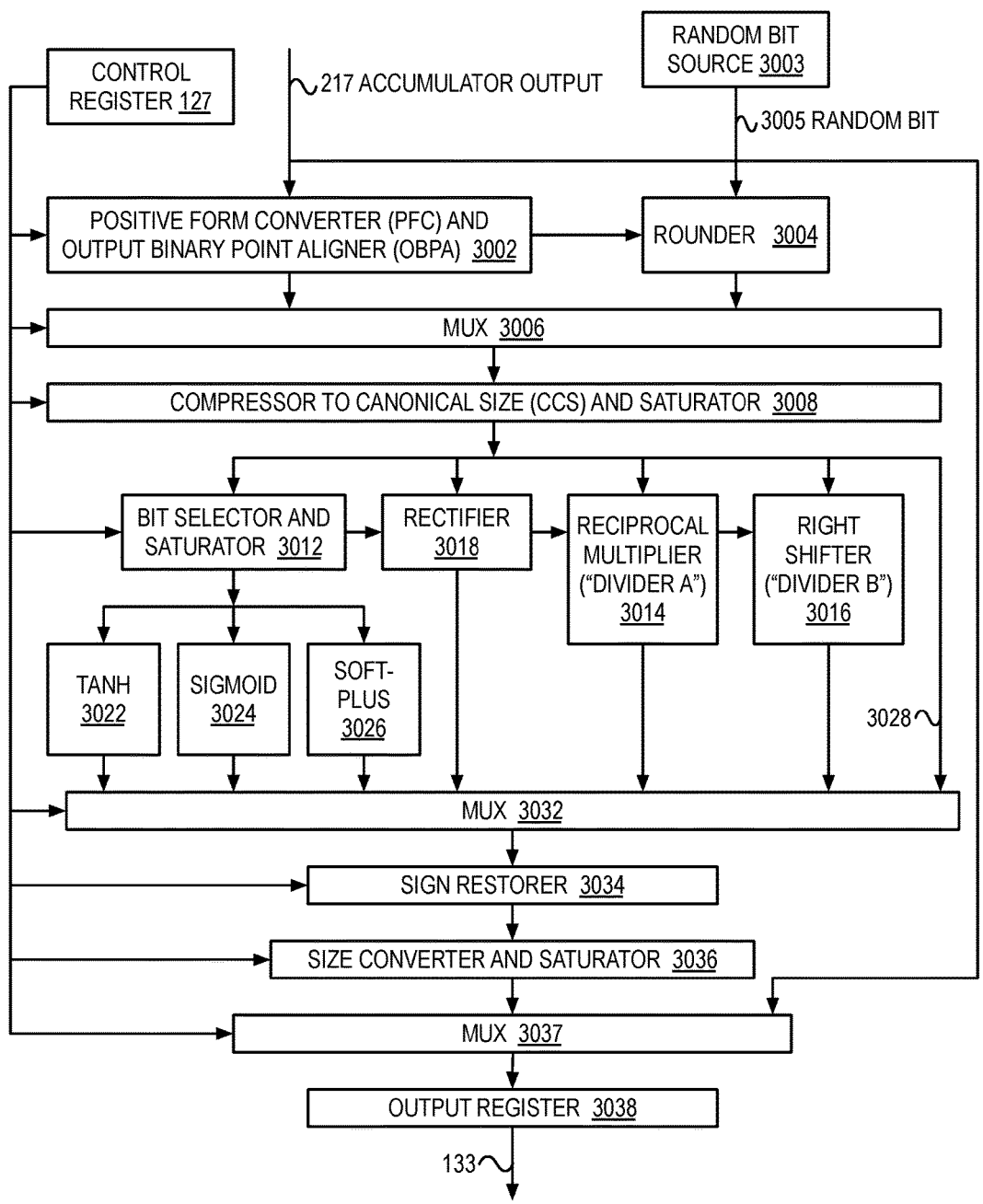
FIG. 30 is a block diagram illustrating in more detail an embodiment of an AFU of FIG. 2.

The round control 2932 specifies which form of rounding is to be used by the rounder 3004 (of FIG. 30). In one embodiment, the rounding modes that may be specified include, but are not limited to: no rounding, round to nearest, and stochastic rounding. Preferably, the processor 100 includes a random bit source 3003 (of FIG. 30) that generates random bits 3005 that are sampled and used to perform the stochastic rounding to reduce the likelihood of a rounding bias. In one embodiment, when the round bit 3005 is one and the sticky bit is zero, the NPU 126 rounds up if the sampled random bit 3005 is true and does not round up if the random bit 3005 is false. In one embodiment, the random bit source 3003 generates the random bits 3005 based on a sampling of random electrical characteristics of the processor 100, such as thermal noise across a semiconductor diode or resistor, although other embodiments are contemplated.

The activation function 2934 specifies the function applied to the accumulator 202 value 217 to generate the output 133 of the NPU 126. As described above and below in more detail, the activation functions 2934 include, but are not limited to: sigmoid; hyperbolic tangent; softplus; rectify; divide by specified power of two; multiply by a user-specified reciprocal value to accomplish an effective division; pass-through full accumulator; and pass-through the accumulator as a canonical size, which is described in more detail below. In one embodiment, the activation function is specified by an NNU activation function instruction. Alternatively, the activation function is specified by the initiate instruction and applied in response to an output instruction, e.g., write AFU output instruction at address 4 of FIG. 4, in which embodiment the activation function instruction at address 3 of FIG. 4 is subsumed by the output instruction.

The reciprocal 2942 value specifies a value that is multiplied by the accumulator 202 value 217 to accomplish a divide of the accumulator 202 value 217. That is, the user specifies the reciprocal 2942 value as the reciprocal of the actual desired divisor. This is useful, for example, in conjunction with convolution and pooling operations, as described herein. Preferably, the user specifies the reciprocal 2942 value in two parts, as described in more detail with respect to FIG. 29C below. In one embodiment, the control register 127 includes a field (not shown) that enables the user to specify division by one of a plurality of built-in divisor values that are the size of commonly used convolution kernels, e.g., 9, 25, 36 or 49. In such an embodiment, the AFU 212 may store reciprocals of the built-in divisors for multiplication by the accumulator 202 value 217.

The shift amount 2944 specifies a number of bits that a shifter of the AFU 212 shifts the accumulator 202 value 217 right to accomplish a divide by a power of two. This may also be useful in conjunction with convolution kernels whose size is a power of two.

The output RAM 2952 value specifies which of the data RAM 122 and the weight RAM 124 is to receive the output result 133.

The output binary point 2954 value indicates the location of the binary point for the output result 133. Preferably, the output binary point 2954 indicates the number of bit positions from the right for the location of the binary point for the output result 133. Stated alternatively, the output binary point 2954 indicates how many of the least significant bits of the output result 133 are fractional bits, i.e., to the right of the binary point. The AFU 212 performs rounding, compression, saturation and size conversion based on the value of the output binary point 2954 (as well as, in most cases, based on the value of the data binary point 2922, the weight binary point 2924, the activation function 2934, and/or the configuration 2902).

The output command 2956 controls various aspects of the output result 133. In one embodiment, the AFU 212 employs the notion of a canonical size, which is twice the size (in bits) of the width specified by the configuration 2902. Thus, for example, if the configuration 2902 implies the size of the input words received from the data RAM 122 and the weight RAM 124 are 8 bits, then the canonical size is 16 bits; for another example, if the configuration 2902 implies the size of the input words received from the data RAM 122 and the weight RAM 124 are 16 bits, then the canonical size is 32 bits. As described herein, the size of the accumulator 202 is large (e.g., the narrow accumulator 202B is 28 bits and the wide accumulator 202A is 41 bits) in order to preserve full precision of the intermediate computations, e.g., 1024 and 512 NNU multiply-accumulate instructions, respectively. Consequently, the accumulator 202 value 217 is larger (in bits) than the canonical size, and the AFU 212 (e.g., CCS 3008 described below with respect to FIG. 30), for most values of the activation function 2934 (except for pass-through full accumulator), compresses the accumulator 202 value 217 down to a value that is the canonical size. A first predetermined value of the output command 2956 instructs the AFU 212 to perform the specified activation function 2934 to generate an internal result that is the same size as the original input words, i.e., half the canonical size, and to output the internal result as the output result 133. A second predetermined value of the output command 2956 instructs the AFU 212 to perform the specified activation function 2934 to generate an internal result that is twice the size as the original input words, i.e., the canonical size, and to output the lower half of the internal result as the output result 133; and a third predetermined value of the output command 2956 instructs the AFU 212 to output the upper half of the canonical size internal result as the output result 133. A fourth predetermined value of the output command 2956 instructs the AFU 212 to output the raw least-significant word (whose width specified by the configuration 2902) of the accumulator 202 as the output result 133; a fifth predetermined value instructs the AFU 212 to output the raw middle-significant word of the accumulator 202 as the output result 133; and a sixth predetermined value instructs the AFU 212 to output the raw most-significant word of the accumulator 202 as the output result 133, as described above with respect to FIGS. 8 through 10. As described above, outputting the full accumulator 202 size or the canonical size internal result may be advantageous, for example, for enabling other execution units 112 of the processor 100 to perform activation functions, such as the softmax activation function.

Although the fields of FIG. 29A (and FIGS. 29B and 29C) are described as residing in the control register 127, in other embodiments one or more of the fields may reside in other parts of the NNU 121. Preferably, many of the fields are included in the NNU instructions themselves and decoded by the sequencer 128 to generate to a micro-operation 3416 (of FIG. 34) that controls the ALUs 204 and/or AFUs 212. Additionally, the fields may be included in a micro-operation 3414 (of FIG. 34) stored in a media register 118 that controls the ALUs 204 and/or AFUs 212. In such embodiments, the use of the initialize NNU instruction is minimized, and in other embodiments the initialize NNU instruction is eliminated.

As described above, an NNU instruction is capable of specifying to perform ALU operations on memory operands (e.g., word from data RAM 122 and/or weight RAM 124) or a rotated operand (e.g., from the mux-regs 208/705). In one embodiment, an NNU instruction may also specify an operand as a registered output of an activation function (e.g., the output of register 3038 of FIG. 30). Additionally, as described above, an NNU instruction is capable of specifying to increment a current row address of the data RAM 122 or weight RAM 124. In one embodiment, the NNU instruction may specify an immediate signed integer delta value that is added to the current row to accomplish incrementing or decrementing by a value other than one.

Referring now to FIG. 29B, a block diagram illustrating an embodiment of the control register 127 of FIG. 1 according to an alternate embodiment is shown. The control register 127 of FIG. 29B is similar to the control register 127 of FIG. 29A; however, the control register 127 of FIG. 29B includes an accumulator binary point 2923. The accumulator binary point 2923 indicates the location of the binary point for the accumulator 202. Preferably, the accumulator binary point 2923 value indicates the number of bit positions from the right for the location of the binary point. Stated alternatively, the accumulator binary point 2923 indicates how many of the least significant bits of the accumulator 202 are fractional bits, i.e., to the right of the binary point. In this embodiment, the accumulator binary point 2923 is specified explicitly, rather than being determined implicitly, as described above with respect to the embodiment of FIG. 29A.

Referring now to FIG. 29C, a block diagram illustrating an embodiment of the reciprocal 2942 of FIG. 29A stored as two parts according to one embodiment is shown. A first part 2962 is a shift value that indicates the number of suppressed leading zeroes 2962 in the true reciprocal value that the user desires to be multiplied by the accumulator 202 value 217. The number of leading zeroes is the number of consecutive zeroes immediately to the right of the binary point. The second part 2694 is the leading zero-suppressed reciprocal 2964 value, i.e., the true reciprocal value with all leading zeroes removed. In one embodiment, the number of suppressed leading zeroes 2962 is stored as four bits and the leading zero-suppressed reciprocal 2964 value is stored as 8-bit unsigned value.

To illustrate by example, assume the user desires the accumulator 202 value 217 to be multiplied by the reciprocal of 49. The binary representation of the reciprocal of 49 represented with 13 fractional bits is 0.0000010100111, which has five leading zeroes. In this case, the user populates the number of suppressed leading zeroes 2962 with a value of five, and populates the leading zero-suppressed reciprocal 2964 with a value of 10100111. After the reciprocal multiplier "divider A" 3014 (of FIG. 30) multiplies the accumulator 202 value 217 and the leading zero-suppressed reciprocal 2964 value, it right-shifts the resulting product by the number of suppressed leading zeroes 2962. Such an embodiment may advantageously accomplish high precision with a relatively small number of bits used to represent the reciprocal 2942 value.

Referring now to FIG. 30, a block diagram illustrating in more detail an embodiment of an AFU 212 of FIG. 2 is shown. The AFU 212 includes the control register 127 of FIG. 1; a positive form converter (PFC) and output binary point aligner (OBPA) 3002 that receives the accumulator 202 value 217; a rounder 3004 that receives the accumulator 202 value 217 and indication of the number of bits shifted out by the OBPA 3002; a random bit source 3003 that generates random bits 3005, as described above; a first mux 3006 that receives the output of the PFC and OBPA 3002 and the output of the rounder 3004; a compressor to canonical size (CCS) and saturator 3008 that receives the output of the first mux 3006; a bit selector and saturator 3012 that receives the output of the CCS and saturator 3008; a rectifier 3018 that receives the output of the CCS and saturator 3008; a reciprocal multiplier 3014 that receives the output of the CCS and saturator 3008; a right shifter 3016 that receives the output of the CCS and saturator 3008; a hyperbolic tangent (tan h) module 3022 that receives the output of the bit selector and saturator 3012; a sigmoid module 3024 that receives the output of the bit selector and saturator 3012; a softplus module 3026 that receives the output of the bit selector and saturator 3012; a second mux 3032 that receives the outputs of the tan h module 3022, the sigmoid module 3024, the softplus module 3026, the rectifier 3108, the reciprocal multiplier 3014, the right shifter 3016 and the passed-through canonical size output 3028 of the CCS and saturator 3008; a sign restorer 3034 that receives the output of the second mux 3032; a size converter and saturator 3036 that receives the output of the sign restorer 3034; a third mux 3037 that receives the output of the size converter and saturator 3036 and the accumulator output 217; and an output register 3038 that receives the output of the mux 3037 and whose output is the result 133 of FIG. 1.

The PFC and OBPA 3002 receive the accumulator 202 value 217. Preferably, the accumulator 202 value 217 is a full precision value, as described above. That is, the accumulator 202 has a sufficient number of bits of storage to hold an accumulated value that is the sum, generated by the integer adder 244, of a series of products generated by the integer multiplier 242 without discarding any of the bits of the individual products of the multiplier 242 or sums of the adder 244 so that there is no loss of precision. Preferably, the accumulator 202 has at least a sufficient number of bits to hold the maximum number of accumulations of the products that an NNU 121 is programmable to perform. For example, referring to the program of FIG. 4 to illustrate, the maximum number of product accumulations the NNU 121 is programmable to perform when in a wide configuration is 512, and the accumulator 202 bit width is 41. For another example, referring to the program of FIG. 20 to illustrate, the maximum number of product accumulations the NNU 121 is programmable to perform when in a narrow configuration is 1024, and the accumulator 202 bit width is 28. To generalize, the full precision accumulator 202 includes at least Q bits, where Q is the sum of M and $\log_2 P$, where M is the bit width of the integer product of the multiplier 242 (e.g., 16 bits for a narrow multiplier 242, or 32 bits for a wide multiplier 242) and P is the maximum permissible number of the integer products that may be accumulated into the accumulator 202. Preferably, the maximum number of product accumulations is specified via a programming specification to the programmer of the NNU 121. In one embodiment, the sequencer 128 enforces a maximum value of the count of a multiply-accumulate NNU instruction (e.g., the instruction at address 2 of FIG. 4), for example, of 511, with the assumption of one previous multiply-accumulate instruction that loads the row of data/weight words 206/207 from the data/weight RAM 122/124 (e.g., the instruction at address 1 of FIG. 4).

Advantageously, by including an accumulator 202 that has a large enough bit width to accumulate a full precision value for the maximum number of allowable accumulations, this simplifies the design of the ALU 204 portion of the NPU 126. In particular, it alleviates the need for logic to saturate sums generated by the integer adder 244 that would overflow a smaller accumulator and that would need to keep track of the binary point location of the accumulator to determine whether an overflow has occurred to know whether a saturation was needed. To illustrate by example a problem with a design that included a non-full precision accumulator and instead includes saturating logic to handle overflows of the non-full precision accumulator, assume the following.

(1) The range of the data word values is between 0 and 1 and all the bits of storage are used to store fractional bits. The range of the weight words is between −8 and +8 and all but three of the bits of storage are used to store fractional bits. And, the range of the accumulated values for input to a hyperbolic tangent activation function is between −8 and +8 and all but three of the bits of storage are used to store fractional bits.

(2) The bit width of the accumulator is non-full precision (e.g., only the bit width of the products).

(3) The final accumulated value would be somewhere between −8 and +8 (e.g., +4.2), assuming the accumulator were full precision; however, the products before a "point A" in the series tend to be positive much more frequently, whereas the products after point A tend to be negative much more frequently.

In such a situation, an inaccurate result (i.e., a result other than +4.2) might be obtained. This is because at some point before point A the accumulator may be saturated to the maximum +8 value when it should have been a larger value, e.g., +8.2, causing loss of the remaining +0.2. The accumulator could even remain at the saturated value for more product accumulations resulting in loss of even more positive value. Thus, the final value of the accumulator could be a smaller number than it would have been (i.e., less then +4.2) if the accumulator had a full precision bit width.

The PFC 3002 converts the accumulator 202 value 217 to a positive form, if the value is negative, and generates an additional bit that indicates whether the original value was positive or negative, which is passed down the AFU 212 pipeline along with the value. Converting to a positive form simplifies subsequent operations by the AFU 212. For example, it enables only positive values to be inputted to the tan h 3022 and sigmoid 3024 modules, thus simplifying them. Additionally, it simplifies the rounder 3004 and the saturator 3008.

The OBPA 3002 shifts, or scales, the positive-form value right to align it with the output binary point 2954 specified in the control register 127. Preferably, the OBPA 3002 calculates the shift amount as a difference that is the number of fractional bits of the output (e.g., specified by the output binary point 2954) subtracted from the number of fractional bits of the accumulator 202 value 217 (e.g., specified by the accumulator binary point 2923 or the sum of the data binary point 2922 and the weight binary point 2924). Thus, for example, if the accumulator 202 binary point 2923 is 8 (as in the example above) and the output binary point 2954 is 3, then the OBPA 3002 shifts the positive-form value right 5 bits to generate a result provided to the mux 3006 and to the rounder 3004.

The rounder 3004 rounds the accumulator 202 value 217. Preferably, the rounder 3004 generates a rounded version of the positive-form value generated by the PFC and OBPA 3002 and provides the rounded version to the mux 3006. The rounder 3004 rounds according to the round control 2932 described above, which may include stochastic rounding using the random bit 3005, as described above and below. The mux 3006 selects one of its inputs, i.e., either the positive-form value from the PFC and OBPA 3002 or the rounded version thereof from the rounder 3004, based on the round control 2932 (which may include stochastic rounding, as described herein) and provides the selected value to the CCS and saturator 3008. Preferably, if the round control 2932 specifies no rounding, then the mux 3006 selects the output of the PFC and OBPA 3002, and otherwise selects the output of the rounder 3004. Other embodiments are contemplated in which the AFU 212 performs additional rounding. For example, in one embodiment, the bit selector 3012 rounds based on lost low-order bits when it compresses the bits of the CCS and saturator 3008 output (described below). For another example, in one embodiment, the product of the reciprocal multiplier 3014 (described below) is rounded. For yet another example, in one embodiment, the size converter 3036 rounds when it converts to the proper output size (described below), which may involve losing low-order bits used in the rounding determination.

The CCS 3008 compresses the mux 3006 output value to the canonical size. Thus, for example, if the NPU 126 is in a narrow or funnel configuration 2902, then the CCS 3008 compresses the 28-bit mux 3006 output value to 16 bits; and if the NPU 126 is in a wide configuration 2902, then the CCS 3008 compresses the 41-bit mux 3006 output value to 32 bits. However, before compressing to the canonical size, if the pre-compressed value is greater than the maximum value expressible in the canonical form, the saturator 3008 saturates the pre-compressed value to the maximum value expressible in the canonical form. For example, if any of the bits of the pre-compressed value left of the most-significant canonical form bit has a 1 value, then the saturator 3008 saturates to the maximum value (e.g., to all 1's).

Preferably, the tan h 3022, sigmoid 3024 and softplus 3026 modules comprise lookup tables, e.g., programmable logic arrays (PLA), read-only memories (ROM), combinational logic gates, and so forth. In one embodiment, in order to simplify and reduce the size of the modules 3022/3024/3026, they are provided an input value that has 3.4 form, i.e., three whole bits and four fractional bits, i.e., the input value has four bits to the right of the binary point and three bits to the left of the binary point. These values are chosen because at the extremes of the input value range (−8, +8) of the 3.4 form, the output values asymptotically approach their minimum/maximum values. However, other embodiments are contemplated that place the binary point at a different location, e.g., in a 4.3 form or a 2.5 form. The bit selector 3012 selects the bits of the CCS and saturator 3008 output that satisfy the 3.4 form criteria, which involves compression, i.e., some bits are lost, since the canonical form has a larger number of bits. However, prior to selecting/compressing the CCS and saturator 3008 output value, if the pre-compressed value is greater than the maximum value expressible in the 3.4 form, the saturator 3012 saturates the pre-compressed value to the maximum value expressible in the 3.4 form. For example, if any of the bits of the pre-compressed value left of the most-significant 3.4 form bit has a 1 value, then the saturator 3012 saturates to the maximum value (e.g., to all 1's).

The tan h 3022, sigmoid 3024 and softplus 3026 modules perform their respective activation functions (described above) on the 3.4 form value output by the CCS and saturator 3008 to generate a result. Preferably, the result of the tan h 3022 and sigmoid 3024 modules is a 7-bit result in a 0.7 form, i.e., zero whole bits and seven fractional bits, i.e., the input value has seven bits to the right of the binary point. Preferably, the result of the softplus module 3026 is a 7-bit result in a 3.4 form, e.g., in the same form as the input to the module 3026. Preferably, the outputs of the tan h 3022, sigmoid 3024 and softplus 3026 modules are extended to canonical form (e.g., leading zeroes added as necessary) and aligned to have the binary point specified by the output binary point 2954 value.

The rectifier 3018 generates a rectified version of the output value of the CCS and saturator 3008. That is, if the output value of the CCS and saturator 3008 (its sign is piped down as describe above) is negative, the rectifier 3018 outputs a value of zero; otherwise, the rectifier 3018 outputs its input value. Preferably, the output of the rectifier 3018 is in canonical form and has the binary point specified by the output binary point 2954 value.

The reciprocal multiplier 3014 multiplies the output of the CCS and saturator 3008 by the user-specified reciprocal value specified in the reciprocal value 2942 to generate its canonical size product, which is effectively the quotient of the output of the CCS and saturator 3008 and the divisor that is the reciprocal of the reciprocal 2942 value. Preferably, the output of the reciprocal multiplier 3014 is in canonical form and has the binary point specified by the output binary point 2954 value.

The right shifter 3016 shifts the output of the CCS and saturator 3008 by the user-specified number of bits specified in the shift amount value 2944 to generate its canonical size quotient. Preferably, the output of the right shifter 3016 is in canonical form and has the binary point specified by the output binary point 2954 value.

The mux 3032 selects the appropriate input specified by the activation function 2934 value and provides the selection to the sign restorer 3034, which converts the positive form output of the mux 3032 to a negative form if the original accumulator 202 value 217 was a negative value, e.g., to two's-complement form.

The size converter 3036 converts the output of the sign restorer 3034 to the proper size based on the value of the output command 2956, which values are described above with respect to FIG. 29A. Preferably, the output of the sign restorer 3034 has a binary point specified by the output binary point 2954 value. Preferably, for the first predetermined value of the output command 2956, the size converter 3036 discards the bits of the upper half of the sign restorer 3034 output. Furthermore, if the output of the sign restorer 3034 is positive and exceeds the maximum value expressible in the word size specified by the configuration 2902 or is negative and is less than the minimum value expressible in the word size, the saturator 3036 saturates its output to the respective maximum/minimum value expressible in the word size. For the second and third predetermined values, the size converter 3036 passes through the sign restorer 3034 output.

The mux 3037 selects either the size converter and saturator 3036 output or the accumulator 202 output 217, based on the output command 2956, for provision to the output register 3038. More specifically, for the first and second predetermined values of the output command 2956, the mux 3037 selects the lower word (whose size is specified by the configuration 2902) of the output of the size converter and saturator 3036. For the third predetermined value, the mux 3037 selects the upper word of the output of the size converter and saturator 3036. For the fourth predetermined value, the mux 3037 selects the lower word of the raw accumulator 202 value 217; for the fifth predetermined value, the mux 3037 selects the middle word of the raw accumulator 202 value 217; and for the sixth predetermined value, the mux 3037 selects the upper word of the raw accumulator 202 value 217. As describe above, preferably the AFU 212 pads the upper bits of the upper word of the raw accumulator 202 value 217 to zero.

Referring now to FIG. 31, an example of operation of the AFU 212 of FIG. 30 is shown. As shown, the configuration 2902 is set to a narrow configuration of the NPUs 126. Additionally, the signed data 2912 and signed weight 2914 values are true. Additionally, the data binary point 2922 value indicates the binary point for the data RAM 122 words is located such that there are 7 bits to the right of the binary point, and an example value of the first data word received by one of the NPUs 126 is shown as 0.1001110. Still further, the weight binary point 2924 value indicates the binary point for the weight RAM 124 words is located such that there are 3 bits to the right of the binary point, and an example value of the first data word received by the one of the NPUs 126 is shown as 00001.010.

The 16-bit product (which is accumulated with the initial zero value of the accumulator 202) of the first data and weight words is shown as 000000.1100001100. Because the data binary point 2912 is 7 and the weight binary point 2914 is 3, the implied accumulator 202 binary point is located such that there are 10 bits to the right of the binary point. In the case of a narrow configuration, the accumulator 202 is 28 bits wide, in the example embodiment. In the example, a value 217 of 0000000000000000001.1101010100 of the accumulator 202 after all the ALU operations (e.g., all 1024 multiply-accumulates of FIG. 20) are performed is shown.

The output binary point 2954 value indicates the binary point for the output is located such that there are 7 bits to the right of the binary point. Therefore, after passing through the OBPA 3002 and CCS 3008, the accumulator 202 value 217 is scaled, rounded and compressed to the canonical form value of 000000001.1101011. In the example, the output binary point location indicates 7 fractional bits, and the accumulator 202 binary point location indicates 10 fractional bits. Therefore, the OBPA 3002 calculates a difference of 3 and scales the accumulator 202 value 217 by shifting it right 3 bits. This is indicated in FIG. 31 by the loss of the 3 least significant bits (binary 100) of the accumulator 202 value 217. Further in the example, the round control 2932 value indicates to use stochastic rounding, and in the example it is assumed that the sampled random bit 3005 is true. Consequently, the least significant bit was rounded up because the round bit of the accumulator 202 value 217 (most significant bit of the 3 bits shifted out by the scaling of the accumulator 202 value 217) was one and the sticky bit (Boolean OR of the 2 least significant bits of the 3 bits shifted out by the scaling of the accumulator 202 value 217) was zero, according to the description above.

The activation function 2934 indicates to use a sigmoid function, in the example. Consequently, the bit selector 3012 selects the bits of the canonical form value such that the input to the sigmoid module 3024 has three whole bits and four fractional bits, as described above, i.e., a value of 001.1101, as shown. The sigmoid module 3024 outputs a value that is put in canonical form as shown of 000000000.1101110.

The output command 2956 in the example specifies the first predetermined value, i.e., to output the word size indicated by the configuration 2902, which in this case is a narrow word (8 bits). Consequently, the size converter 3036 converts the canonical sigmoid output value to an 8 bit quantity having an implied binary point located such that 7 bits are to the right of the binary point, yielding an output value of 01101110, as shown.

Referring now to FIG. 32, a second example of operation of the AFU 212 of FIG. 30 is shown. The example of FIG. 32 illustrates operation of the AFU 212 when the activation function 2934 indicates to pass-through the accumulator 202 value 217 in the canonical size. As shown, the configuration 2902 is set to a narrow configuration of the NPUs 126.

In the example, the accumulator 202 is 28 bits wide, and the accumulator 202 binary point is located such that there are 10 bits to the right of the binary point (either because the sum of the data binary point 2912 and the weight binary point 2914 is 10 according to one embodiment, or the accumulator binary point 2923 is explicitly specified as having a value of 10 according to an alternate embodiment, as described above). In the example, FIG. 32 shows a value 217 of 000001100000011011.1101111010 of the accumulator 202 after all the ALU operations are performed.

In the example, the output binary point 2954 value indicates the binary point for the output is located such that there are 4 bits to the right of the binary point. Therefore, after passing through the OBPA 3002 and CCS 3008, the accumulator 202 value 217 is saturated and compressed to the canonical form value of 111111111111.1111, as shown, that is received by the mux 3032 as the canonical size pass-through value 3028.

In the example, two output commands 2956 are shown. The first output command 2956 specifies the second predetermined value, i.e., to output the lower word of the canonical form size. Since the size indicated by the configuration 2902 is a narrow word (8 bits), which implies a canonical size of 16 bits, the size converter 3036 selects the lower 8 bits of the canonical size pass-through value 3028 to yield an 8 bit value of 11111111, as shown. The second output command 2956 specifies the third predetermined value, i.e., to output the upper word of the canonical form size. Consequently, the size converter 3036 selects the upper 8 bits of the canonical size pass-through value 3028 to yield an 8 bit value of 11111111, as shown.

Referring now to FIG. 33, a third example of operation of the AFU 212 of FIG. 30 is shown. The example of FIG. 33 illustrates operation of the AFU 212 when the activation function 2934 indicates to pass-through the full raw accumulator 202 value 217. As shown, the configuration 2902 is set to a wide configuration of the NPUs 126 (e.g., 16-bit input words).

In the example, the accumulator 202 is 41 bits wide, and the accumulator 202 binary point is located such that there are 8 bits to the right of the binary point (either because the sum of the data binary point 2912 and the weight binary point 2914 is 8 according to one embodiment, or the accumulator binary point 2923 is explicitly specified as having a value of 8 according to an alternate embodiment, as described above). In the example, FIG. 33 shows a value 217 of 001000000000000000001100000011011.11011110 of the accumulator 202 after all the ALU operations are performed.

In the example, three output commands 2956 are shown. The first output command 2956 specifies the fourth predetermined value, i.e., to output the lower word of the raw accumulator 202 value; the second output command 2956 specifies the fifth predetermined value, i.e., to output the middle word of the raw accumulator 202 value; and the third output command 2956 specifies the sixth predetermined value, i.e., to output the upper word of the raw accumulator 202 value. Since the size indicated by the configuration 2902 is a wide word (16 bits), FIG. 33 shows that in response to the first output command 2956, the mux 3037 selects the 16-bit value of 0001101111011110; in response to the second output command 2956, the mux 3037 selects the 16-bit value of 0000000000011000; and in response to the third output command 2956, the mux 3037 selects the 16-bit value of 0000000001000000.

As discussed above, advantageously the NNU 121 operates on integer data rather than floating-point data. This has the advantage of simplifying each NPU 126, or at least the ALU 204 portion. For example, the ALU 204 need not include adders that would be needed in a floating-point implementation to add the exponents of the multiplicands for the multiplier 242. Similarly, the ALU 204 need not include shifters that would be needed in a floating-point implementation to align binary points of the addends for the adder 234. As one skilled in the art will appreciate, floating point units are generally very complex; thus, these are only examples of simplifications to the ALU 204, and other simplifications are enjoyed by the instant integer embodiments with hardware fixed-point assist that enable the user to specify the relevant binary points. The fact that the ALUs 204 are integer units may advantageously result in a smaller (and faster) NPU 126 than a floating-point embodiment, which further advantageously facilitates the incorporation of a large array of NPUs 126 into the NNU 121. The AFU 212 portion deals with scaling and saturating the accumulator 202 value 217 based on the, preferably user-specified, number of fractional bits desired in the accumulated value and number of fractional bits desired in the output value. Advantageously, any additional complexity and accompanying increase in size, power consumption and/or time in the fixed-point hardware assist of the AFUs 212 may be amortized by sharing the AFUs 212 among the ALU 204 portions, as described with respect to the embodiment of FIG. 11, for example, since the number of AFUs 1112 may be reduced in a shared embodiment.

Advantageously, embodiments described herein enjoy many of the benefits associated with reduced complexity of hardware integer arithmetic units over floating-point arithmetic units, while still providing arithmetic operations on fractional numbers, i.e., numbers with a binary point. An advantage of floating-point arithmetic is that it accommodates arithmetic operations on data whose individual values may be anywhere within a very wide range of values (which is effectively limited only by the size of the exponent range, which may be very large). That is, each floating-point number has its own potentially unique exponent value. However, embodiments are described here that recognize and take advantage of the fact that there are certain applications in which the input data is highly parallelized and whose values are within a relatively narrow range such that the "exponent" for all the parallelized values can be the same. Therefore, the embodiments enable the user to specify the binary point location once for all the input values and/or accumulated values. Similarly, the embodiments enable the user to specify the binary point location once for all the output values, recognizing and taking advantage of similar range characteristics of the parallelized outputs. An artificial neural network is an example of such an application, although the embodiments may be employed to perform computations for other applications. By specifying the binary point location for the inputs once, rather than for each individual input number, the embodiments provide more efficient use of memory space (e.g., require less memory) over a floating-point implementation and/or provide an increase in precision for a similar amount of memory since the bits that would be used for an exponent in a floating-point implementation can be used to specify more precision in the magnitude.

Further advantageously, the embodiments recognize the potential loss of precision that could be experienced during the accumulation of a large series of integer operations (e.g., overflow or loss of fractional bits of lesser significance) and provide a solution, primarily in the form of a sufficiently large accumulator to avoid loss of precision.

Direct Execution of NNU Micro-Operation

Figure 34:
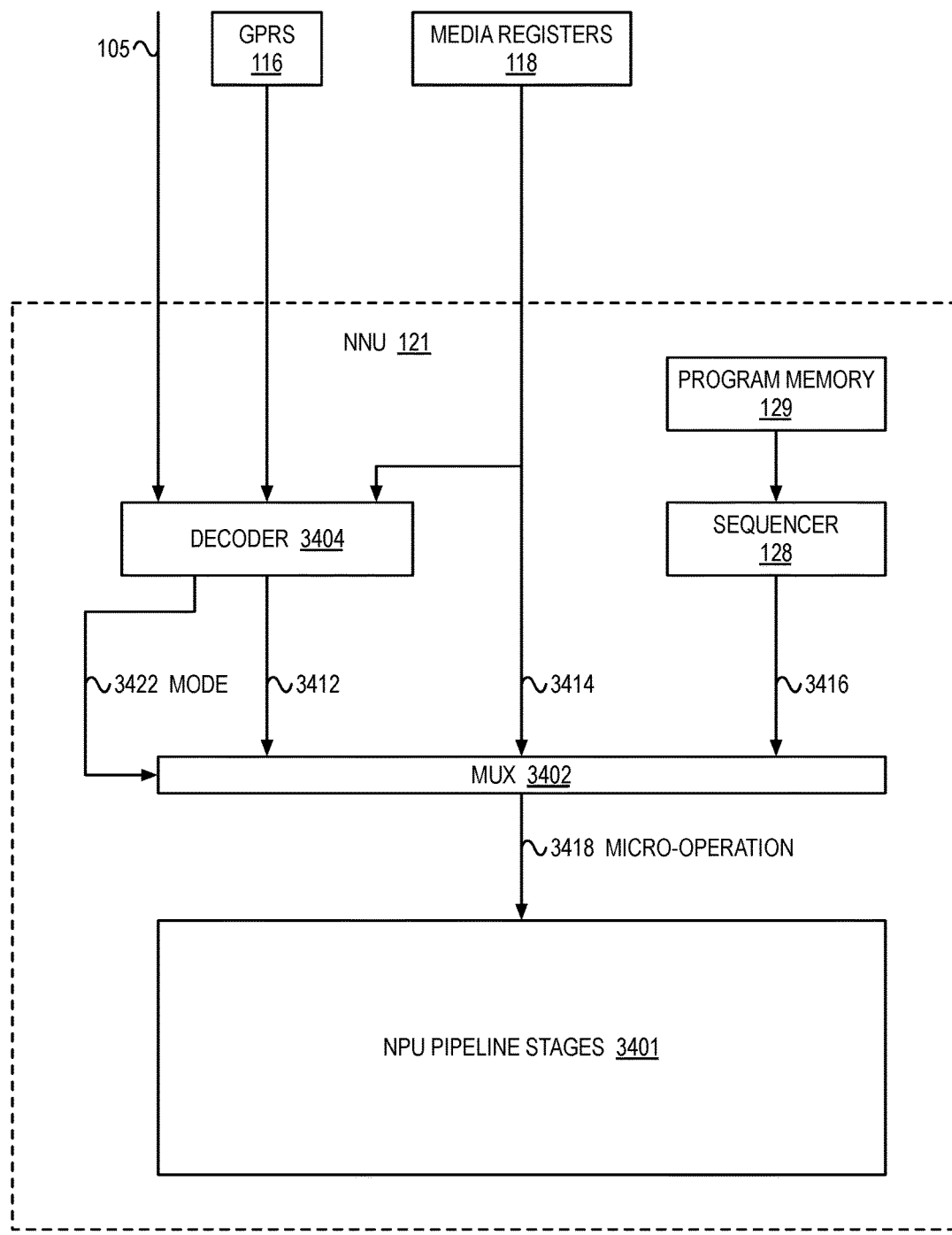
FIG. 34 is a block diagram illustrating the processor of FIG. 1 and in more detail portions of the NNU of FIG. 1.

Referring now to FIG. 34, a block diagram illustrating the processor 100 of FIG. 1 and in more detail portions of the NNU 121 of FIG. 1 is shown. The NNU 121 includes pipeline stages 3401 of the NPUs 126. The pipeline stages 3401, separated by staging registers, include combinatorial logic that accomplish the operation of the NPUs 126 as described herein, such as Boolean logic gates, multiplexers, adders, multipliers, comparators, and so forth. The pipeline stages 3401 receive a micro-operation 3418 from a mux 3402. The micro-operation 3418 flows down the pipeline stages 3401 and controls their combinatorial logic. The micro-operation 3418 is a collection of bits. Preferably the micro-operation 3418 includes the bits of the data RAM 122 memory address 123, the weight RAM 124 memory address 125, the program memory 129 memory address 131, the mux-reg 208/705 control signals 213/713, the mux 802 control signals 803, and many of the fields of the control register 127 (e.g., of FIGS. 29A through 29C, for example, among others. In one embodiment, the micro-operation 3418 comprises approximately 120 bits. The mux 3402 receives a micro-operation from three different sources and selects one of them as the micro-operation 3418 for provision to the pipeline stages 3401.

One micro-operation source to the mux 3402 is the sequencer 128 of FIG. 1. The sequencer 128 decodes the NNU instructions received from the program memory 129 and in response generates a micro-operation 3416 provided to a first input of the mux 3402.

A second micro-operation source to the mux 3402 is a decoder 3404 that receives microinstructions 105 from a reservation station 108 of FIG. 1, along with operands from the GPR 116 and media registers 118. Preferably, the microinstructions 105 are generated by the instruction translator 104 in response to translating MTNN instructions 1400 and MFNN instructions 1500, as described above. The microinstructions 105 may include an immediate field that specifies a particular function (which was specified by an MTNN instruction 1400 or an MFNN instruction 1500), such as starting and stopping execution of a program in the program memory 129, directly executing a micro-operation from the media registers 118, or reading/writing a memory of the NNU 121, as described above. The decoder 3404 decodes the microinstructions 105 and in response generates a micro-operation 3412 provided to a second input of the mux 3402. Preferably, in response to some functions 1432/1532 of an MTNN/MFNN 1400/1500 instruction, it is not necessary for the decoder 3404 to generate a micro-operation 3412 to send down the pipeline 3401, for example, writing to the control register 127, starting execution of a program in the program memory 129, pausing the execution of a program in the program memory 129, waiting for completion of the execution of a program in the program memory 129, reading from the status register 127 and resetting the NNU 121.

A third micro-operation source to the mux 3402 is the media registers 118 themselves. Preferably, as described above with respect to FIG. 14, a MTNN instruction 1400 may specify a function that instructs the NNU 121 to directly execute a micro-operation 3414 provided from the media registers 118 to a third input of the mux 3402. The direct execution of a micro-operation 3414 provided by the architectural media registers 118 may be particularly useful for test, e.g., built-in self test (BIST), and debug of the NNU 121.

Preferably, the decoder 3404 generates a mode indicator 3422 that controls the mux 3402 selection. When an MTNN instruction 1400 specifies a function to start running a program from the program memory 129, the decoder 3404 generates a mode indicator 3422 value that causes the mux 3402 to select the micro-operation 3416 from the sequencer 128 until either an error occurs or until the decoder 3404 encounters an MTNN instruction 1400 that specifies a function to stop running a program from the program memory 129. When an MTNN instruction 1400 specifies a function that instructs the NNU 121 to directly execute a micro-operation 3414 provided from a media register 118, the decoder 3404 generates a mode indicator 3422 value that causes the mux 3402 to select the micro-operation 3414 from the specified media register 118. Otherwise, the decoder 3404 generates a mode indicator 3422 value that causes the mux 3402 to select the micro-operation 3412 from the decoder 3404.

Variable Rate Neural Network Unit

There may be situations in which the NNU 121 runs a program and then sits idle waiting for the processor 100 to do something it needs before it can run its next program. For example, assume a situation similar to that described with respect to FIGS. 3 through 6A in which the NNU 121 runs two or more successive instances of a multiply-accumulate-activation function program (which may also be referred to as a feed forward neural network layer program). It may take the processor 100 significantly longer to write 512 KB worth of weight values into the weight RAM 124 that will be used by the next run of the NNU program than it will take for the NNU 121 to run the program. Stated alternatively, the NNU 121 may run the program in a relatively short amount of time and then sit idle while the processor 100 finishes writing the next weight values into the weight RAM 124 for the next run of the program. This situation is visually illustrated in FIG. 36A, which is described in more detail below. In such situations, it may be advantageous to run the NNU 121 at a slower rate and take longer to execute the program and thereby spread out over more time the energy consumption required for the NNU 121 to run the program, which may tend to keep the temperature of the NNU 121 lower and perhaps of the processor 100 in general. This situation is referred to as relaxed mode and is visually illustrated in FIG. 36B, which is described in more detail below.

Figure 35:
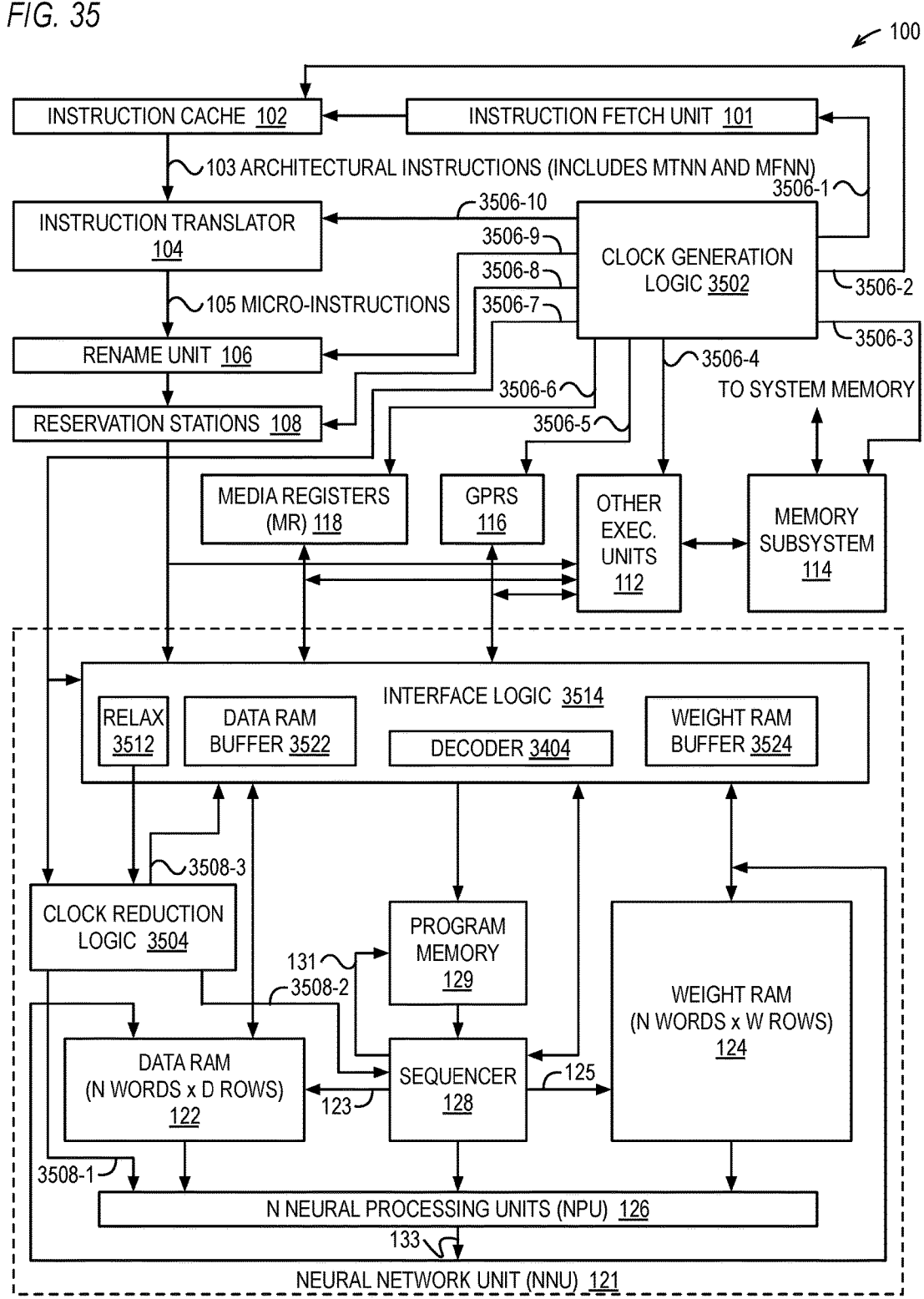
FIG. 35 is a block diagram illustrating a processor that includes a variable rate NNU.

Referring now to FIG. 35, a block diagram illustrating a processor 100 that includes a variable rate NNU 121 is shown. The processor 100 is similar to the processor 100 of FIG. 1 in many respects and like-numbered elements are similar. The processor 100 of FIG. 35 also includes clock generation logic 3502 coupled to the functional units of the processor 100, namely, the instruction fetch unit 101, the instruction cache 102, the instruction translator 104, the rename unit 106, the reservation stations 108, the NNU 121, the other execution units 112, the memory subsystem 114, the general purpose registers 116 and the media registers 118. The clock generation logic 3502 includes a clock generator, such as a phase-locked loop (PLL), that generates a clock signal having a primary clock rate, or clock frequency. For example, the primary clock rate may be 1 GHz, 1.5 GHz, 2 GHz and so forth. The clock rate indicates the number of cycles, e.g., oscillations between a high and low state, of the clock signal per second. Preferably, the clock signal has a balanced duty cycle, i.e., high half the cycle and low the other half of the cycle; alternatively, the clock signal has an unbalanced duty cycle in which the clock signal is in the high state longer than it is in the low state, or vice versa. Preferably, the PLL is configurable to generate the primary clock signal at multiple clock rates. Preferably, the processor 100 includes a power management module that automatically adjusts the primary clock rate based on various factors including the dynamically detected operating temperature of the processor 100, utilization, and commands from system software (e.g., operating system, BIOS) indicating desired performance and/or power savings indicators. In one embodiment, the power management module includes microcode of the processor 100.

The clock generation logic 3502 also includes a clock distribution network, or clock tree. The clock tree distributes the primary clock signal to the functional units of the processor 100, which are indicated in FIG. 35 as clock signal 3506-1 to the instruction fetch unit 101, clock signal 3506-2 to the instruction cache 102, clock signal 3506-10 to the instruction translator 104, clock signal 3506-9 to the rename unit 106, clock signal 3506-8 to the reservation stations 108, clock signal 3506-7 to the NNU 121, clock signal 3506-4 to the other execution units 112, clock signal 3506-3 to the memory subsystem 114, clock signal 3506-5 to the general purpose registers 116 and clock signal 3506-6 to the media registers 118, and which are referred to collectively as clock signals 3506. The clock tree includes nodes, or wires, that transmit the primary clock signals 3506 to their respective functional units. Additionally, preferably the clock generation logic 3502 includes clock buffers that re-generate the primary clock signal as needed to provide cleaner clock signals and/or boost the voltage levels of the primary clock signal, particularly for long nodes. Additionally, each functional unit may also include its own sub-clock tree, as needed, that re-generates and/or boosts the respective primary clock signal 3506 it receives.

The NNU 121 includes clock reduction logic 3504 that receives a relax indicator 3512 and that receives the primary clock signal 3506-7 and, in response, generates a secondary clock signal. The secondary clock signal has a clock rate that is either the same clock rate as the primary clock rate or, when in relaxed mode, that is reduced relative to the primary clock rate by an amount programmed into the relax indicator 3512, which potentially provides thermal benefits. The clock reduction logic 3504 is similar in many respects to the clock generation logic 3502 in that it includes a clock distribution network, or clock tree, that distributes the secondary clock signal to various blocks of the NNU 121, which are indicated as clock signal 3508-1 to the array of NPUs 126, clock signal 3508-2 to the sequencer 128 and clock signal 3508-3 to the interface logic 3514, and which are referred to collectively or individually as secondary clock signal 3508. Preferably, the NPUs 126 include a plurality of pipeline stages 3401, as described with respect to FIG. 34, that include pipeline staging registers that receive the secondary clock signal 3508-1 from the clock reduction logic 3504.

The NNU 121 also includes interface logic 3514 that receives the primary clock signal 3506-7 and secondary clock signal 3508-3. The interface logic 3514 is coupled between the lower portions of the front end of the processor 100 (e.g., the reservation stations 108, media registers 118, and general purpose registers 116) and the various blocks of the NNU 121, namely the clock reduction logic 3504, the data RAM 122, the weight RAM 124, the program memory 129 and the sequencer 128. The interface logic 3514 includes a data RAM buffer 3522, a weight RAM buffer 3524, the decoder 3404 of FIG. 34 and the relax indicator 3512. The relax indicator 3512 holds a value that specifies how much slower, if any, the array of NPUs 126 will execute NNU program instructions. Preferably, the relax indicator 3512 specifies a divisor value, N, by which the clock reduction logic 3504 divides the primary clock signal 3506-7 to generate the secondary clock signal 3508 such that the secondary clock signal 3508 has a rate that is 1/N. Preferably, the value of N may be programmed to any one of a plurality of different predetermined values to cause the clock reduction logic 3504 to generate the secondary clock signal 3508 at a corresponding plurality of different rates that are less than the primary clock rate.

In one embodiment, the clock reduction logic 3504 comprises a clock divider circuit to divide the primary clock signal 3506-7 by the relax indicator 3512 value. In one embodiment, the clock reduction logic 3504 comprises clock gates (e.g., AND gates) that gate the primary clock signal 3506-7 with an enable signal that is true once only every N cycles of the primary clock signal 3506-7. For example, a circuit that includes a counter that counts up to N may be used to generate the enable signal. When accompanying logic detects the output of the counter matches N, the logic generates a true pulse on the secondary clock signal 3508 and resets the counter. Preferably the relax indicator 3512 value is programmable by an architectural instruction, such as an MTNN 1400 instruction of FIG. 14. Preferably, the architectural program running on the processor 100 programs the relax value into the relax indicator 3512 just prior to instructing the NNU 121 to start running the NNU program, as described in more detail with respect to FIG. 37.

The weight RAM buffer 3524 is coupled between the weight RAM 124 and media registers 118 for buffering transfers of data between them. Preferably, the weight RAM buffer 3524 is similar to one or more of the embodiments of the buffer 1704 of FIG. 17. Preferably, the portion of the weight RAM buffer 3524 that receives data from the media registers 118 is clocked by the primary clock signal 3506-7 at the primary clock rate and the portion of the weight RAM buffer 3524 that receives data from the weight RAM 124 is clocked by the secondary clock signal 3508-3 at the secondary clock rate, which may or may not be reduced relative to the primary clock rate depending upon the value programmed into the relax indicator 3512, i.e., depending upon whether the NNU 121 is operating in relaxed or normal mode. In one embodiment, the weight RAM 124 is single-ported, as described above with respect to FIG. 17, and is accessible both by the media registers 118 via the weight RAM buffer 3524 and by the NPUs 126 or the row buffer 1104 of FIG. 11 in an arbitrated fashion. In an alternate embodiment, the weight RAM 124 is dual-ported, as described above with respect to FIG. 16, and each port is accessible both by the media registers 118 via the weight RAM buffer 3524 and by the NPUs 126 or the row buffer 1104 in a concurrent fashion.

Similarly, the data RAM buffer 3522 is coupled between the data RAM 122 and media registers 118 for buffering transfers of data between them. Preferably, the data RAM buffer 3522 is similar to one or more of the embodiments of the buffer 1704 of FIG. 17. Preferably, the portion of the data RAM buffer 3522 that receives data from the media registers 118 is clocked by the primary clock signal 3506-7 at the primary clock rate and the portion of the data RAM buffer 3522 that receives data from the data RAM 122 is clocked by the secondary clock signal 3508-3 at the secondary clock rate, which may or may not be reduced relative to the primary clock rate depending upon the value programmed into the relax indicator 3512, i.e., depending upon whether the NNU 121 is operating in relaxed or normal mode. In one embodiment, the data RAM 122 is single-ported, as described above with respect to FIG. 17, and is accessible both by the media registers 118 via the data RAM buffer 3522 and by the NPUs 126 or the row buffer 1104 of FIG. 11 in an arbitrated fashion. In an alternate embodiment, the data RAM 122 is dual-ported, as described above with respect to FIG. 16, and each port is accessible both by the media registers 118 via the data RAM buffer 3522 and by the NPUs 126 or the row buffer 1104 in a concurrent fashion.

Preferably, the interface logic 3514 includes the data RAM buffer 3522 and weight RAM buffer 3524, regardless of whether the data RAM 122 and/or weight RAM 124 are single-ported or dual-ported, in order to provide synchronization between the primary clock domain and the secondary clock domain. Preferably, each of the data RAM 122, weight RAM 124 and program memory 129 comprises a static RAM (SRAM) that includes a respective read enable, write enable and memory select signal.

As described above, the NNU 121 is an execution unit of the processor 100. An execution unit is a functional unit of a processor that executes microinstructions into which architectural instructions are translated, such as the microinstructions 105 into which the architectural instructions 103 of FIG. 1 are translated, or that executes architectural instructions 103 themselves. An execution unit receives operands from general purpose registers of the processor, such as GPRs 116 and media registers 118. An execution unit generates results in response to executing microinstructions or architectural instructions that may be written to the general purpose registers. Examples of the architectural instructions 103 are the MTNN instruction 1400 and the MFNN instruction 1500 described with respect to FIGS. 14 and 15, respectively. The microinstructions implement the architectural instructions. More specifically, the collective execution by the execution unit of the one or more microinstructions into which an architectural instruction is translated performs the operation specified by the architectural instruction on inputs specified by the architectural instruction to produce a result defined by the architectural instruction.

Figure 36A:
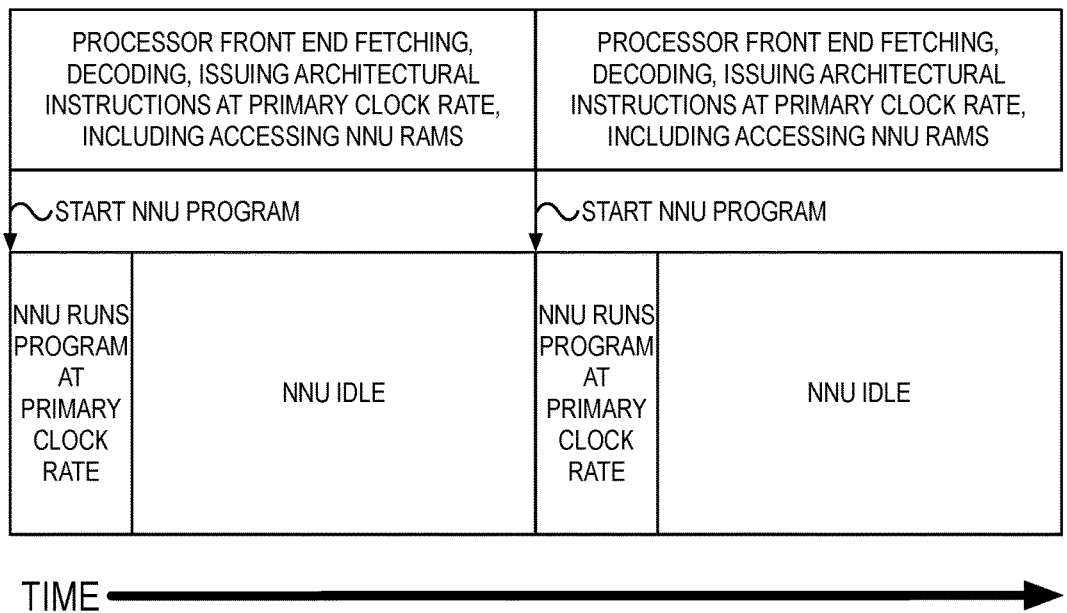
FIG. 36A is a timing diagram illustrating an example of operation of the processor with the NNU operating in normal mode, i.e., at the primary clock rate.

Referring now to FIG. 36A, a timing diagram illustrating an example of operation of the processor 100 with the NNU 121 operating in normal mode, i.e., at the primary clock rate, is shown. Time progresses from left to right in the timing diagram. The processor 100 is running an architectural program at the primary clock rate. More specifically, the processor 100 front end (e.g., instruction fetch unit 101, instruction cache 102, instruction translator 104, rename unit 106, reservation stations 108) fetches, decodes and issues architectural instructions to the NNU 121 and other execution units 112 at the primary clock rate.

Initially, the architectural program executes an architectural instruction (e.g., MTNN instruction 1400) that the front end 100 issues to the NNU 121 that instructs the NNU 121 to start running an NNU program in its program memory 129. Prior, the architectural program executed an architectural instruction to write the relax indicator 3512 with a value that specifies the primary clock rate, i.e., to put the NNU 121 in normal mode. More specifically, the value programmed into the relax indicator 3512 causes the clock reduction logic 3504 to generate the secondary clock signal 3508 at the primary clock rate of the primary clock signal 3506. Preferably, in this case clock buffers of the clock reduction logic 3504 simply boost the primary clock signal 3506. Additionally prior, the architectural program executed architectural instructions to write to the data RAM 122 and the weight RAM 124 and to write the NNU program into the program memory 129. In response to the start NNU program MTNN instruction 1400, the NNU 121 starts running the NNU program at the primary clock rate, since the relax indicator 3512 was programmed with the primary rate value. After starting the NNU 121 running, the architectural program continues executing architectural instructions at the primary clock rate, including and predominately MTNN instructions 1400 to write and/or read the data RAM 122 and weight RAM 124 in preparation for the next instance, or invocation or run, of an NNU program.

As shown in the example in FIG. 36A, the NNU 121 finishes running the NNU program in significantly less time (e.g., one-fourth the time) than the architectural program takes to finish writing/reading the data RAM 122 and weight RAM 124. For example, the NNU 121 may take approximately 1000 clock cycles to run the NNU program, whereas the architectural program takes approximately 4000 clock cycles to run, both at the primary clock rate. Consequently, the NNU 121 sits idle the remainder of the time, which is a significantly long time in the example, e.g., approximately 3000 primary clock rate cycles. As shown in the example in FIG. 36A, this pattern continues another time, and may continue for several more times, depending upon the size and configuration of the neural network. Because the NNU 121 may be a relatively large and transistor-dense functional unit of the processor 100, it may generate a significant amount of heat, particularly when running at the primary clock rate.

Figure 36B:
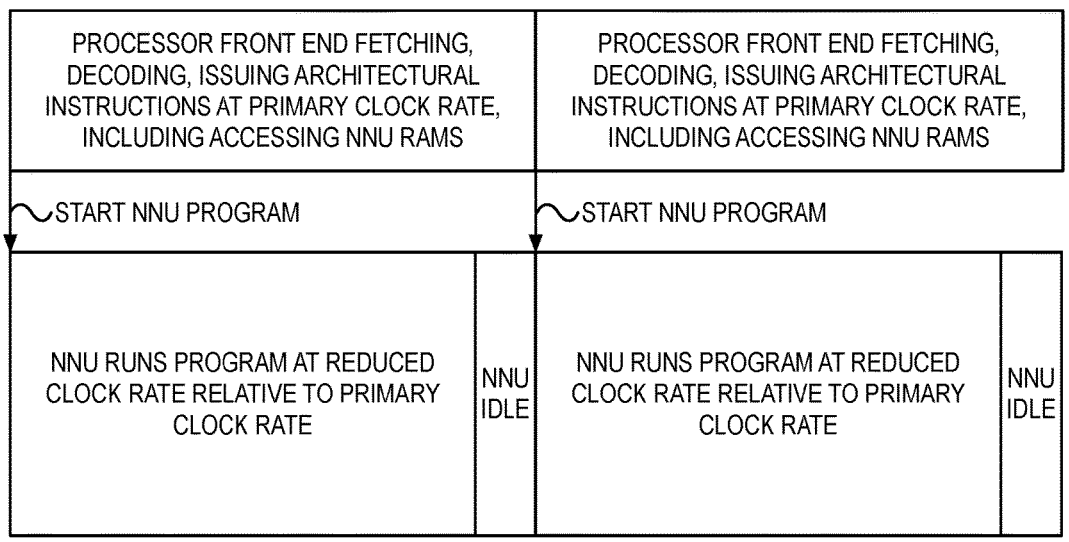
FIG. 36B is a timing diagram illustrating an example of operation of the processor with the NNU operating in relaxed mode, i.e., at a rate that is less than the primary clock rate.

Referring now to FIG. 36B, a timing diagram illustrating an example of operation of the processor 100 with the NNU 121 operating in relaxed mode, i.e., at a rate that is less than the primary clock rate, is shown. The timing diagram of FIG. 36B is similar in many respects to the timing diagram of FIG. 36A in that the processor 100 is running an architectural program at the primary clock rate. And it is assumed in the example that the architectural program and the NNU program of FIG. 36B are the same as those of FIG. 36A. However, prior to starting the NNU program, the architectural program executed an MTNN instruction 1400 that programmed the relax indicator 3512 with a value that causes the clock reduction logic 3504 to generate the secondary clock signal 3508 at a secondary clock rate that is less than the primary clock rate. That is, the architectural program puts the NNU 121 in relaxed mode in FIG. 36B rather than in normal mode as in FIG. 36A. Consequently, the NPUs 126 execute the NNU program at the secondary clock rate, which in the relaxed mode is less than the primary clock rate. In the example, assume the relax indicator 3512 is programmed with a value that specifies the secondary clock rate is one-fourth the primary clock rate. As a result, the NNU 121 takes approximately four times longer to run the NNU program in relaxed mode than it does to run the NNU program in normal mode, as may be seen by comparing FIGS. 36A and 36B, making the amount of time the NNU 121 is idle relatively short. Consequently, the energy used to run the NNU program is consumed by the NNU 121 in FIG. 36B over a period that is approximately four times longer than when the NNU 121 ran the program in normal mode in FIG. 36A. Accordingly, the NNU 121 generates heat to run the NNU program at approximately one-fourth the rate in FIG. 36B as in FIG. 36A, which may have thermal benefits as described herein.

Figure 37:
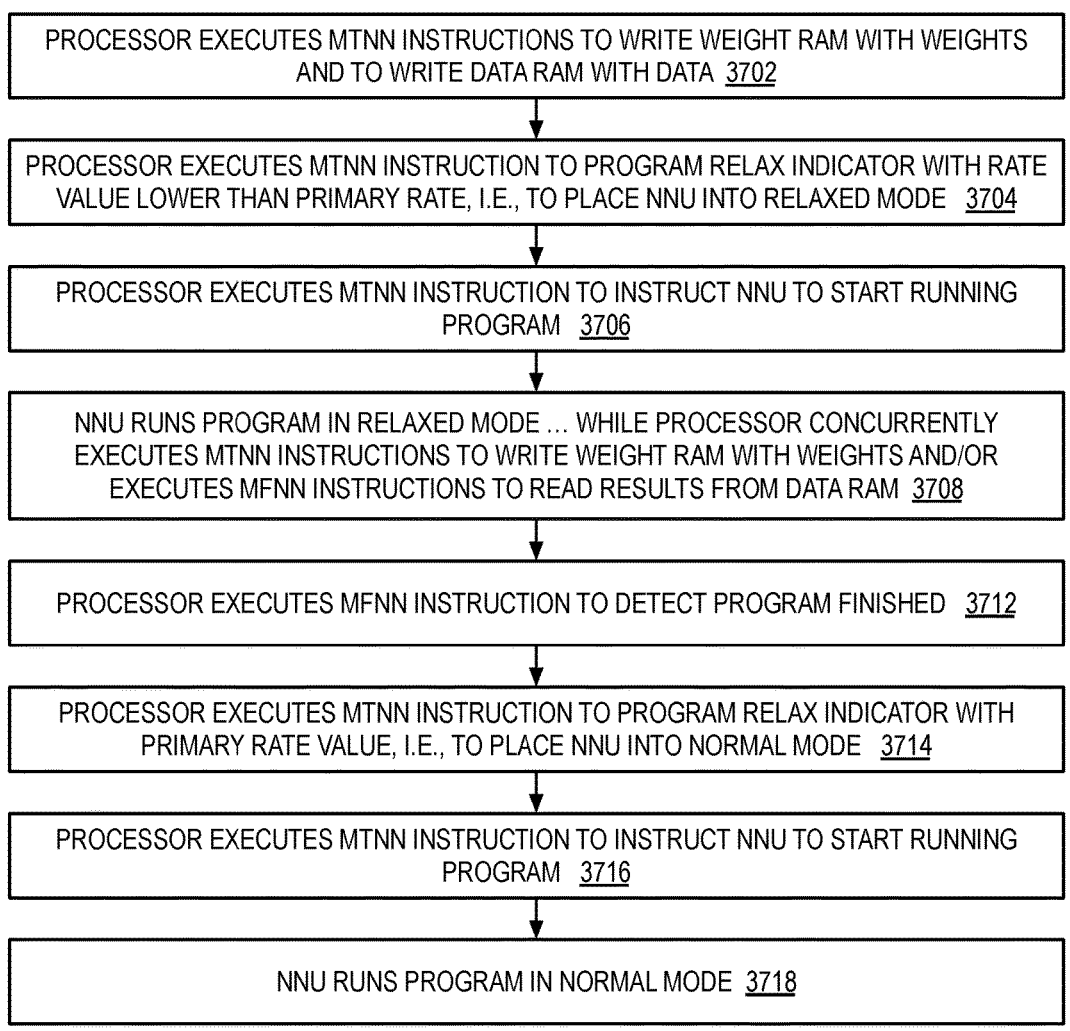
FIG. 37 is a flowchart illustrating operation of the processor of FIG. 35.

Referring now to FIG. 37, a flowchart illustrating operation of the processor 100 of FIG. 35 is shown. The flowchart illustrates operation in many respects similar to the operation described above with respect to FIGS. 35, 36A and 36B. Flow begins at block 3702.

At block 3702, the processor 100 executes MTNN instructions 1400 to write the weight RAM 124 with weights and to write the data RAM 122 with data. Flow proceeds to block 3704.

At block 3704, the processor 100 executes an MTNN instruction 1400 to program the relax indicator 3512 with a value that specifies a lower rate than the primary clock rate, i.e., to place the NNU 121 into relaxed mode. Flow proceeds to block 3706.

At block 3706, the processor 100 executes an MTNN instruction 1400 to instruct the NNU 121 to start running an NNU program, similar to the manner visualized in FIG. 36B. Flow proceeds to block 3708.

At block 3708, the NNU 121 begins to run the NNU program. In parallel, the processor 100 executes MTNN instructions 1400 to write the weight RAM 124 with new weights (and potentially the data RAM 122 with new data) and/or executes MFNN instructions 1500 to read results from the data RAM 122 (and potentially from the weight RAM 124). Flow proceeds to block 3712.

At block 3712, the processor 100 executes a MFNN instruction 1500 (e.g., read the status register 127) to detect that the NNU 121 is finished running its program. Assuming the architectural program selected a good value of the relax indicator 3512, it should take the NNU 121 about the same amount of time to run the NNU program as it takes the processor 100 to execute the portion of the architectural program that accesses the weight RAM 124 and/or data RAM 122, as visualized in FIG. 36B. Flow proceeds to block 3714.

At block 3714, the processor 100 executes an MTNN instruction 1400 to program the relax indicator 3512 with a value that specifies the primary clock rate, i.e., to place the NNU 121 into normal mode. Flow proceeds to block 3716.

At block 3716, the processor 100 executes an MTNN instruction 1400 to instruct the NNU 121 to start running an NNU program, similar to the manner visualized in FIG. 36A. Flow proceeds to block 3718.

At block 3718, the NNU 121 begins to run the NNU program in normal mode. Flow ends at block 3718.

As described above, running the NNU program in relaxed mode spreads out the time over which the NNU runs the program relative to the time over which the NNU runs the program in normal mode (i.e., at the primary clock rate of the processor), which may provide thermal benefits. More specifically, the devices (e.g., transistors, capacitors, wires) will likely operate at lower temperatures while the NNU runs the program in relaxed mode because the NNU generates at a slower rate the heat that is dissipated by the NNU (e.g., the semiconductor devices, metal layers, underlying substrate) and surrounding package and cooling solution (e.g., heat sink, fan). This may also lower the temperature of the devices in other portions of the processor die in general. The lower operating temperature of the devices, in particular their junction temperatures, may have the benefit of less leakage current. Furthermore, since the amount of current drawn per unit time is less, the inductive noise and IR drop noise may be reduced. Still further, the lower temperature may have a positive effect on the negative-bias temperature instability (NBTI) and positive-bias temperature instability (PBTI) of MOSFETs of the processor, thereby increasing the reliability and/or lifetime of the devices and consequently the processor part. The lower temperature may also reduce Joule heating and electromigration in metal layers of the processor.

Communication Mechanism Between Architectural Program and Non-Architectural Program Regarding Shared Resources of NNU As described above, for example with respect to FIGS. 24 through 28 and 35 through 37, the data RAM 122 and weight RAM 124 are shared resources. Both the NPUs 126 and the front-end of the processor 100 share the data RAM 122 and weight RAM 124. More specifically, both the NPUs 126 and the front-end of the processor 100, e.g., the media registers 118, write and read the data RAM 122 and the weight RAM 124. Stated alternatively, the architectural program running on the processor 100 shares the data RAM 122 and weight RAM 124 with the NNU program running on the NNU 121, and in some situations this requires the control of flow between the architectural program and the NNU program, as described above. This resource sharing is also true of the program memory 129 to some extent because the architectural program writes it and the sequencer 128 reads it. Embodiments are described above and below that provide a high performance solution to control the flow of access to the shared resources between the architectural program and the NNU program.

Embodiments are described in which the NNU programs are also referred to as non-architectural programs, the NNU instructions are also referred to as non-architectural instructions, and the NNU instruction set (also referred to above as the NPU instruction set) is also referred to as the non-architectural instruction set. The non-architectural instruction set is distinct from the architectural instruction set. In embodiments in which the processor 100 includes an instruction translator 104 that translates architectural instructions into microinstructions, the non-architectural instruction set is also distinct from the microinstruction set.

Figures 38, 39:
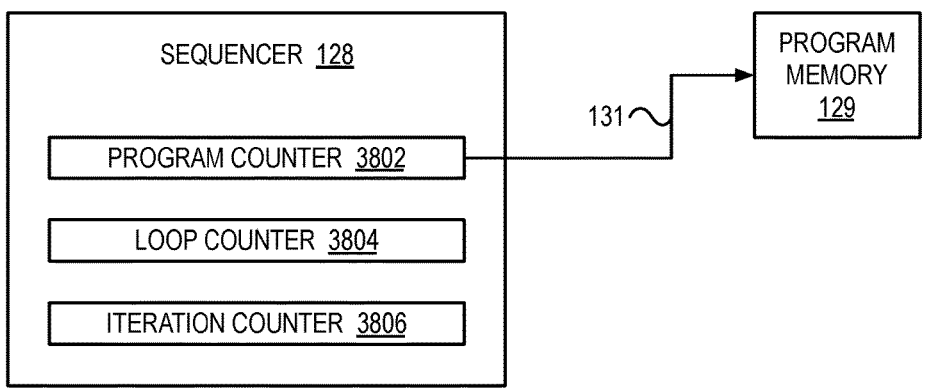
FIG. 38 is a block diagram illustrating the sequence of the NNU in more detail.
FIG. 39 is a block diagram illustrating certain fields of the control and status register of the NNU.

Referring now to FIG. 38, a block diagram illustrating the sequencer 128 of the NNU 121 in more detail is shown. The sequencer 128 provides the memory address 131 to the program memory 129 to select a non-architectural instruction that is provided to the sequencer 128, as described above. The memory address 131 is held in a program counter 3802 of the sequencer 128 as shown in FIG. 38. The sequencer 128 generally increments through sequential addresses of the program memory 129 unless the sequencer 128 encounters a non-architectural control instruction, such as a loop or branch instruction, in which case the sequencer 128 updates the program counter 3802 to the target address of the control instruction, i.e., to the address of the non-architectural instruction at the target of the control instruction. Thus, the address 131 held in the program counter 3802 specifies the address in the program memory 129 of the non-architectural instruction of the non-architectural program currently being fetched for execution by the NPUs 126. Advantageously, the value of the program counter 3802 may be obtained by the architectural program via the NNU program counter field 3912 of the status register 127, as described below with respect to FIG. 39. This enables the architectural program to make decisions about where to read/write data from/to the data RAM 122 and/or weight RAM 124 based on the progress of the non-architectural program.

The sequencer 128 also includes a loop counter 3804 that is used in conjunction with a non-architectural loop instruction, such as the loop to 1 instruction at address 10 of FIG. 26A and the loop to 1 instruction at address 11 of FIG. 28, for examples. In the examples of FIGS. 26A and 28, the loop counter 3804 is loaded with a value specified in the non-architectural initialize instruction at address 0, e.g., with a value of 400. Each time the sequencer 128 encounters the loop instruction and jumps to the target instruction (e.g., the multiply-accumulate instruction at address 1 of FIG. 26A or the maxwacc instruction at address 1 of FIG. 28), the sequencer 128 decrements the loop counter 3804. Once the loop counter 3804 reaches zero, the sequencer 128 proceeds to the next sequential non-architectural instruction. In an alternate embodiment, when a loop instruction is first encountered, the loop counter 3804 is loaded with a loop count value specified in the loop instruction, obviating the need for initialization of the loop counter 3804 via a non-architectural initialize instruction. Thus, the value of the loop counter 3804 indicates how many more times a loop body of the non-architectural program will be executed. Advantageously, the value of the loop counter 3804 may be obtained by the architectural program via the loop count 3914 field of the status register 127, as described below with respect to FIG. 39. This enables the architectural program to make decisions about where to read/write data from/to the data RAM 122 and/or weight RAM 124 based on the progress of the non-architectural program. In one embodiment, the sequencer 128 includes three additional loop counters to accommodate nested loops in the non-architectural program, and the values of the other three loop counters are also readable via the status register 127. A bit in the loop instruction indicates which of the four loop counters is used for the instant loop instruction.

The sequencer 128 also includes an iteration counter 3806. The iteration counter 3806 is used in conjunction with non-architectural instructions such as the multiply-accumulate instruction at address 2 of FIGS. 4, 9, 20 and 26A, and the maxwacc instruction at address 2 of FIG. 28, for examples, which will be referred to hereafter as "execute" instructions. In the examples above, each of the execute instructions specifies an iteration count of 511, 511, 1023, 2, and 3, respectively. When the sequencer 128 encounters an execute instruction that specifies a non-zero iteration count, the sequencer 128 loads the iteration counter 3806 with the specified value. Additionally, the sequencer 128 generates an appropriate micro-operation 3418 to control the logic in the NPU 126 pipeline stages 3401 of FIG. 34 for execution and decrements the iteration counter 3806. If the iteration counter 3806 is greater than zero, the sequencer 128 again generates an appropriate micro-operation 3418 to control the logic in the NPUs 126 and decrements the iteration counter 3806. The sequencer 128 continues in this fashion until the iteration counter 3806 reaches zero. Thus, the value of the iteration counter 3806 indicates how many more times the operation specified in the non-architectural execute instruction (e.g., multiply-accumulate, maximum, sum of the accumulator and a data/weight word) will be performed. Advantageously, the value of the iteration counter 3806 may be obtained by the architectural program via the iteration count 3916 field of the status register 127, as described below with respect to FIG. 39. This enables the architectural program to make decisions about where to read/write data from/to the data RAM 122 and/or weight RAM 124 based on the progress of the non-architectural program.

Referring now to FIG. 39, a block diagram illustrating certain fields of the control and status register 127 of the NNU 121 is shown. The fields include the address of the most recently written weight RAM row 2602 by the NPUs 126 executing the non-architectural program, the address of the most recently read weight RAM row 2604 by the NPUs 126 executing the non-architectural program, the address of the most recently written data RAM row 2606 by the NPUs 126 executing the non-architectural program, and the address of the most recently read data RAM row 2604 by the NPUs 126 executing the non-architectural program, which are described above with respect to FIG. 26B. Additionally, the fields include an NNU program counter 3912, a loop count 3914 and a iteration count 3916. As described above, the status register 127 is readable by the architectural program into the media registers 118 and/or general purpose registers 116, e.g., by MFNN instructions 1500, including the NNU program counter 3912, loop count 3914 and iteration count 3916 field values. The program counter 3912 value reflects the value of the program counter 3802 of FIG. 38. The loop count 3914 value reflects the value of the loop counter 3804. The iteration count 3916 value reflects the value of the iteration counter 3806. In one embodiment, the sequencer 128 updates the program counter 3912, loop count 3914 and iteration count 3916 field values each time it modifies the program counter 3802, loop counter 3804, or iteration counter 3806 so that the field values are current when the architectural program reads them. In another embodiment, when the NNU 121 executes an architectural instruction that reads the status register 127, the NNU 121 simply obtains the program counter 3802, loop counter 3804, and iteration counter 3806 values and provides them back to the architectural instruction (e.g., into a media register 118 or general purpose register 116).

As may be observed from the forgoing, the values of the fields of the status register 127 of FIG. 39 may be characterized as information that indicates progress made by the non-architectural program during its execution by the NNU 121. Specific aspects of the non-architectural program's progress have been described above, such as the program counter 3802 value, the loop counter 3804 value, the iteration counter 3806 value, the weight RAM 124 address 125 most recently written/read 2602/2604, and the data RAM 122 address 123 most recently written/read 2606/2608. The architectural program executing on the processor 100 may read the non-architectural program progress values of FIG. 39 from the status register 127 and use the information to make decisions, e.g., by architectural instructions, such as compare and branch instructions. For example, the architectural program decides which rows to write/read data/weights into/from the data RAM 122 and/or weight RAM 124 to control the flow of data in and out of the data RAM 122 or weight RAM 124, particularly for large data sets and/or for overlapping execution instances of different non-architectural programs. Examples of the decisions made by the architectural program are described above and below.

For example, as described above with respect to FIG. 26A, the architectural program configures the non-architectural program to write back the results of the convolutions to rows of the data RAM 122 above the convolution kernel 2402 (e.g., above row 8), and the architectural program reads the results from the data RAM 122 as the NNU 121 writes them by using the address of the most recently written data RAM 122 row 2606.

For another example, as described above with respect to FIG. 26B, the architectural program uses the information from the status register 127 fields of FIG. 38 to determine the progress of a non-architectural program to perform a convolution of the data array 2404 of FIG. 24 in 5 chunks of 512×1600. The architectural program writes a first 512× 1600 chunk of the 2560×1600 data array 2404 into the weight RAM 124 and starts the non-architectural program, which has a loop count of 1600 and an initialized weight RAM 124 output row of 0. As the NNU 121 executes the non-architectural program, the architectural program reads the status register 127 to determine the most recently written weight RAM row 2602 so that it may read the valid convolution results written by the non-architectural program and write the next 512×1600 chunk over the valid convolution results after the architectural program has read them, so that when the NNU 121 completes the non-architectural program on the first 512×1600 chunk, the processor 100 can immediately update the non-architectural program as needed and start it again to process the next 512×1600 chunk.

For another example, assume the architectural program is having the NNU 121 perform a series of classic neural network multiply-accumulate-activation function operations in which the weights are stored in the weight RAM 124 and the results are written back to the data RAM 122. In this case, once the non-architectural program has read a row of the weight RAM 124 it will not be reading it again. So, the architectural program may be configured to begin overwriting the weights in the weight RAM 124 with new weights for a next execution instance of a non-architectural program (e.g., for a next neural network layer) once the current weights have been read/used by the non-architectural program. In this case, the architectural program reads the status register 127 to obtain the address of the most recently read weight ram row 2604 to decide where it may write the new set of weights into the weight RAM 124.

For another example, assume the architectural program knows that the non-architectural program includes an execute instruction with a large iteration count, such as the non-architectural multiply-accumulate instruction at address 2 of FIG. 20. In such cases, the architectural program may need to know the iteration count 3916 in order to know approximately how many more clock cycles it will take to complete the non-architectural instruction so that the architectural program can decide which of two or more actions to take. For example, the architectural program may relinquish control to another architectural program, such as the operating system, if the time is long. Similarly, assume the architectural program knows that the non-architectural program includes a loop body with a relatively large loop count, such as the non-architectural program of FIG. 28. In such cases, the architectural program may need to know the loop count 3914 in order to know approximately how many more clock cycles it will take to complete the non-architectural program so that the architectural program can decide which of two or more actions to take.

For another example, assume the architectural program is having the NNU 121 perform a pooling operation similar to that described with respect to FIGS. 27 and 28 in which the data to be pooled is stored in the weight RAM 124 and the results are written back to the weight RAM 124. However, assume that, unlike the example of FIGS. 27 and 28, the results are written back to the top 400 rows of the weight RAM 124, e.g., rows 1600 to 1999. In this case, once the non-architectural program has read four rows of the weight RAM 124 that it pools, it will not be reading it again. So, the architectural program may be configured to begin overwriting the data in the weight RAM 124 with new data (e.g., weights for a next execution instance of a non-architectural program, e.g., to perform classic multiply-accumulate-activation function operations on the pooled data) once the current four rows have been read/used by the non-architectural program. In this case, the architectural program reads the status register 127 to obtain the address of the most recently read weight ram row 2604 to decide where it may write the new set of weights into the weight RAM 124.

Dual-Use of Memory Array as NNU Memory and Cache Memory

Figure 40:
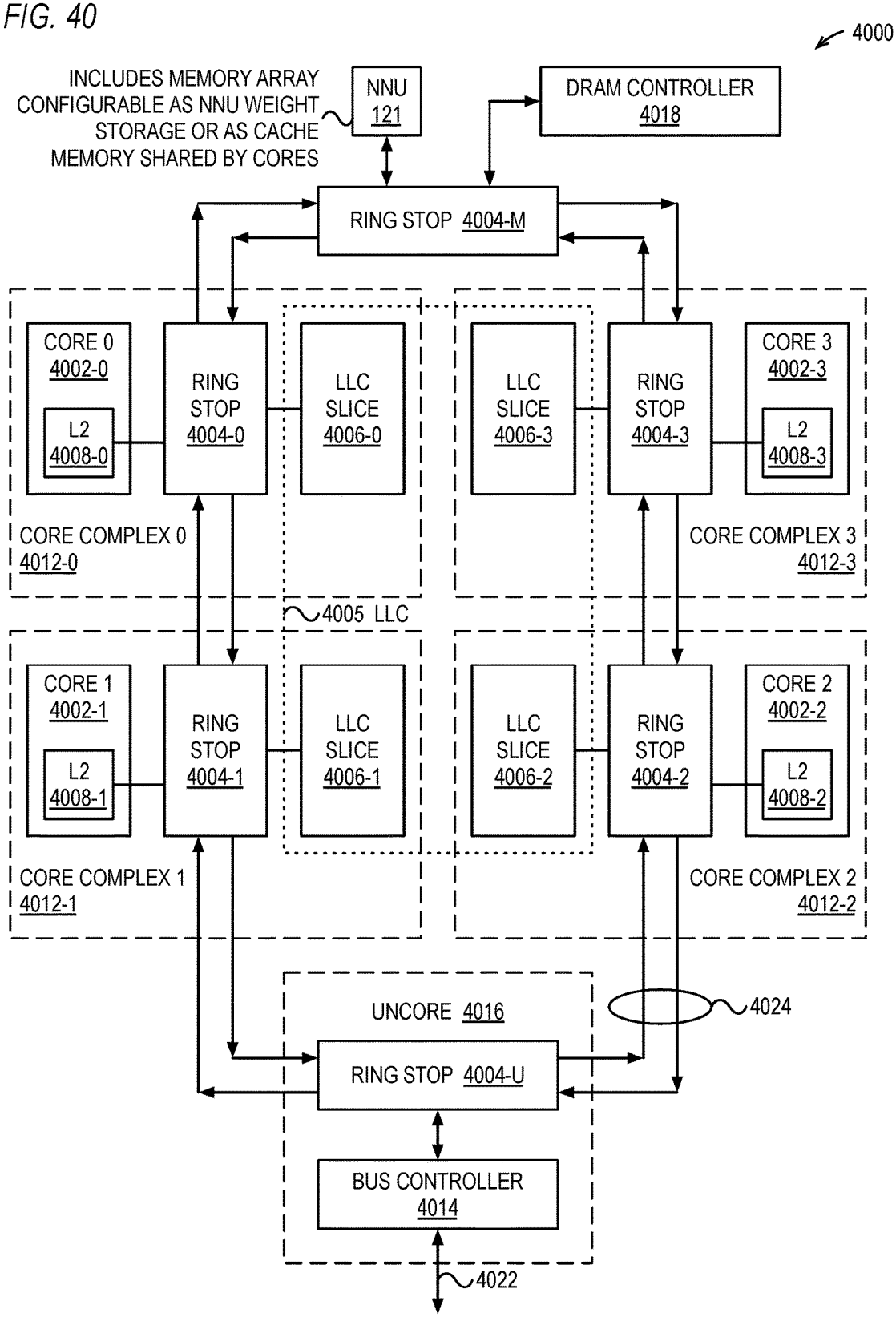
FIG. 40 is a block diagram illustrating a processor.

Referring now to FIG. 40, a block diagram illustrating a processor 4000 is shown. The processor 4000 includes a plurality of ring stops 4004 connected to one another in a bidirectional fashion to form a ring bus 4024. The embodiment of FIG. 40 includes six ring stops denoted 4004-0, 4004-1, 4004-2, 4004-3, 4004-M and 4004-U. The processor 4000 includes four core complexes 4012, referred to individually as core complex 0 4012-0, core complex 1 4012-1, core complex 2 4012-2 and core complex 3 4012-3, which include the four ring stops 4004-0, 4004-1, 4004-2 and 4004-3 respectively, that couple the core complexes 4012 to the ring bus 4024. The processor 4000 also includes an uncore portion 4016, which includes the ring stop 4004-U that couples the uncore 40126 to the ring bus 4024. Finally, the processor 4000 includes a dynamic random access memory (DRAM) controller 4018 and a NNU 121 that are coupled to the ring bus 4024 by the ring stop 4004-M. The NNU 121 includes a memory array 4152 (see FIG. 41) that may be employed as either a memory used by the array of NPUs 126 of the NNU 121 (e.g., weight RAM 124 of FIG. 1) or as a cache memory shared by the core complexes 4012, e.g., as a victim cache or as a slice of a last-level cache (LLC), as described in more detail below. Although the example of FIG. 40 includes four core complexes 4012, other embodiments are contemplated with different numbers of core complexes 4012.

The uncore 4016 includes a bus controller 4014 that controls access by the processor 4000 to a system bus 4022 to which peripheral devices may be coupled, for example, such as video controllers, disk controllers, peripheral bus controllers (e.g., PCI-E), etc. In one embodiment, the system bus 4022 is the well-known V4 bus. The uncore 4016 may also include other functional units, such as a power management unit and private RAM (e.g., non-architectural memory used by microcode of the cores 4002).

The DRAM controller controls DRAM (e.g., asynchronous DRAM or synchronous DRAM (SDRAM) such as double data rate synchronous DRAM, direct Rambus DRAM or reduced latency DRAM) that is the system memory. The core complexes 4012, uncore 4016 and NNU 121 access the system memory via the ring bus 4024. More specifically, the NNU 121 reads neural network weights and data from the system memory into the memory array 4152 and writes neural network results from the memory array 4152 to the system memory via the ring bus 4024.

Additionally, when operating as a victim cache (see 4006-4 of FIG. 41), the memory array 4152, under the control of cache control logic 4108 (see FIG. 41), evicts cache lines to the system memory. Furthermore, when operating as a LLC slice (see 4006-4 of FIG. 41), the memory array 4152 and cache control logic 4108 fill cache lines from the system memory and write back and evict cache lines to the system memory.

The four core complexes 4012 include respective LLC slices 4012-0, 4012-1, 4012-2 and 4012-3, each of which is coupled to the ring stop 4004, and which are referred to individually generically as LLC slice 4006 and collectively as LLC slices 4006. Each core 4002 includes a cache memory, such as a level-2 (L2) cache 4008 coupled to the ring stop 4004. Each core 4002 may also include a level-1 cache (not shown). In one embodiment, the cores 4002 are x86 instruction set architecture (ISA) cores, although other embodiments are contemplated in which the cores 4002 are of another ISA, e.g., ARM, SPARC, MIPS.

The LLC slices 4006-0, 4006-1, 4006-2 and 4006-3 collectively form a LLC 4005 of the processor 4000 shared by the core complexes 4012, as shown in FIG. 40. Each LLC slice 4006 includes a memory array and cache control logic similar to the memory array 4152 and cache control logic

Figure 41:
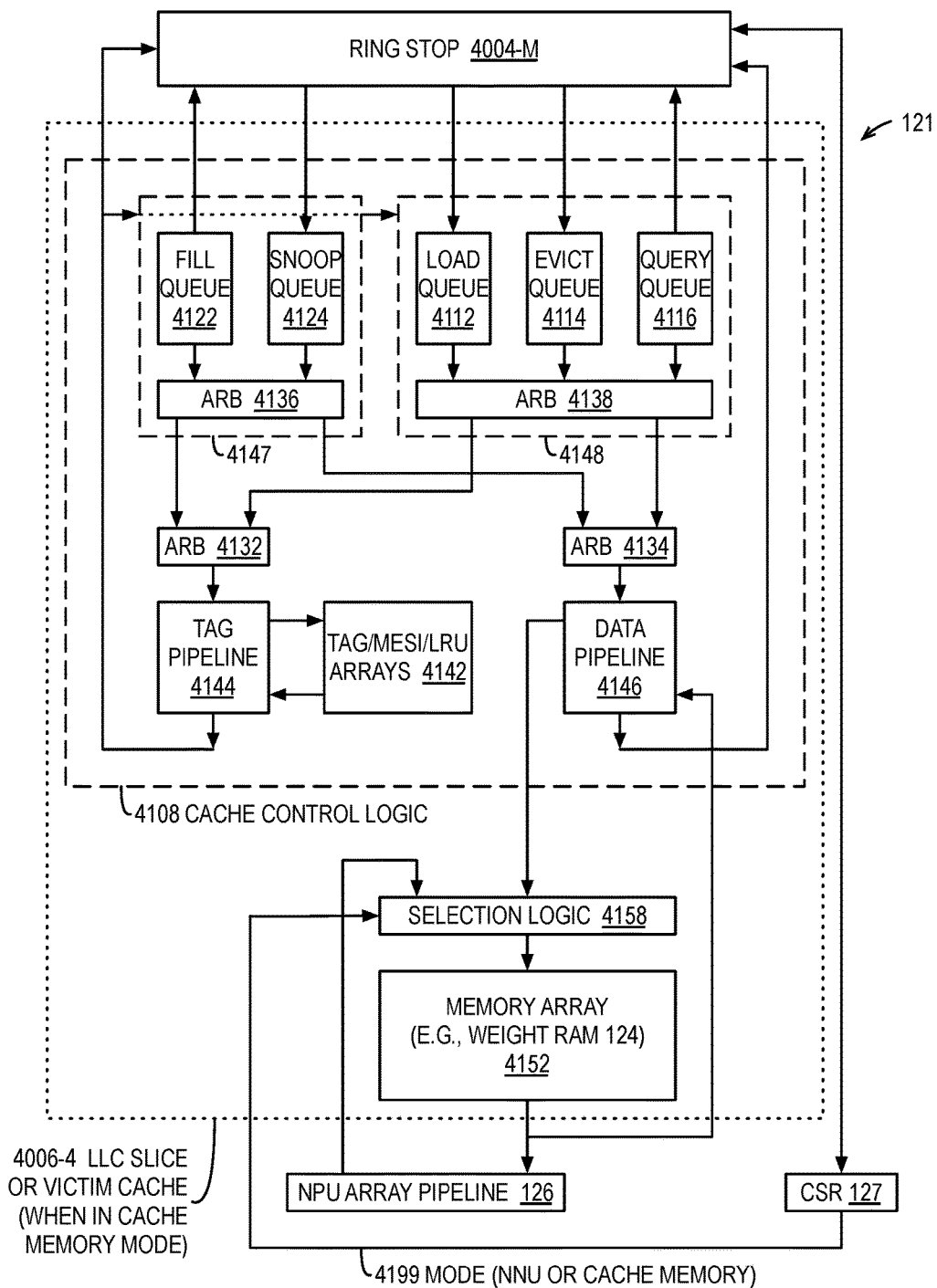
FIG. 41 is a block diagram illustrating the NNU of FIG. 40 in more detail and the ring stop of FIG. 40.

4108 of FIG. 41. A mode indicator (e.g., mode input 4199 of FIG. 41) may be set such that the memory array 4152 of the NNU 121 operates as an additional (e.g., fifth or ninth) slice 4006-4 of the LLC 4005, as described in more detail below. The memory array 4152 (and cache control logic 4108 of FIG. 41) that selectively make up an additional LLC slice 4006-4 is also referred to as the NNU LLC slice 4006-4. In one embodiment, the memory array 4152 and each LLC slice 4006 comprises a 2 MB memory array, although other embodiments are contemplated with different sizes. Furthermore, embodiments are contemplated in which the sizes of the memory array 4152 and the LLC slices 4006 are different. Preferably, the LLC 4005 is inclusive of the L2 caches 4008 and any other caches in the cache hierarchy (e.g., L1 caches).

The ring bus 4024, or ring 4024, is a scalable bidirectional interconnect that facilitates communication between coherent components including the DRAM controller 4018, the uncore 4016, and the LLC slices 4006. The ring 4024 comprises two unidirectional rings, each of which further comprises five sub-rings: Request, for transporting most types of request packets including loads; Snoop, for transporting snoop request packets; Acknowledge, for transporting response packets; Data, for transporting data packets and certain request items including writes; and Credit, for emitting and obtaining credits in remote queues. Each node attached to the ring 4024 is connected via a ring stop 4004, which contains queues for sending and receiving packets on the ring 4024. Queues are either egress queues that initiate requests on the ring 4024 on behalf of an attached component to be received in a remote queue, or ingress queues that receive requests from the ring 4024 to be forwarded to an attached component. Before an egress queue initiates a request on the ring, it first obtains a credit on the Credit ring from the remote destination ingress queue. This ensures that the remote ingress queue has resources available to process the request upon its arrival. When an egress queue wishes to send a transaction packet on the ring 4024, it can only do so if it would not preempt an incoming packet ultimately destined to a remote node. When an incoming packet arrives in a ring stop 4004 from either direction, the packet's destination ID is interrogated to determine if this ring stop 4004 is the packet's ultimate destination. If the destination ID is not equal to the ring stop's 4004 node ID, the packet continues to the next ring stop 4004 in the subsequent clock. Otherwise, the packet leaves the ring 4024 in the same clock to be consumed by whichever ingress queue is implicated by the packet's transaction type.

Generally, the LLC 4005 comprises N LLC slices 4006, where each of the N slices 4006 is responsible for caching a distinct approximately 1/Nth of the processor's 4000 physical address space determined by a hashing algorithm, or hash algorithm, or simply hash. The hash is a function that takes as input a physical address and selects the appropriate LLC slice responsible for caching the physical address. When a request must be made to the LLC 4005, either from a core 4002 or snooping agent, the request must be sent to the appropriate LLC slice 4006 that it responsible for caching the physical address of the request. The appropriate LLC slice 4006 is determined by applying the hash to the physical address of the request.

A hash algorithm is a surjective function whose domain is the set of physical addresses, or a subset thereof, and whose range is the number of currently included LLC slices 4006. More specifically, the range is the set of indexes of the LLC slices 4006, e.g., 0 through 7 in the case of eight LLC slices 4006. The function may be computed by examining an appropriate subset of the physical address bits. For example, in a system with eight LLC slices 4006, the output of the hashing algorithm may be simply PA[10:8], which is three of the physical address bits, namely bits 8 through 10. In another embodiment in which the number of LLC slices 4006 is eight, the output of the hash is a logical function of other address bits, e.g., three bits generated as {PA[17], PA[14], PA[12]^PA[10]^PA[9]}.

All requestors of the LLC 4005 must have the same hash algorithm before any LLC 4005 caching is done. Because the hash dictates where addresses are cached and where snoops will be sent during operation, the hash is only changed through coordination between all cores 4002, LLC slices 4006, and snooping agents. As described in more detail below with respect to FIGS. 42 and 43, updating the hash algorithm essentially comprises: (1) synchronizing all cores 4002 to prevent new cacheable accesses; (2) performing a write-back-invalidate of all LLC slices 4006 currently included in the LLC 4005, which causes modified cache lines to be written back to system memory and all cache lines to be invalidated (the write-back-invalidate may be a selective write-back-invalidate, described below, in which only those cache lines whose addresses the new hash algorithm will hash to a different slice than the old hash algorithm are evicted, i.e., invalidated and, if modified, written back before being invalidated); (3) broadcasting a hash update message to each core 4002 and snoop source, which commands them to change to a new hash (either from inclusive hash to exclusive hash, or vice versa, as described below); (4) updating the mode input 4199 to the selection logic 4158 (see FIG. 41) that controls access to the memory array 4152; and (5) resuming execution with the new hash algorithm.

The hash algorithms described above are useful when the number of LLC slices 4006, N, is 8, which is a power of 2, and those algorithms may be modified to easily accommodate other powers of 2, e.g., PA[9:8] for 4 slices or PA[11:8] for 16 slices. However, depending upon whether the NNU LLC slice 4006-4 is included in the LLC 4005 (and the number of core complexes 4012), N may or may not be a power of 2. Therefore, at least two different hashes are used, as described with respect to FIGS. 42 and 43 below, depending upon the number of LLC slices 4006. That is, a first hash—referred to as the inclusive hash—is used when the NNU LLC slice 4006-4 is included in the LLC 4005 and a second hash—referred to as the exclusive hash—is used when the NNU LLC slice 4006-4 is excluded from the LLC 4005.

One hash algorithm outputs PA[45:6] mod N. This hash has the advantage of distributing the physical addresses in an essentially balanced fashion across the N LLC slices 4006 (assuming a relatively even distribution of physical addresses) even when the value of N is not a power of 2. When N is a power of 2, the mod operation may be performed by simply outputting the lower N−1 bits of PA[45:6]. However, when N is not a power of 2, the mod operation may disadvantageously require an integer divide.

Another hash that approximates the PA mod N hash but for a smaller subset of the physical address, and which may be more efficiently implemented in hardware when N is not a power of 2, in this case when N=9, is defined as:

```
def calc_hash(PA):
    if (PA[11:8] == 0xF)
        return 8
    else
        return PA[10:8]
```

With calc_hash( ) PA[11:8] are used for the hash, but if PA[11:8]>8 then PA[10:8] is used, which is guaranteed to be in the range [0,7]. As may be observed, calc_hash( ) may distribute the physical addresses among the LLC slices 4006 in a relatively less balanced fashion (again assuming a relatively even distribution of physical addresses) than PA[45:6] mod N, namely slices 0 through 6 have about a one-eighth probability, whereas slices 7 and 8 have about a one-sixteenth probability. However, it should be noted that even the PA[45:6] mod N hash algorithm does not generate a distribution that is perfectly evenly balanced, since PA[45:6] represents a domain having a number of elements that is a power of 2, but N is not a power of 2.

Generally, when N is not a power of 2, the hash algorithm first hashes the physical address to a range of 2^P possible results, where P=ceiling (log 2 (N)), and then maps results of the first hash that are greater than or equal to N (i.e., results that do not correspond to existing slices 4006) to outputs less than to N (i.e., to existing slices 4006).

Another hash algorithm relatively efficiently implemented in hardware is defined as:

```
def calc_hash_2(PA):
    if (PA[13:11] == 0x7)
        return 8
    else
        return PA[10:8]
```

Calc_hash_2 ( ) may distribute the physical addresses among the LLC slices 4006 in a relatively more balanced fashion than calc_hash( ) (again assuming a relatively even distribution of physical addresses), namely slices 0 through 7 have about a 7/64 probability, whereas slice 8 has about a 8/64, or 1/8, probability. In other embodiments, the calc_hash( ) and calc_hash_2 ( ) algorithms may be modified to distribute the physical addresses in an even relatively more balanced fashion by using an even larger number of physical address bits.

As described here, advantageously the embodiments employ two different hash algorithms: one that excludes the memory array 4152 as a LLC slice 4006 and one that includes the memory array 4152 as a LLC slice 4006. For example, in a processor 4000 in which the number of core complexes 4012 and their corresponding LLC slices 4006 is eight, the hash that excludes the memory array 4152 may be PA[10:8]; and the hash that includes the memory array 4152 may be calc_hash_2 (PA) described above, which maps to nine different slices. In one embodiment, the two hash algorithms may advantageously be designed to support a write-back-invalidate that is selective as an optimization, i.e., that evicts (i.e., write-back-invalidates) only cache lines that the inclusive and exclusive hash algorithms will hash to different slices. In some embodiments, on a transition from the inclusive hash to the exclusive hash this requires only the NNU LLC slice 4006-4 to be write-back-invalidated (i.e., the non-NNU LLC slices 4006 need not be write-back-invalidated); and, on a transition from the exclusive hash to the inclusive hash, only the cache lines of the non-NNU LLC slices 4006 whose addresses the inclusive and exclusive hash algorithms will hash to different slices need be evicted, as described in more detail below with respect to blocks FIGS. 42 and 43. The embodiment in which the exclusive hash is PA[10:8], or similar, and the inclusive hash is calc_hash_2, or similar, is such an embodiment.

Referring now to FIG. 41, a block diagram illustrating the NNU 121 of FIG. 40 in more detail and the ring stop 4004-M of FIG. 40 is shown. The NNU 121 of FIG. 41 is similar in many ways to embodiments of the NNU 121 described above, but also includes cache control logic 4108, selection logic 4158 and a memory array 4152, which may be comprised by the weight RAM 124 or data RAM 122 of the NNU 121. Although not shown in FIG. 41, the NNU 121 also includes the program memory 129, sequencer 128, data RAM 122 and weight RAM 124 of FIG. 1. The NNU 121 also includes the array of NPUs 126 and control/status register 127 of FIG. 1 as shown in FIG. 41. As described above, e.g., with respect to FIG. 34, each of the NPUs 126 of the array includes a pipeline of stages that process instructions and data, as described in detail above. A first stage of the NPU pipeline 126 provides data to the selection logic 4158 to be written to the memory array 4152 and a second stage receives data from the memory array 4152. In one embodiment, the pipeline 126 comprises ten stages and the sixth stage receives the data from the memory array 4152 and the ninth stage provides the data to the selection logic 4158 for writing to the memory array 4152.

The memory array 4152 is coupled to the NPU array pipeline 126. Selection logic 4158 provides inputs to the memory array 4152. The selection logic 4158 is controlled by a mode input 4199 that specifies a mode. Preferably, the mode 4199 input is the output of a bit in the control/status register 127 that is written to change the mode 4199 from cache memory mode to NNU mode. The mode indicates that the memory array 4152 is operating in an NNU mode or a cache memory mode. When operating in the NNU mode, the memory array 4152 operates as the weight RAM 124 of the NNU 121. (Although reference is made throughout that the memory array 4152 functions as the weight RAM 124, alternatively the memory array 4152 may operate as the data RAM 122.) However, when operating in the cache memory mode, the memory array 4152 operates as a cache memory. Two embodiments of the cache memory mode are described: a first in which the memory array 4152 operates as a slice 4006 of the LLC 4005 shared by the core complexes 4012, and a second in which the memory array 4152 operates as a victim cache shared by the core complexes 4012. When the mode control 4199 indicates NNU mode, the selection logic 4158 selects data provided by the NPU array pipeline 126 and the memory array 4152 writes data to the NPU array pipeline 126, such that the memory array 4152 functions as the weight RAM 124 of the NNU 121. In contrast, when the mode control 4199 indicates cache memory mode, the selection logic 4158 selects data provided by a data pipeline 4146 of the cache control logic 4108, and the memory array 4152 writes data to the data pipeline 4146 of the cache control logic 4108. In this manner, the memory array 4152 functions as a cache memory shared by the cores 4002, e.g., as a victim cache or a LLC slice 4006-4. Preferably, the memory array of the larger of the two RAMs 122/124 is used in cache memory mode. Furthermore, embodiments are contemplated in which the memory arrays of both the weight RAM 124 and data RAM 122 are employed as cache memories shared by the cores 4002.

Preferably, the data bus providing data from the data pipeline 4146 to the memory array 4152 is 64 bytes wide (e.g., the size of a cache line), and the data bus providing data from the memory array 4152 to the NPU array pipeline 126 is the number of words equal to the number of NPUs 126 of the array, e.g., 1024 words. Conversely, the data bus providing data from the NPU array pipeline 126 to the memory array 4152 is the number of words equal to the number of NPUs 126 of the array. Preferably, the bus between the selection logic 4158 and the memory array 4152 includes an address bus, a write data bus, RD/WR controls and cache line enables (CLEs) that indicate which cache line of the 16 cache lines (assuming 1024 byte-wide memory array and 64-byte cache lines, for example) is being accessed. In the case of a write to the memory array 4152 from the NPU array pipeline 126, typically all the CLEs will be true because typically all the NPUs 126 write to a row of the weight RAM 124. Selection logic (not shown) uses the CLEs when data is being written to the memory array 4152 to select the correct bank or banks of the memory array 4152 to enable for reading or writing.

In the embodiment of FIG. 41, when operating in the NNU mode, preferably architectural programs executing on the cores 4002 access the NNU 121 as a peripheral device over the ring bus 4024, rather than the NNU 121 being an execution unit of a core, such as the embodiments described above with respect to FIGS. 1 through 35). Preferably, the interface logic 3514 of FIG. 35 (not shown in FIG. 41) and the control/status register 127 are coupled to the ring stop 4004-M, which enables the cores 4002 to read and write the control/status register 127 and to read and write the data RAM 122, weight RAM 124, and program memory 129 via the interface logic 3514 using architectural load/store instructions (rather than the MTNN 1400 and MFNN 1500 instructions of FIGS. 14 and 15). Additionally, data/weight words may be transferred between system memory and the data RAM 122/weight RAM 124 via direct memory access (DMA) transfers. Finally, embodiments are contemplated in which the NNU 121 itself performs load/store instructions to transfer data/weights between system memory and data RAM 122/weight RAM 124. Preferably, the operating system manages the NNU 121 as a global resource shared by the various processes of the system running on the different cores 4002, and the operating system requires a process to obtain ownership of the NNU 121 before using it. Preferably, the operating system controls the mode 4199 in which the NNU 121 operates, and more specifically, the way the memory array 4152 functions, as described in more detail below with respect to FIGS. 42 through 45. In one embodiment, the memory array 4152 is a 2 MB static RAM array, although other embodiments are contemplated in which the size is larger or smaller.

The cache control logic 4108 is coupled to the ring stop 4004-M and to the selection logic 4158 and memory array 4152. The cache control logic 4108 includes a tag pipeline 4144 coupled to the ring stop 4004-M, a data pipeline 4146 coupled to the ring stop 4004-M, and tag/MESI/LRU arrays 4142 coupled to the tag pipeline 4144. The cache control logic 4108 also includes an external interface 4147 that includes a fill queue 4122, snoop queue 4124 and arbiter 4136 that arbitrates between the fill queue 4122 and snoop queue 4124 for access to the tag pipeline 4144 and data pipeline 4146. The cache control logic 4108 also includes a core interface 4148 that includes a load queue 4112, evict queue 4114, query queue 4116 and arbiter 4138 that arbitrates between the load queue 4112, evict queue 4114 and query queue 4116 for access to the tag pipeline 4144 and data pipeline 4146. An arbiter 4132 arbitrates between the external interface 4147 and the core interface 4148 for access to the tag pipeline 4144, and an arbiter 4134 arbitrates between the external interface 4147 and the core interface 4148 for access to the data pipeline 4146. In one embodiment, the cache control logic 4108 also includes a state machine that performs a write-back-invalidate operation of the memory array 4152 in response to a request to do so, e.g., in response to a write-back-invalidate request from a core 4002. Additionally, the state machine performs an invalidate operation of the memory array 4152 in response to a request to do so, e.g., in response to an invalidate request from a core 4002. To perform the invalidate operation, the state machine updates the state within the tag/MESI array 4142 of each cache line in the memory array 4152 to an invalid status and resets the replacement information within the LRU array 4142 for each set of the memory array 4152.

The tag pipeline 4144 receives requests and tag updates from the arbiter 4132 and provides cache line status and responses to the ring stop 4004-M and external interface 4147 and core interface 4148. The data pipeline 4146 receives requests and data from the arbiter 4134 and provides data to the selection logic 4158 and to the ring stop 4004-M. When in cache memory mode, the tag/MESI array 4142 stores tags and status for the cache lines stored in the memory array 4152. Preferably, the memory array 4152 operates as a set associative memory when in cache memory mode, and the LRU array 4142 stores cache line replacement information for determining which way of the selected set to replace.

The fill queue 4122 handles new allocations into the memory array 4152 (reload requests) and evictions (victim requests) from the memory array 4152. In the case of a victim request, the fill queue 4122 requests access to the tag pipeline 4144 to determine which cache line, if any, needs to be evicted and requests access to the data pipeline 4146 to read modified data out of the memory array 4152 to write out to system memory. In the case of a reload request, the fill queue 4122 requests access to the tag pipeline 4144 to write the address of the newly allocated cache line into the tag array 4142 and to set the initial MESI state in the MESI array 4142 and requests access to the data pipeline 4146 to write the new data into the memory array 4152. The snoop queue 4124 handles snoops originating from the system bus 4022. The snoop queue 4124 requests access to the tag pipeline 4144 to determine the status of the cache line specified in the snoop request and requests access to the data pipeline 4146 to read modified data out of the memory array 4152, if present, to respond to the snoop request. The load queue 4112 handles loads from a core's 4002 L2 cache 4008 (and from other caches, e.g., L1 data and L1 instruction, in embodiments in which the L2 cache 4008 is not inclusive of them) when a load misses in all the lower level caches (including the L3 cache 4005 when the memory array 4152 and cache control logic 4108 are operating as a victim cache 4006-4, as described in more detail below). The load queue 4112 requests access to the tag pipeline 4144 to determine whether the specified cache line is present in the memory array 4152 and requests access to the data pipeline 4146 to read the specified data out of the memory array 4152 to write to the requesting core 4002 via the ring bus 4024. The evict queue 4114 handles evictions from a core's L2 cache 4008. When operating as a victim cache 5806-4, the evict queue 4114 requests access to the tag pipeline 4144 to write the address of the cache line evicted from the lower level cache memory into the tag array 4142 and to set the initial MESI state in the MESI array 4142. When operating as a slice of the LLC 5805, the evict queue 4114 requests access to the tag pipeline 4144 to update the MESI state in the MESI array 4142 if the evicted cache line is modified. The evict queue 4114 also requests access to the data pipeline 4146 to write the evicted cache line into the memory array 4152. The query queue 4116 handles snoops to a core's L2 cache 4008. The query queue 4116 requests access to the tag pipeline 4144 to update the MESI state to Modified after a core 4002 responded Modified to a snoop and requests access to the data pipeline 4146 to write modified cache lines from a snoop response into the memory array 4152. In one embodiment, the cache control logic 4108 includes a core interface 4148 for each core 4002. In one embodiment, each core interface 4148 includes separate data/instruction load queues 4112, evict queues 4114 and query queues 4116 for handling loads, evictions and snoops, respectively, with the core's 4002 separate data/instruction caches.

Figure 42:
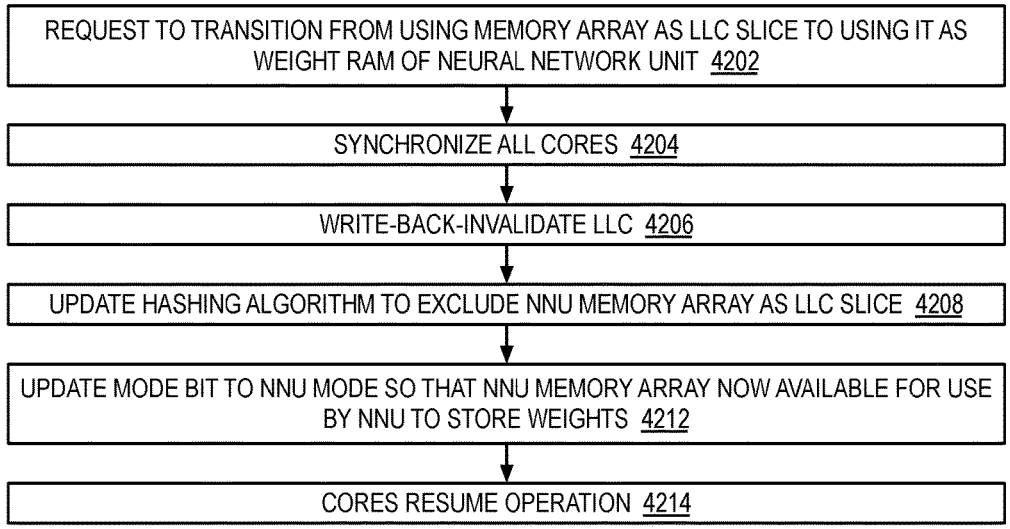
FIG. 42 is a flowchart illustrating operation of the processor of FIG. 40 when the memory array of FIG. 41 is being transitioned from cache memory mode when being used as a LLC slice to NNU mode when being used as the weight/data RAM of the NNU.
Figure 43:
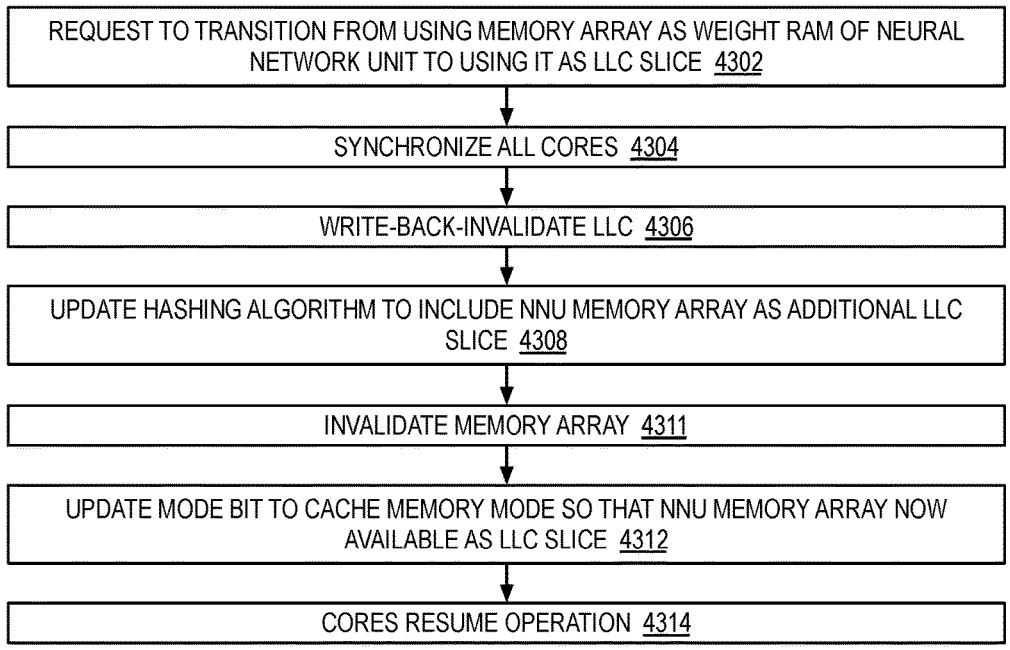
FIG. 43 is a flowchart illustrating operation of the processor of FIG. 40 when the memory array of FIG. 41 is being transitioned from NNU mode when being used as the weight/data RAM of the NNU to cache memory mode when being used as a LLC slice.

Referring now to FIG. 42, a flowchart illustrating operation of the processor 4000 of FIG. 40 when the memory array 4152 of FIG. 41 is being transitioned from cache memory mode when being used as a LLC slice 4006 to NNU mode when being used as the weight/data RAM 124/122 of the NNU 121 is shown. As described above, the NNU 121 has a large amount of memory, e.g., the weight RAM 124 is 2 MB in one embodiment. FIGS. 42 and 43 describe an embodiment that enables the memory array 4152 to operate as an additional LLC slice 4006, thus advantageously enabling the size of the LLC 4005 to increase significantly (e.g., by 25%) when the NNU 121 is not being used as a neural network unit by any of the processes running on the system. More specifically, FIG. 42 describes a method for transitioning the memory array 4152 from operating as a LLC slice 4006 to operating as the weight RAM 124 of the NNU 121. Advantageously, the cache control logic 4108 and memory array 4152 and selection logic 4158 of FIG. 41 operate collectively as a LLC slice 4006 in the embodiment of FIGS. 42 and 43 when the mode 4199 is set to cache memory mode. Flow begins at block 4202.

At block 4202, a request is made to transition from using the memory array 4152 as a slice 4006 of the LLC 4005 to using the memory array 4152 as the weight RAM 124 of the NNU 121. Preferably, the transition is controlled by the operating system running on the processor 4000. For example, an application program running on the processor 4000 requests the operating system to use the NNU 121, and the operating system detects that the memory array 4152 is currently being used as an LLC slice 4006 thus requiring a transition from cache memory mode to NNU mode. Flow proceeds to block 4204.

At block 4204, in response to the transition request at block 4202, the operating system causes all the cores 4002 to synchronize themselves. That is, the operating system causes the cores 4002 to stop fetching architectural instructions and to stop accessing memory. More specifically, this pauses accesses to the LLC 4005, which presently includes the memory array 4152. In one embodiment, the operating system executes an architectural instruction (e.g., x86 WRMSR) on each core 4002 that instructs the core 4002 to synchronize. In an alternate embodiment, the operating system executes an instruction on one of the cores 4002 and, in response, the one core 4002, e.g., via microcode, signals each of the other cores 4002 to synchronize. Flow proceeds to block 4206.

At block 4206, a write-back-invalidate is performed on the LLC 4005. In one embodiment, core 4002 microcode requests the write-back-invalidate, preferably in response to execution of an architectural instruction of the operating system. The write-back-invalidate writes back modified cache lines (if any) and invalidates all cache lines of all LLC slices 4006, including the NNU LLC slice 4006-4. In an alternate embodiment, the write-back-invalidate is selective. Generally, the selective write-back-invalidate means operating according to the following pseudocode:

```
for each slice: // 0 to N-1, where N is current number of slices (includes
NNU slice)
    for each cacheline in slice:
        if exclusive_hash(cacheline address) != slice:
            evict cacheline
```

Of course, when the slice is the NNU slice (e.g., slice=8 in the case of eight non-NNU slices 4006 plus one NNU LLC slice 4006-4), the exclusive_hash (cacheline_address) will not equal the slice since the exclusive hash never returns the index of the NNU LLC slice 4006-4, so all cache lines in the NNU LLC slice 4006-4 will be evicted, i.e., written back, if modified, and invalidated. Depending upon the inclusive and exclusive hashes employed, the number of cache lines that require eviction from the non-NNU LLC slices 4006 varies. For example, assume the exclusive and inclusive hashes are both PA[45:6]% N, but where N is different for each, i.e., N is one less for the exclusive hash than for the inclusive hash, and assume N is 9 for the inclusive hash and 8 for the exclusive hash. In this case, a significantly large fraction of the cache lines in the non-NNU LLC slices 4006 require eviction, e.g., approximately 88%. In this case, it may be as or more efficient to simply write-back-invalidate all cache lines of all LLC slices 4006. In contrast, for another example, assume the exclusive hash is PA[10:8] and the inclusive hash is calc_hash_2 described above. In this case, none of the cache lines in the non-NNU LLC slices 4006 require eviction on the transition from inclusive to exclusive hash, which is the transition performed in FIG. 42. Flow proceeds to block 4208.

At block 4208, the hashing algorithm used to hash the physical addresses of cache lines to the LLC slices 4006 is updated to exclude the memory array 4152 as a slice 4006 of the LLC 4005, as described above. Preferably, a hash update message is broadcast to each core 4002 and snoop source to change their hash algorithm to the exclusive hash, i.e., the hash that excludes the NNU LLC slice 4006-4. Flow proceeds to block 4212.

At block 4212, the mode 4199 is updated to indicate the NNU mode to cause the selection logic 4158 to make the memory array 4152 available for use as the weight RAM 124 to be accessed by the NPU 126 pipeline 124 and architectural programs executing on the cores 4002. In one embodiment, the operating system (e.g., a device driver) executes an architectural instruction on one of the cores 4002 that writes to the NNU 121 control/status register 127 to update the bit that controls the mode 4199 to change the mode 4199 from cache memory mode to NNU mode. The architectural instruction may be a write to I/O space or a memory store instruction that performs a memory-mapped I/O write to the control/status register 127. Flow proceeds to block 4214.

At block 4214, the cores 4002 resume operation, i.e., they are no longer synchronized and instead begin fetching and executing architectural instructions, which may include accessing memory. In one embodiment, the operating system executes an architectural instruction on each core 4002 that instructs the core 4002 to resume operation. In an alternate embodiment, the operating system executes an instruction on one of the cores 4002 and, in response, the one core 4002, e.g., via microcode, signals each of the other cores 4002 to resume operation. Flow ends at block 4214.

Referring now to FIG. 43, a flowchart illustrating operation of the processor 4000 of FIG. 40 when the memory array 4152 of FIG. 41 is being transitioned from NNU mode when being used as the weight/data RAM 124/122 of the NNU 121 to cache memory mode when being used as a LLC slice 4006 is shown. Flow begins at block 4302.

At block 4302, a request is made to transition from using the memory array 4152 as the weight RAM 124 of the NNU 121 to using the memory array 4152 as a slice 4006 of the LLC 4005. Preferably, the transition is controlled by the operating system running on the processor 4000. For example, an application program running on the processor 4000 informs the operating system that it is no longer using the NNU 121 and no other application programs are requesting to use the NNU 121, and the operating system detects that the memory array 4152 is currently being used as the weight RAM 124 thus requiring a transition from NNU mode to cache memory mode. Flow proceeds to block 4304.

At block 4304, in response to the transition request at block 4302, the operating system causes all the cores 4002 to synchronize themselves, like the manner described with respect to block 4204. More specifically, this pauses accesses to the LLC 4005, which presently excludes the memory array 4152. Flow proceeds to block 4306.

At block 4306, a write-back-invalidate is performed on the LLC 4005. The write-back-invalidate writes back modified cache lines (if any) and invalidates all cache lines of all LLC slices 4006 (excluding the NNU LLC slice 4006-4 because it is not currently included in the LLC 4005). In an alternate embodiment, the write-back-invalidate is selective. Generally, the selective write-back-invalidate means operating according to the following pseudocode:

```
for each slice: // 0 to N-1, where N is current number of slices (excludes NNU slice)
    for each cacheline in slice:
        if inclusive_hash(cacheline address) != slice:
            evict cacheline
```

In the transition from exclusive hash to inclusive hash of FIG. 43, the slice is never the NNU slice, so no cache lines in the NNU LLC slice 4006-4 will be evicted. Depending upon the inclusive and exclusive hashes employed, the number of cache lines that require eviction from the non-NNU LLC slices 4006 varies. For example, assume the exclusive and inclusive hashes are both PA[45:6]% N, but where N is different for each, i.e., N is one less for the exclusive hash than for the inclusive hash, and assume N is 9 for the inclusive hash and 8 for the exclusive hash. In this case, a significantly large fraction of the cache lines in the non-NNU LLC slices 4006 require eviction, e.g., approximately 88%. In this case, it may be as or more efficient to simply write-back-invalidate all cache lines of all LLC slices 4006. In contrast, assume the exclusive hash is PA[10:8] and the inclusive hash is calc_hash_2 described above. In this case, a relatively small fraction of the cache lines in the non-NNU LLC slices 4006 require eviction, e.g., approximately 12%. Flow proceeds to block 4308.

At block 4308, the hashing algorithm used to hash the physical addresses of cache lines to the LLC slices 4006 is updated to include the memory array 4152 as a slice 4006 of the LLC 4005, as described above. That is, a hash update message is broadcast to each core 4002 and snoop source to change their hash algorithm to the inclusive hash, i.e., the hash that includes the NNU LLC slice 4006-4. Flow proceeds to block 4311.

At block 4311, the cache control logic 4108 performs an invalidate operation on the memory array 4152 by updating the status in the MESI array 4142 to Invalid for all the cache lines, as described above. Preferably, the cache control logic 4108 also resets the replacement information in the LRU array 4142. In one embodiment, core 4002 microcode requests the NNU LLC slice 4006-4 to perform the invalidate request, which the cache control logic 4108 responsively performs. Flow proceeds to block 4312.

At block 4312, the mode 4199 is updated to indicate the cache memory mode to cause the selection logic 4158 to make the memory array 4152 available for use as a LLC slice 4006. Flow proceeds to block 4314.

At block 4314, the cores 4002 resume operation, i.e., they are no longer synchronized and instead begin fetching and executing architectural instructions, which may include accessing memory, like the manner described with respect to block 4214. Flow ends at block 4314.

Figure 44:
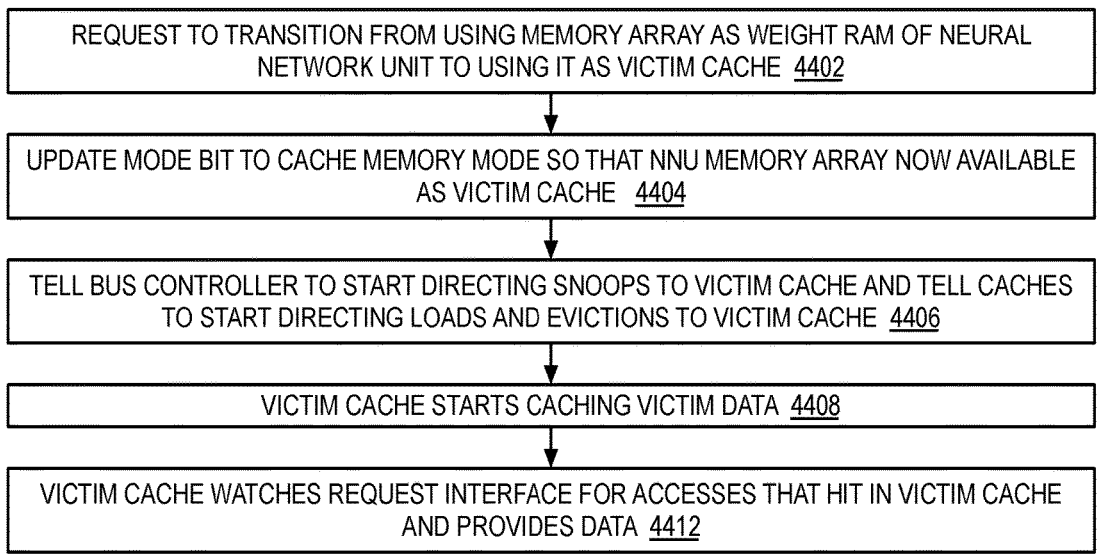
FIG. 44 is a flowchart illustrating operation of the processor of FIG. 40 when the memory array of FIG. 41 is being transitioned from NNU mode when being used as the weight/data RAM of the NNU to cache memory mode when being used as a victim cache.

Referring now to FIG. 44, a flowchart illustrating operation of the processor 4000 of FIG. 40 when the memory array 4152 of FIG. 41 is being transitioned from NNU mode when being used as the weight/data RAM 124/122 of the NNU 121 to cache memory mode when being used as a victim cache 4006-4 is shown. A victim cache is a cache memory that holds only cache lines evicted by a cache memory lower in the cache hierarchy of the processor 4000. For example, the L2 caches 4008 and/or L1 data/instruction caches are lower level caches. Additionally, in the embodiment in which the memory array 4152 may operate as a victim cache 4006-4, the LLC 4005 is considered a level-3 (L3) cache and is considered a lower level cache relative to the victim cache 4006-4 and the L3 cache 4005 evicts cache lines to the victim cache 4006-4. A victim cache provides data when an address hits in the victim cache, e.g., in response to a load request or a snoop request. In one embodiment, the L3 cache 4005 is inclusive of the L2 cache 4008 and of the lower level caches of the core complex 4012, and the victim cache provides hit data to allocate into the L3 cache 4005, which in turn provides the data to the L2 cache 4008, which in turn provides the data to the lower level caches. In another embodiment, the L3 cache 4005, the L2 cache 4008 and the lower level caches of the core complex 4012 are not inclusive, and the victim cache provides hit data to allocate directly each level of the caches. Advantageously, the cache control logic 4108 and memory array 4152 and selection logic 4158 of FIG. 41 operate collectively as a victim cache 4006-4 in the embodiment of FIGS. 44 and 45 when the mode 4199 is set to NNU mode. In one embodiment, the victim cache 4006-4 may operate as a write-back cache that caches modified cache lines evicted to it and may also operate as a write-through cache that does not cache modified cache lines evicted to it but instead forwards the modified cache lines to system memory. The write-through victim cache 4006-4 has the advantage of a faster transition to using the memory array 4152 as a weight RAM 124 in NNU mode, as may be observed from the description of FIG. 45 (more specifically, blocks 4506, 4508 and 4512), whereas the write-back victim cache 4006-4 may have the advantage of greater overall cache efficiency for the processor 4000. Preferably, the victim cache 4006-4 is configurable either write-back or write-through mode. Flow begins at block 4402.

At block 4402, a request is made to transition from using the memory array 4152 as the weight RAM 124 of the NNU 121 to using the memory array 4152 as a victim cache 4006-4 shared by the core complexes 4012. Preferably, the transition is controlled by the operating system running on the processor 4000, similar to the manner described above with respect to block 4302. Flow proceeds to block 4404.

At block 4404, the mode 4199 is updated to indicate the cache memory mode to cause the selection logic 4158 to make the memory array 4152 available for use as a victim cache 4006-4. Flow proceeds to block 4406.

At block 4406, the bus controller 4014 is told to start directing snoops to the victim cache 4006-4 and the lower level caches are told to start directing load requests and eviction requests to the victim cache 4006-4. Flow proceeds to block 4408.

At block 4408, the victim cache 4006-4 begins caching victim data. In the embodiment of FIG. 41, the evict queue 4114 receives requests, e.g., castouts, to evict cache lines from lower-level caches, e.g., L3 cache 4005, L2 caches 4008 and/or L1D/L1I caches. In response, the victim cache 4006-4 allocates the evicted cache lines into the memory array 4152. Flow proceeds to block 4412.

At block 4412, the victim cache 4006-4 receives requests to access data and responds with the data if the address of the request hits in the victim cache 4006-4. In the embodiment of FIG. 41, the snoop queue 4124 and the load queue 4112 receive requests. More specifically, the victim cache 4006-4 is snooped to write-back-invalidate cache lines that another caching agent is reading. Additionally, the victim cache 4006-4 receives load requests from lower-level caches for loads that miss in the lower-level caches. If the requests hit in the victim cache 4006-4, it provides the hit data to the requestor. Flow ends at block 4412.

Figure 45:
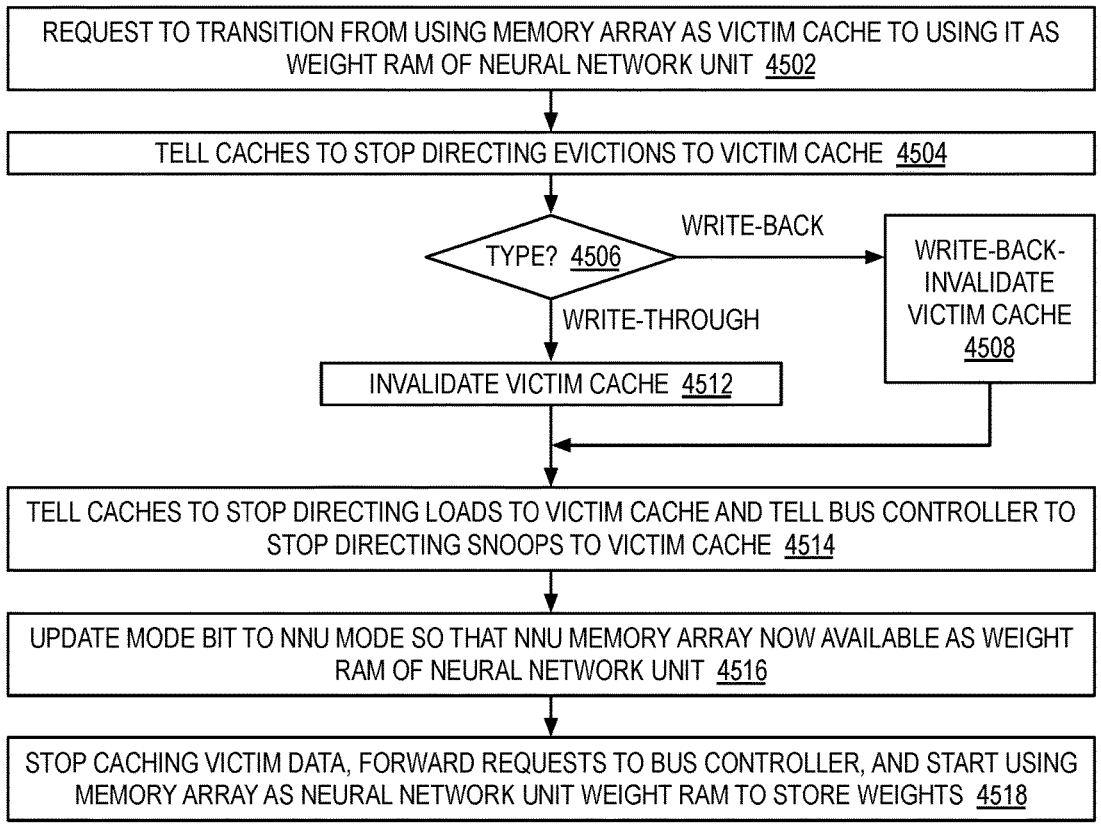
FIG. 45 is a flowchart illustrating operation of the processor of FIG. 40 when the memory array of FIG. 41 is being transitioned from cache memory mode when being used as a victim cache to NNU mode when being used as the weight/data RAM of the NNU.

Referring now to FIG. 45, a flowchart illustrating operation of the processor 4000 of FIG. 40 when the memory array 4152 of FIG. 41 is being transitioned from cache memory mode when being used as a victim cache 4006-4 to NNU mode when being used as the weight/data RAM 124/122 of the NNU 121 is shown. As mentioned above, the victim cache 4006-4 may be operating as a write-through type cache or as a write-back type cache. Flow begins at block 4502.

At block 4502, a request is made to transition from using the memory array 4152 as a victim cache 4006-4 to using the memory array 4152 as the weight RAM 124 of the NNU 121. Preferably, the transition is controlled by the operating system running on the processor 4000. For example, an application program running on the processor 4000 requests the operating system to use the NNU 121, and the operating system detects that the memory array 4152 is currently being used as a victim cache 4006-4 thus requiring a transition from cache memory mode to NNU mode. Flow proceeds to block 4504.

At block 4504, the bus controller 4014 is told to stop directing snoops to the victim cache 4006-4. Flow proceeds to decision block 4506.

At decision block 4506, if the victim cache 4006-4 is operating as a write-through type cache, flow proceeds to block 4512; otherwise, flow proceeds to block 4508.

At block 4508, the cache control logic 4108 performs a write-back-invalidate on the victim cache 4006-4. That is, victim cache 4006-4 writes back to system memory all its modified cache lines and then invalidates all its cache lines (by updating the status in the MESI array 4142 to Invalid for all the cache lines; preferably, the cache control logic 4108 also resets the replacement information in the LRU array 4142.). Preferably, the cache control logic 4108 continues to respond to load requests and snoop requests while it performs the write-back-invalidate. Flow proceeds to block 4514.

At block 4512, the cache control logic 4108 performs an invalidate operation on the memory array 4152. That is, the cache control logic 4108 invalidates all the cache lines of the memory array 4152. As may be observed, if the victim cache 4006-4 is operating as a write-through type cache, the transition to using the memory array 4152 as a weight RAM 124 may be advantageously faster than when the victim cache 4006-4 was operating as a write-back type cache because the write-back of Modified cache lines at block 4508 need not be performed (i.e., only the invalidate here at block 4512 need be performed), which may be a substantial savings when the victim cache 4006-4 is relatively large. Flow proceeds to block 4514.

At block 4514, the lower level caches are told to stop directing load requests to the victim cache 4006-4, and the bus controller 4014 is told to stop directing snoops to the victim cache 4006-4. Flow proceeds to block 4516.

At block 4516, the mode 4199 is updated to indicate the NNU mode to cause the selection logic 4158 to make the memory array 4152 available for use as the weight RAM 124 to be accessed by the NPU 126 pipeline 124 and architectural programs executing on the cores 4002, like the manner described with respect to block 4212. Flow proceeds to block 4518.

At block 4518, the cache control logic 4108 stops caching victim data (which it began to do at block 4408). Furthermore, the cache control logic 4108 forwards to the bus controller 4014 any subsequent load, eviction or snoop requests it receives. Finally, architectural programs executing on the cores 4002 can use as the weight RAM 124 to be accessed by the NPU 126 pipeline 124. Flow ends at block 4518.

While various embodiments of the present invention have been described herein, they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished using general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line or another communications medium. Embodiments of the apparatus and method described herein may be included in a semiconductor intellectual property core, such as a processor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a processor device that may be used in a general-purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

The invention claimed is:

1. A processor, comprising:
   a plurality of processing cores;
   a last level cache memory (LLC) shared by the plurality of processing cores, the LLC comprising a plurality of slices; and
   a neural network unit (NNU), comprising:
   an array of neural processing units (NPU); and
   a memory array;
   wherein to transition from a first mode in which the memory array operates to store neural network weights read by the plurality of NPUs to a second mode in which the memory array operates as a slice of the LLC in addition to the plurality of slices, the processor:
   write-back-invalidates the LLC; and
   updates a hashing algorithm into a hashing-include algorithm to include the memory array as a slice of the LLC in addition to the plurality of slices; and
   wherein to transition from the second mode to the first mode, the processor:
   write-back-invalidates the LLC; and
   updates the hashing algorithm into a hashing-exclude algorithm to exclude the memory array from the LLC;
   wherein to write-back-invalidate the LLC to transition from the first mode to the second mode, the processor only write-back-invalidates cache lines of the plurality of slices whose addresses are hashed by the hashing-exclude algorithm; and
   wherein to writeback-invalidate the LLC to transition from the second mode to the first mode, the processor only write-back-invalidates cache lines of the plurality of slices and the memory array whose addresses are hashed by the hashing-exclude algorithm.

2. The processor of claim 1,
   wherein to transition from the first mode to the second mode, the processor also invalidates the memory array.

3. The processor of claim 1,
   wherein to write-back-invalidate the LLC to transition from the first mode to the second mode, the processor write-back-invalidates the plurality of slices; and
   wherein to write-back-invalidate the LLC to transition from the second mode to the first mode, the processor write-back-invalidates the plurality of slices and the memory array.

4. The processor of claim 1, wherein all cache lines whose addresses are mapped to the plurality of slices by the hashing-include algorithm are mapped to the same slices by the hashing-exclude algorithm; and
   wherein to write-back-invalidate the LLC to transition from the second mode to the first mode, the processor write-back-invalidates none of cache lines of the plurality of slices and write-back-invalidates cache lines of the memory array.

5. The processor of claim 4, wherein the hashing-include algorithm uses the first plurality of bits of the cache line addresses in addition to a second plurality of bits of the cache line addresses that is different from the first plurality of bits of the cache line addresses.

6. The processor of claim 5, wherein the hashing hashing-include algorithm selects the memory array, when the second plurality of bits of the cache line addresses equals a predetermined Value and otherwise selects one of the plurality of slices uses the first plurality of bits of the cache line addresses.

7. The processor of claim 1, further comprising:
   a ring bus to which are coupled the NNU, the plurality of slices, and the plurality of processing cores.

8. The processor of claim 7, further comprising:
   wherein when operating in the first mode, the plurality of processing cores access the NNU over the ring bus as a peripheral device for accelerating neural network computations.

9. The processor of claim 1,
   wherein to transition from the first mode to the second mode and to transition from the second mode to the first mode, the processor synchronizes the plurality of processing cores prior to the write-back-invalidate of the LLC and resumes execution after the write-back-invalidate of the LLC.

10. A method for operating a processor having a plurality of processing cores, a last level cache memory (LLC) shared by the plurality of processing cores, the LLC comprising a plurality of slices, and a neural network unit (NNU) comprising an array of neural processing units (NPU) and a memory array, the method comprising:
    transitioning from a first mode in which the memory array operates to store neural network weights read by the plurality of NPUs to a second mode in which the memory array operates as a slice of the LLC in addition to the plurality of slices, comprising:
    write-back-invalidating the LLC; and
    updates a hashing algorithm into hashing-include algorithm to include the memory array as a slice of the LLC in addition to the plurality of slices; and
    wherein to transition from the second mode to the first mode, the processor:
    write-back-invalidates the LLC; and
    updates the hashing algorithm into a hashing-exclude algorithm to exclude the memory array from the LLC;
    wherein to write-back-invalidate the LLC to transition from the first mode to the second mode, the processor only write-back-invalidates cache lines of the plurality of slices whose addresses are hashed by the hashing-exclude algorithm; and
    wherein to write-back-invalidate the LLC to transition from the second mode to the first mode, the processor only write-back-invalidates cache lines of the plurality of slices and the memory array whose addresses are hashed by the hashing-exclude algorithm.

11. The method of claim 10,
    said transitioning from the first mode to the second mode further comprises invalidating the memory array.

12. The method of claim 10,
    wherein said write-back-invalidating the LLC to transition from the first mode to the second mode comprises write-back-invalidating the plurality of slices; and
    wherein said write-back-invalidating the LLC to transition from the second mode to the first mode comprises write-back-invalidating the plurality of slices and the memory array.

13. The method of claim 10, wherein all cache lines whose addresses are mapped to the plurality of slices by the hashing-include algorithm are mapped to the same slices by the hashing-exclude algorithm; and
    wherein said write-back-invalidating the LLC to transition from the second mode to the first mode comprises write-back-invalidating none of cache lines of the plurality of slices and write-back-invalidating cache lines of the memory array.

14. The method of claim 13, wherein the hashing-include algorithm uses the first plurality of bits of the cache line addresses in addition to a second plurality of bits of the cache line addresses that is different from the first plurality of bits of the cache line addresses.

15. The method of claim 14, wherein the hashing hashing-include algorithm selects the memory array when the second plurality of bits of the cache line addresses equals a predetermined value and otherwise selects one of the plurality of slices uses the first plurality of bits of the cache line addresses.

16. The method of claim 10,
wherein the processor further comprises a ring bus to which are coupled the NNU, the plurality of slices, and the plurality of processing cores.

17. The method of claim 16, further comprising:
accessing, by the plurality of processing cores when operating in the first mode, the NNU over the ring bus as a peripheral device for accelerating neural network computations.

18. A computer program product encoded in at least one non-transitory computer usable medium for use with a computing device, the computer program product comprising:
computer usable program code embodied in said medium, for specifying a processor, the computer usable program code comprising:
first program code for specifying a plurality of processing cores;
second program code for specifying a last level cache memory (LLC) shared by the plurality of processing cores, the LLC comprising a plurality of slices; and
third program code for specifying a neural network unit (NNU), comprising:
an array of neural processing units (NPU); and
a memory array;
wherein to transition from a first mode in which the memory array operates to store neural network weights read by the plurality of NPUs to a second mode in which the memory array operates as a slice of the LLC in addition to the plurality of slices, the processor:
write-back-invalidates the LLC; and
updates a hashing algorithm to include the memory array as a slice of the LLC in addition to the plurality of slices; and
wherein to transition from the second mode to the first mode, the processor:
write-back-invalidates the LLC; and
updates the hashing algorithm into a hashing-exclude algorithm to exclude the memory array from the LLC;
wherein to write-back-invalidate the LLC to transition from the first mode to the second mode, the processor only write-back-invalidates cache lines of the plurality of slices whose addresses are hashed by the hashing-exclude algorithm; and
wherein to write-back-invalidate the LLC to transition from the second mode to the first mode, the processor only write-back-invalidates cache lines of the plurality of slices and the memory array whose addresses are hashed by the hashing-exclude algorithm.

* * * * *